(12) United States Patent
Rodriguez et al.

(10) Patent No.: US 11,217,025 B2
(45) Date of Patent: Jan. 4, 2022

(54) VIRTUAL, AUGMENTED, AND MIXED REALITY SYSTEMS AND METHODS

(71) Applicant: MAGIC LEAP, INC., Plantation, FL (US)

(72) Inventors: Jose Felix Rodriguez, Hialeah, FL (US); Ricardo Martinez Perez, Plantation, FL (US); Reza Nourai, Danville, CA (US); Robert Blake Taylor, Studio City, CA (US)

(73) Assignee: Magic Leap, Inc., Plantation, FL (US)

( * ) Notice: Subject to any disclaimer, the term of this patent is extended or adjusted under 35 U.S.C. 154(b) by 109 days.

(21) Appl. No.: 16/746,393

(22) Filed: Jan. 17, 2020

(65) Prior Publication Data
US 2020/0234501 A1    Jul. 23, 2020

Related U.S. Application Data

(60) Provisional application No. 62/794,324, filed on Jan. 18, 2019.

(51) Int. Cl.
*G06T 1/20* (2006.01)
*G06T 19/00* (2011.01)
(Continued)

(52) U.S. Cl.
CPC ............ *G06T 19/006* (2013.01); *G06T 1/20* (2013.01); *H04L 45/48* (2013.01); *H04L 67/38* (2013.01)

(58) Field of Classification Search
CPC ......... G06T 19/006; G06T 1/20; H04L 45/48; H04L 67/38; Y02D 10/00; G06F 3/013;
(Continued)

(56) References Cited

U.S. PATENT DOCUMENTS

2003/0095129 A1*   5/2003  Wakasugi .......... G06K 15/1877
                                                 345/581
2006/0087502 A1    4/2006  Karidis et al.
(Continued)

FOREIGN PATENT DOCUMENTS

EP       3029551       6/2016
WO    WO 2011/015843   2/2011

OTHER PUBLICATIONS

PCT International Preliminary Report on Patentability for International Patent Appln. No. PCT/US20/14163, Applicant Magic Leap, Inc., dated Jun. 16, 2021 (8 pages).
(Continued)

*Primary Examiner* — Jitesh Patel
(74) *Attorney, Agent, or Firm* — Vista IP Law Group, LLP

(57) ABSTRACT

A method in a virtual, augmented, or mixed reality system includes a GPU determining/detecting an absence of image data. The method also includes shutting down a portion/component/function of the GPU. The method further includes shutting down a communication link between the GPU and a DB. Moreover, the method includes shutting down a portion/component/function of the DB. In addition, the method includes shutting down a communication link between the DB and a display panel. The further also includes shutting down a portion/component/function of the display panel.

7 Claims, 57 Drawing Sheets

(51) Int. Cl.
*H04L 12/753* (2013.01)
*H04L 29/06* (2006.01)

(58) Field of Classification Search
CPC .................. G06F 1/163; G06F 1/3265; G02B
2027/0134; G02B 2027/0138; G02B
2027/0185; G02B 2027/014; G02B
27/0172
See application file for complete search history.

(56) References Cited

U.S. PATENT DOCUMENTS

| | | | |
|---|---|---|---|
| 2013/0222235 A1 | 8/2013 | Abdollahi et al. | |
| 2015/0379684 A1* | 12/2015 | Ramani | G06K 9/527 345/531 |
| 2017/0346992 A1* | 11/2017 | Williams | G06T 15/04 |
| 2018/0053284 A1 | 2/2018 | Rodriguez et al. | |
| 2018/0315216 A1* | 11/2018 | Beri | G06T 11/40 |

OTHER PUBLICATIONS

PCT International Search Report and Written Opinion for International Patent Appln. No. PCT/US20/14163, Applicant Magic Leap, Inc., dated May 19, 2020 (11 pages).

* cited by examiner

FIG. 15C

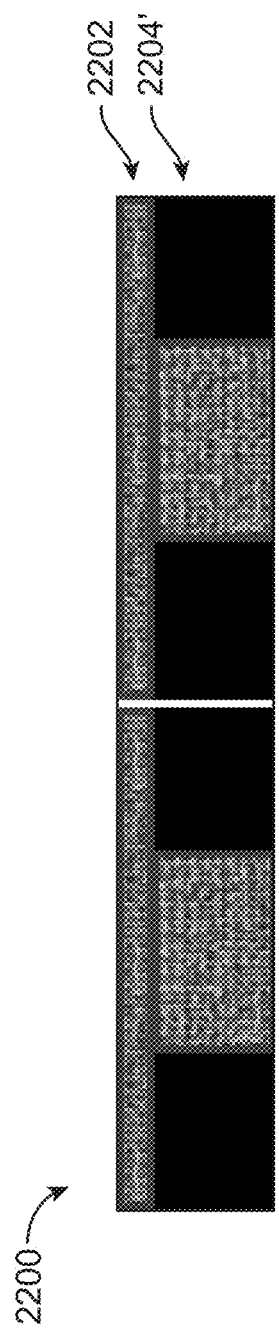

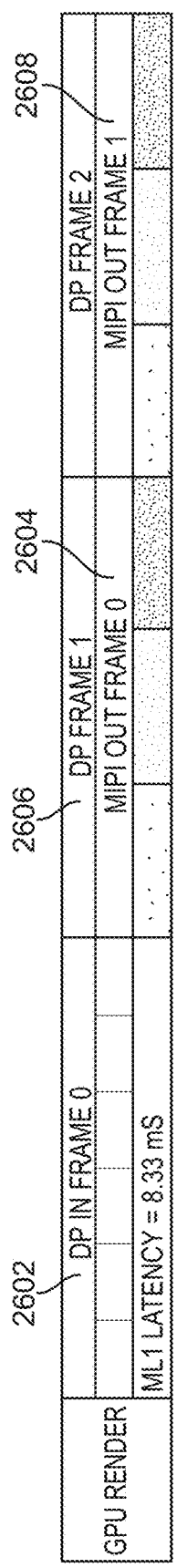
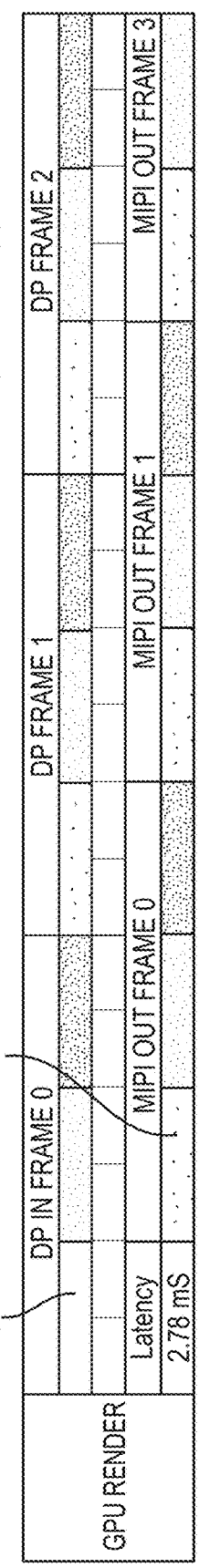
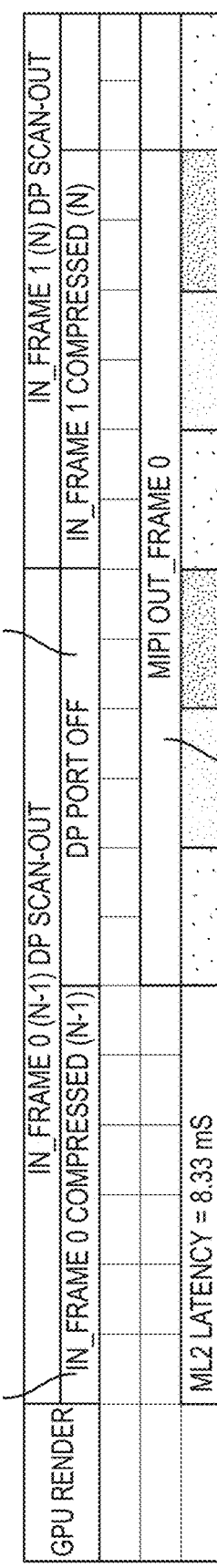
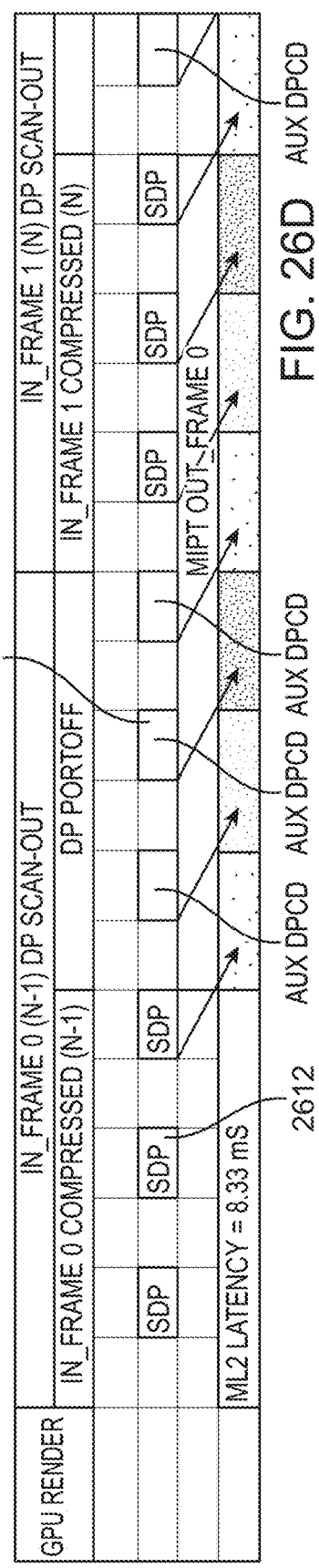
FIG. 26A
FIG. 26B
FIG. 26C
FIG. 26D

VIRTUAL, AUGMENTED, AND MIXED REALITY SYSTEMS AND METHODS

CROSS-REFERENCE TO RELATED APPLICATIONS

This application claims priority to U.S. Provisional Application Ser. No. 62/794,324, filed on Jan. 18, 2019 and entitled "VIRTUAL, AUGMENTED, AND MIXED REALITY SYSTEMS AND METHODS." The present application is related to U.S. Utility patent application Ser. No. 15/683,677 filed on Aug. 22, 2018 and entitled "VIRTUAL, AUGMENTED, AND MIXED REALITY SYSTEMS AND METHODS," U.S. Utility patent application Ser. No. 15/804,356 filed on Nov. 6, 2017 and entitled "VIRTUAL AND AUGMENTED SYSTEMS AND METHODS," U.S. Utility patent application Ser. No. 14/555,585 filed on Nov. 27, 2014 and entitled "VIRTUAL AND AUGMENTED REALITY SYSTEMS AND METHODS," and U.S. Utility patent application Ser. No. 15/902,710 filed on Feb. 22, 2018 and entitled "VIRTUAL AND AUGMENTED REALITY SYSTEMS AND METHODS." The contents of the aforementioned patent applications are hereby expressly and fully incorporated by reference in their entirety, as though set forth in full. Described in the aforementioned incorporated patent applications are various embodiments of virtual, augmented, and mixed reality systems and methods. Described herein are further embodiments of virtual, augmented, and mixed reality systems and methods.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present disclosure relates to virtual reality, augmented reality, and mixed reality imaging, visualization, and display systems and methods.

BACKGROUND

Modern computing and display technologies have facilitated the development of virtual reality (VR), augmented reality (AR), and mixed reality (MR) systems. VR systems create a simulated environment for a user to experience. This can be done by presenting computer-generated imagery to the user through a head-mounted display. This imagery creates a sensory experience which immerses the user in the simulated environment. A VR scenario typically involves presentation of only computer-generated imagery rather than also including actual real-world imagery.

AR systems generally supplement a real-world environment with simulated elements. For example, AR systems may provide a user with a view of the surrounding real-world environment via a head-mounted display. However, computer-generated imagery can also be presented on the display to enhance the real-world environment. This computer-generated imagery can include elements which are contextually-related to the real-world environment. Such elements can include simulated text, images, objects, etc. MR systems also introduce simulated objects into a real-world environment, but these objects typically feature a greater degree of interactivity than in AR systems. The simulated elements can often times be interactive in real time.

FIG. 1 depicts an example AR/MR scene 1 where a user sees a real-world park setting 6 featuring people, trees, buildings in the background, and a concrete platform 20. In addition to these items, computer-generated imagery is also presented to the user. The computer-generated imagery can include, for example, a robot statue 10 standing upon the real-world platform 20, and a cartoon-like avatar character 12 flying by which seems to be a personification of a bumble bee, even though these elements 12, 10 are not actually present in the real-world environment.

Various optical systems generate images at various depths for displaying VR, AR, or MR scenarios. Some such optical systems are described in U.S. Utility patent application Ser. No. 14/555,585 filed on Nov. 27, 2014, the contents of which have been previously incorporated by reference herein. Other such optical systems for displaying MR experiences are described in U.S. Utility patent application Ser. No. 14/738,877, the contents of which are hereby expressly and fully incorporated by reference in their entirety, as though set forth in full.

Because the human visual perception system is complex, it is challenging to produce a VR/AR/MR technology that facilitates a comfortable, natural-feeling, rich presentation of virtual image elements amongst other virtual or real-world imagery elements. Improved techniques are needed for processing image data in such systems, including, for example, techniques for providing control data to control how the image data is displayed, techniques for correcting optical distortions in the image data, and techniques for warping image data based on the head pose of a user. VR/AR/MR technology also has size and portability issues, battery life issues, system overheating issues, and other system and optical challenges that elevate the importance of power efficient image rendering. Improved techniques are needed for addressing these issues. The systems and methods described herein are configured to address these and other challenges.

What is needed is a technique or techniques to improve over legacy techniques and/or over other considered approaches. Some of the approaches described in this background section are approaches that could be pursued, but not necessarily approaches that have been previously conceived or pursued.

SUMMARY

In one embodiment, a method in a virtual, augmented, or mixed reality system includes a GPU determining/detecting an absence of image data. The method also includes shutting down a portion/component/function of the GPU. The method further includes shutting down a communication link between the GPU and a DB. Moreover, the method includes shutting down a portion/component/function of the DB. In addition, the method includes shutting down a communication link between the DB and a display panel. The further also includes shutting down a portion/component/function of the display panel.

In one or more embodiments, the method includes reorganizing frame data to reduce transfer time. The method may also include the GPU DP port sending a custom STP message to the DB. The method may also include the GPU sending the STP message to the DB AUS messages. The portion/component/function of the GPU may be selected from the group consisting of memory read, compression, and color segmentation. The portion/component/function of the DB may be memory write. The portion/component/function of the display panel may be selected from the group consisting of video RAM and a MIPI receiver.

In one or more embodiments, the method includes the GPU sending a wake up signal to the DB. The GPU may send the wake up signal via an AUX communication link. The method may also include the GPU sending a wake up signal to the communication link between the GPU and a DB. The portion/component/function of the GPU, the communication link between the GPU and a DB, the portion/component/function of the DB, the communication link between the DB and a display panel, the portion/component/function of the display panel may be shut down asynchronously. The method may also include the DB sending an embedded line control message to the display panel.

In another embodiment, a method in a virtual, augmented, or mixed reality system includes a GPU receiving a frame of image data. The method also includes the GPU identifying a plurality of regions/portions/sections/tiles in the frame of image data that have changed from a previous frame of image data. The method further includes the GPU moving at least some of the plurality of regions/portions/sections/tiles to a beginning of the frame of data to form a reordered frame of image data. Moreover, the method includes the GPU sending the reordered frame of image data to a DB. In addition, the method includes shutting down a portion/component/function of the GPU, a communication link between the GPU and a DB, a portion/component/function of the DB, a communication link between the DB and a display panel, and a portion/component/function of the display panel.

In one or more embodiments, the method includes the GPU compressing the reordered frame of image data before sending the reordered frame of image data to the DB. The reordered frame of image data may be smaller than the frame of image data. The method may also include the DB storing the reordered frame of image data in a buffer.

In one or more embodiments, the method includes determining a size of the reordered frame of image data. The method further includes shutting down the portion/component/function of the GPU, the communication link between the GPU and a DB, the portion/component/function of the DB, the communication link between the DB and a display panel, the portion/component/function of the display panel only when the reordered frame of image data is smaller than a predetermined maximum size.

In one or more embodiments, the method includes the GPU sending a STP message to the DB after sending the reordered frame of image data to the DB. The method may further include the GPU sending the STP message to the DB via a SDP.

In one or more embodiments, the portion/component/function of the GPU is selected from the group consisting of memory read, compression, and color segmentation. The portion/component/function of the DB may be memory write. The portion/component/function of the display panel may be selected from the group consisting of video RAM and a MIPI receiver.

In one or more embodiments, the method includes the GPU sending a wake up signal to the DB. The GPU may send the wake up signal via an AUX communication link. The portion/component/function of the GPU, the communication link between the GPU and a DB, the portion/component/function of the DB, the communication link between the DB and a display panel, the portion/component/function of the display panel may be shut down asynchronously.

In one or more embodiments, the method includes the DB reconstructing the frame of image data from the reordered frame of image data. The method may further include setting a portion of the frame of image data not in the plurality of regions/portions/sections/tiles in the frame of image data to a background color. The method may also include the DB blending the reordered frame of image data with a previous frame of image data. The method may further include the DB blending the reordered frame of image data with image data relating to an updated foveated region. The method may also include the DB masking the previous frame of image data before blending the reordered frame of image data therewith.

In one or more embodiments, the method includes the DB scaling the reordered frame of image data. The method may further include the DB receiving a scaling factor from the GPU, and the DB scaling the reordered frame of image data using the scaling factor. The scaling may be a part of a foveation operation. The method may also include the DB performing a function on the image data, the function being selected from the group consisting of warping, pixelated dimming, occlusion, chromatic correction aberration, frame rate and expansion. The method may further include storing the reordered frame of image data in a FIFO memory before shutting down a portion/component/function of the GPU. The method may also include the DB sending an embedded line control message to the display panel.

In still another embodiment, a method in a virtual, augmented, or mixed reality system includes a GPU dividing a first color field into a first partial first color field and a second partial first color field. The method also includes the GPU dividing a second color field into a first partial second color field and a second partial second color field. The method further includes the GPU sending the first partial first color field to a DB. Moreover, the method includes the GPU sending the first partial second color field to the DB after sending the first partial first color field. In addition, the method includes the GPU sending the second partial first color field to the DB after sending the first partial second color field. The method also includes the GPU sending the second partial second color field to the DB after sending the second partial first color field.

In one or more embodiments, the method includes the GPU dividing a third color field into a first partial third color field and a second partial third color field. The method may also include the GPU sending the first partial third color field to the DB after sending the first partial second color field and before sending the second partial first color field. The method may further include the GPU sending the second partial third color field to the DB after sending the second partial second color field. The method may also include the GPU sending the first partial first and second color fields and the second partial first and second color fields as a single vertically encoded data set.

In yet another embodiment, a method in a virtual, augmented, or mixed reality system includes a GPU dividing a first color field into a first partial first color field, a second partial first color field, and a third partial first color field. The method also includes the GPU dividing a second color field into a first partial second color field, a second partial second color field, and a third partial second color field. The method further includes the GPU dividing a third color field into a first partial third color field, a second partial third color field, and a third partial third color field. Moreover, the method includes the GPU sending the first partial first color field to a DB. In addition, the method includes the GPU sending the first partial second color field to the DB after sending the first partial first color field. The method also includes the GPU sending the first partial third color field to the DB after sending the first partial second color field. The method further includes the GPU sending the second partial first color field to the DB after sending the first partial third color field. Moreover, the method includes the GPU sending the second partial second color field to the DB after sending the second partial first color field. In addition, the method includes the GPU sending the second partial third color field to the DB after sending the second partial second color field. The method also includes the GPU sending the third partial first color field to the DB after sending the second partial third color field. The method further includes the GPU sending the third partial second color field to the DB after sending the third partial first color field. Moreover, the method includes the GPU sending the third partial third color field to the DB after sending the third partial second color field.

In one or more embodiments, the method includes the GPU sending the first partial first, second, and third color fields, the second partial first, second, and third color fields, and the third partial first, second, and third color fields as a single vertically encoded data set.

In one or more embodiments, the method includes the GPU sending first pose data to the DB, and the DB warping the first partial first color field using the first pose data. The method also includes second pose data to the DB after sending the first pose data, and the DB warping the first partial second color field using the second pose data. The method further includes third pose data to the DB after sending the second pose data, and the DB warping the first partial third color field using the third pose data. Moreover, the method includes fourth pose data to the DB after sending the third pose data, and the DB warping the second partial first color field using the fourth pose data. In addition, the method includes fifth pose data to the DB after sending the fourth pose data, and the DB warping the second partial second color field using the fifth pose data. The method also includes sixth pose data to the DB after sending the fifth pose data, and the DB warping the second partial third color field using the sixth pose data. The method further includes seventh pose data to the DB after sending the sixth pose data, and the DB warping the third partial first color field using the seventh pose data. Moreover, the method includes eighth pose data to the DB after sending the seventh pose data, and the DB warping the third partial second color field using the eighth pose data. In addition, the method includes ninth pose data to the DB after sending the eighth pose data, and the DB warping the third partial third color field using the ninth pose data.

In one or more embodiments, the GPU sends at least one of the first, second, third, fourth, fifth, sixth, seventh, eighth, and ninth pose data to the DB through an AUX communication link. The DB may warp each of the first partial first color field, the second partial first color field, the third partial first color field, the first partial second color field, the second partial second color field, the third partial second color field, the first partial third color field, the second partial third color field, the third partial third color field a second time.

In still another embodiment, a data format for use in a virtual, augmented, or mixed reality system includes a first signaling row. The data format also includes a plurality of first color field rows. The data format further includes a second signaling row. Moreover, the data format includes a plurality of second color field rows. In addition, the data format includes a third signaling row. The data format also includes a plurality of third color field rows.

In one or more embodiments, the first signaling row includes a number of active rows for the plurality of first color field rows. The active rows may change between image frames. The second signaling row may include a number of active rows for the plurality of second color field rows. The third signaling row may include a number of active rows for the plurality of third color field rows. The first signaling row may include a start position of the plurality of first color field rows. The second signaling row may include a start position of the plurality of second color field rows. The third signaling row may include a start position of r the plurality of third color field rows. The first, second, and third color field rows may include intensity information without color information. The first, second, and third signaling rows may include color information without intensity information. The first, second, and third signaling rows and the pluralities of first, second, and third color field rows may be read at a faster rate than images corresponding to the pluralities of first, second, and third color field rows are displayed.

In yet another embodiment, a method in a virtual, augmented, or mixed reality system includes detecting an area of focus of a user. The method also includes a GPU rendering virtual images outside of the area of focus at a lower resolution. The method further includes the GPU rendering virtual images inside of the area of focus at a higher resolution. Moreover, the method includes the GPU sending the rendered virtual images outside and inside of the area of focus to one or more Dbs. In addition, the method includes the one or more DBs merging the rendered virtual images outside and inside of the area of focus to generate a frame of image data.

In one or more embodiments, the method includes the GPU sending the rendered virtual images outside of the area of focus to a first DB, the GPU sending the rendered virtual images inside of the area of focus to a second DB, and the first and/or second DB merging the rendered virtual images outside and inside of the area of focus to generate the frame of image data.

In still another embodiment, a method in a virtual, augmented, or mixed reality system includes detecting a user's hand in a FOV. The method also includes a GPU generating a mask corresponding to a location of the user's hand. The method further includes the GPU sending the mask and a frame of image data to a DB. Moreover, the method includes the DB modifying the frame of image data using the mask.

In one or more embodiments, the mask is a depth mask.

In yet another embodiment, a method in a virtual, augmented, or mixed reality system includes a GPU sending a first color field image data to a DB, a second color field image data to the DB, and a third color field image data to the DB. The method also includes the GPU sending first pose data to the DB, and the DB warping the first color field image data using the first pose data to generate warped first color field image data. The method further includes the GPU sending second pose data to the DB after sending the first pose data, and the DB warping the second color field image data using the second pose data to generate warped second color field image data. Moreover, the method includes the GPU sending third pose data to the DB after sending the second pose data, and the DB warping the third color field image data using the third pose data to generate warped third color field image data.

In one or more embodiments, the method includes the GPU sending packet pose data to the DB, where the DB warping the first color field image data using the first pose data includes the DB calculating a first pose delta from the packet pose and the first pose data. The method may further include the DB instructing display of a first color field image corresponding to the warped first color field image data immediately after the DB generates the warped first color field image data. The method may also include the DB performing a function on the first, second, and third color field image data, the function being selected from the group consisting of projector light field distortion compensation, pixelated dimming, occlusion, chromatic correction aberration, frame rate and expansion.

In one or more embodiments, the method includes the GPU sending fourth pose data to the DB after sending the third pose data. The method also includes the DB warping the first color field image data using the fourth pose data to generate second warped first color field image data. The method further the GPU sending fifth pose data to the DB after sending the fourth pose data. Moreover, the method includes the DB warping the second color field image data using the fifth pose data to generate second warped second color field image data. In addition, the method includes the GPU sending sixth pose data to the DB after sending the fifth pose data. The method also includes the DB warping the third color field image data using the sixth pose data to generate second warped third color field image data.

In still another embodiment, a method in a virtual, augmented, or mixed reality system includes a GPU obtaining a frame of image data. The method also includes the GPU identifying a section of the frame of image data. The method further includes a direct memory access controller sending the identified section of the frame of image data to a DB without further processing of the image data.

In one or more embodiments, the section of the frame of image data is a row of non-black image data. The method may also include shutting down a portion/component/function of the GPU, a portion/component/function of the DMA, a communication link between the GPU and a DB, a portion/component/function of the DB, a communication link between the DB and a display panel, and/or a portion/component/function of the display panel.

In yet another embodiment, a method in a virtual, augmented, or mixed reality system includes a GPU dividing a first field into a first partial first field, a second partial first field, and a third partial first field. The method also includes the GPU dividing a second field into a first partial second field, a second partial second field, and a third partial second field. The method further includes the GPU dividing a third field into a first partial third field, a second partial third field, and a third partial third field. Moreover, the method includes the GPU sending the first partial first field to a DB. In addition, the method includes the GPU sending the first partial second field to the DB after sending the first partial first field. The method also includes the GPU sending the first partial third field to the DB after sending the first partial second field. The method further includes the GPU sending the second partial first field to the DB after sending the first partial third field. Moreover, the method includes the GPU sending the second partial second field to the DB after sending the second partial first field. In addition, the method includes the GPU sending the second partial third field to the DB after sending the second partial second field. The method also includes the GPU sending the third partial first field to the DB after sending the second partial third field. The method further includes the GPU sending the third partial second field to the DB after sending the third partial first field. Moreover, the method includes the GPU sending the third partial third field to the DB after sending the third partial second field.

In one or more embodiments, the method includes the GPU sending first pose data to the DB, and the DB warping the first partial first field using the first pose data. The method also includes second pose data to the DB after sending the first pose data, and the DB warping the first partial second field using the second pose data. The method further includes third pose data to the DB after sending the second pose data, and the DB warping the first partial third field using the third pose data. Moreover, the method includes fourth pose data to the DB after sending the third pose data, and the DB warping the second partial first field using the fourth pose data. In addition, the method includes fifth pose data to the DB after sending the fourth pose data, and the DB warping the second partial second field using the fifth pose data. The method also includes sixth pose data to the DB after sending the fifth pose data, and the DB warping the second partial third field using the sixth pose data. The method further includes seventh pose data to the DB after sending the sixth pose data, and the DB warping the third partial first field using the seventh pose data. Moreover, the method includes eighth pose data to the DB after sending the seventh pose data, and the DB warping the third partial second field using the eighth pose data. In addition, the method includes ninth pose data to the DB after sending the eighth pose data, and the DB warping the third partial third field using the ninth pose data.

In still another embodiment, a method in a virtual, augmented, or mixed reality system includes a GPU obtaining a frame of image data. The method also includes the GPU obtaining occlusion data relating to an occlusion in a field of view, the data including depth map data. The method further includes the GPU sending the frame of image data and the occlusion data to a DB. Moreover, the method includes the DB masking the frame of image data before display using the occlusion data.

BRIEF DESCRIPTION OF THE DRAWINGS

The drawings described below are for illustration purposes only. The drawings are not intended to limit the scope of the present disclosure. The drawings illustrate the design and utility of various embodiments of the present disclosure. It should be noted that the figures are not drawn to scale and that elements of similar structures or functions are represented by like reference numerals throughout the figures. In order to better appreciate how to obtain the recited and other advantages and objects of various embodiments of the disclosure, a more detailed description of the present disclosure will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings.

FIGS. 26A-26D schematically depict inputs to and outputs from a display bridge for use with VR/AR/MR systems according to some embodiments.

DETAILED DESCRIPTION

Figure 1:
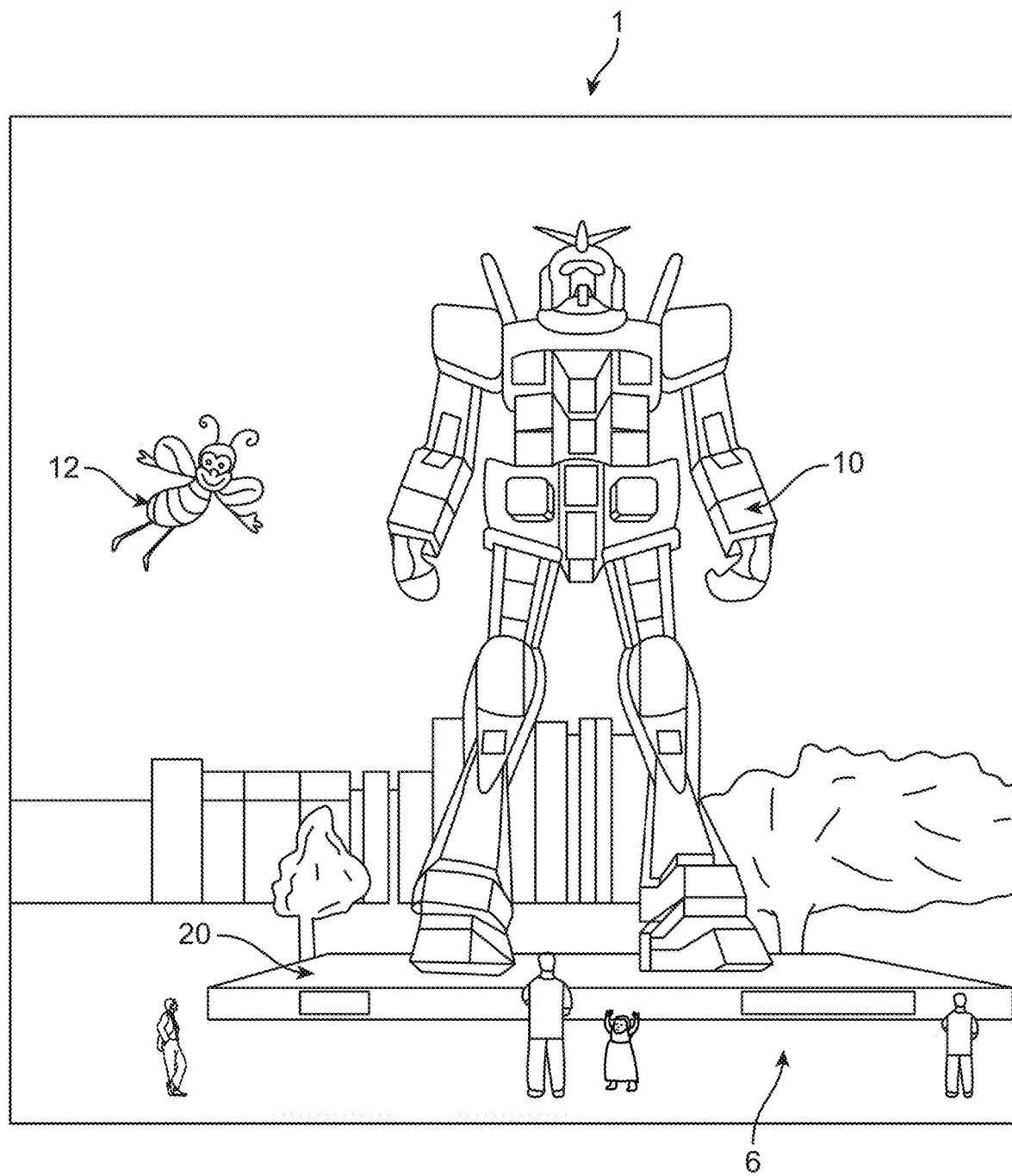
FIG. 1 illustrates a user's view of an AR/MR scene using an example AR system.
Figure 2:
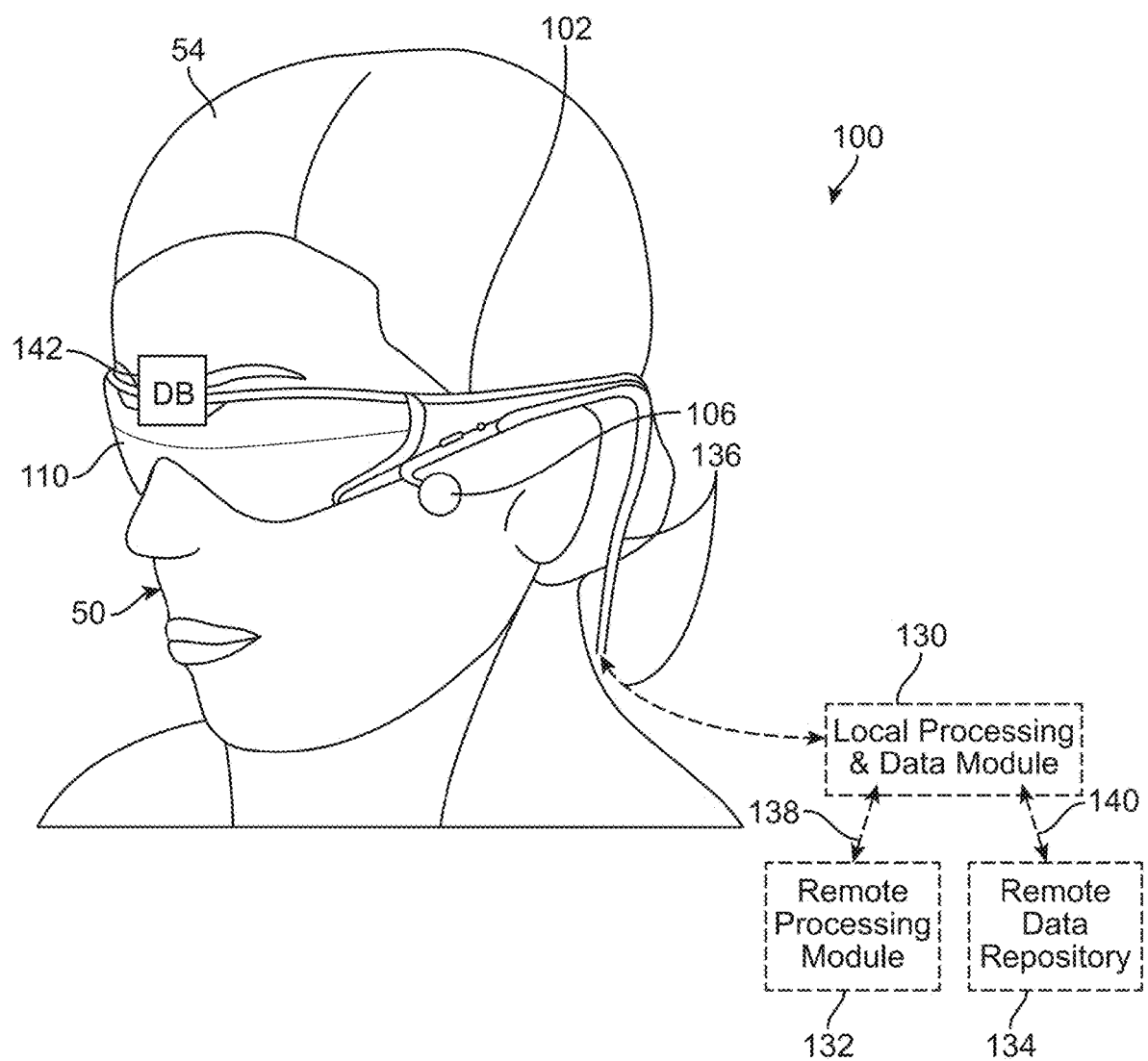
FIGS. 2-5 schematically depict users using VR/AR/MR systems according to some embodiments.
Figure 3:
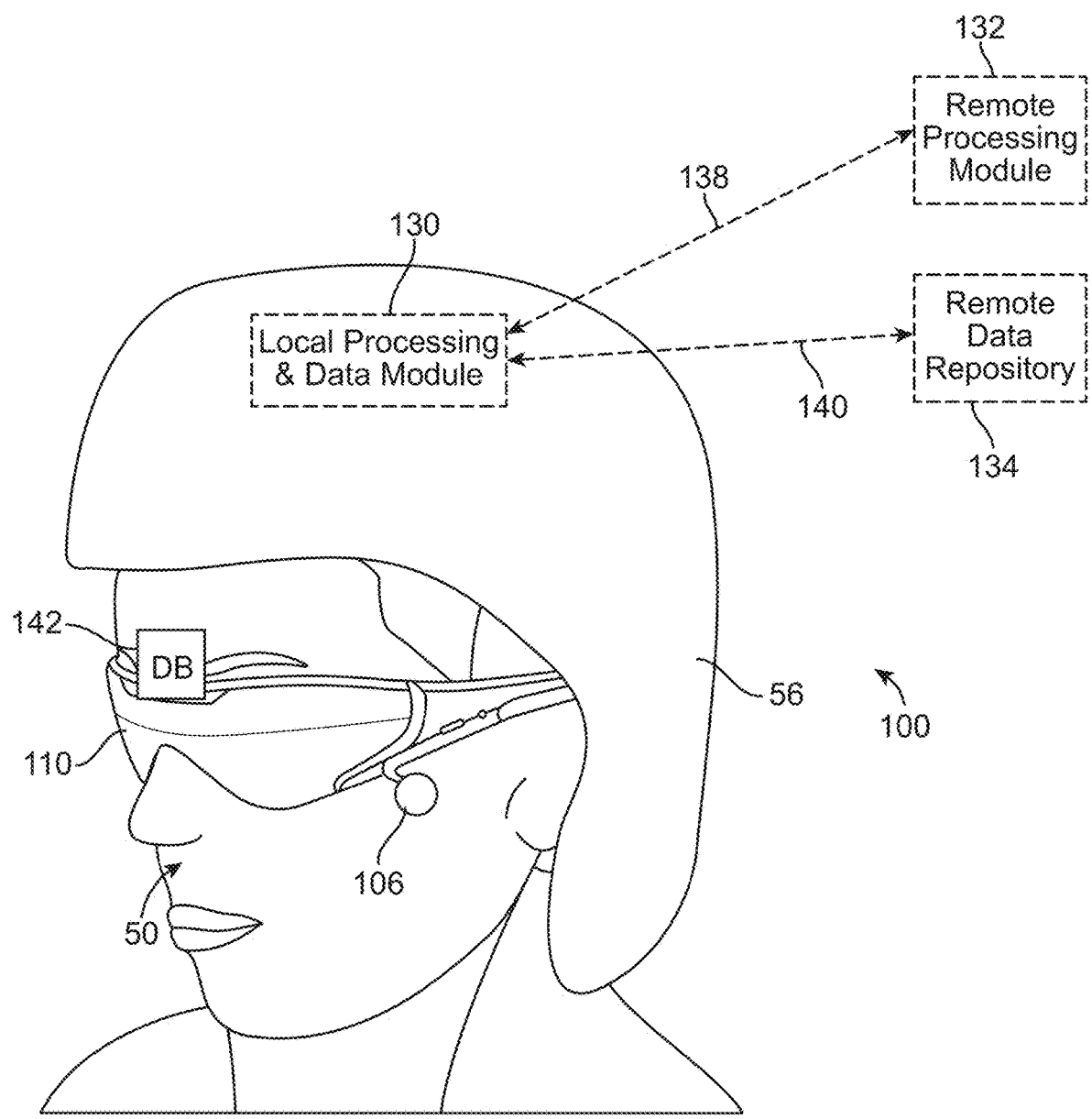
Figure 4:
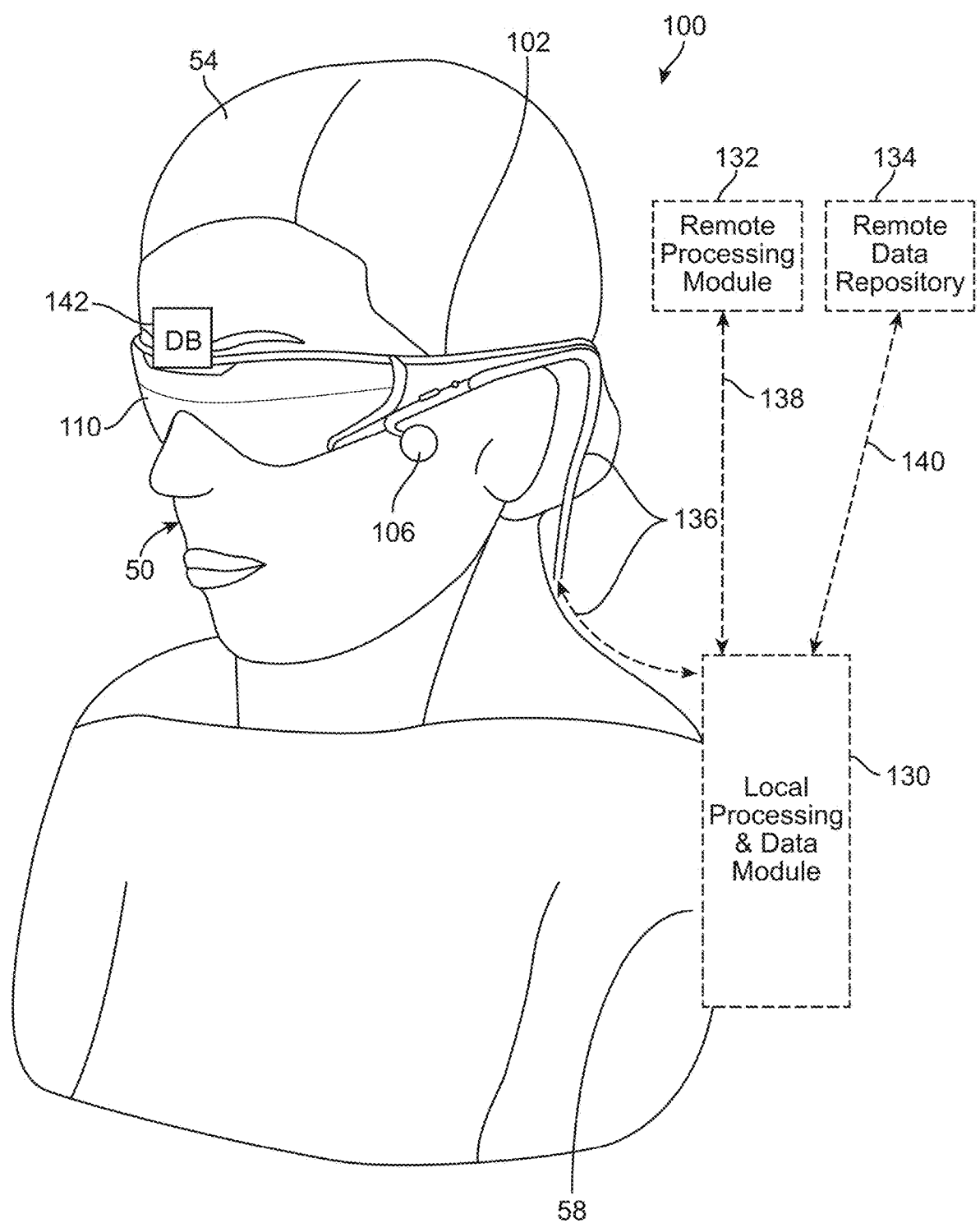

Various embodiments of the disclosure are directed to systems, methods, and articles of manufacture for VR/AR/MR in a single embodiment or in multiple embodiments. Other objects, features, and advantages of the disclosure are described in the detailed description, figures, and claims.

Various embodiments will now be described in detail with reference to the drawings, which are provided as illustrative examples so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Embodiments in accordance with the present disclosure address the problem of implementation of VR/AR/MR systems often rely on combinations of off-the-shelf-components and custom components. In some cases the off-the-shelf components do not possess all of the features or performance characteristics that are needed to implement certain desired aspects of the to-be-deployed VR/AR/MR system. Some embodiments are directed to approaches for adding capabilities and/or repurposing resources to accommodate the desired features or performance characteristics of the to-be-deployed VR/AR/MR system. The accompanying figures and discussions herein present example environments, systems, methods, and computer program products for VR/AR/MR systems.

The head mounted audio-visual display system and power management systems may be implemented independently of AR/MR systems, but some embodiments below are described in relation to AR/MR systems for illustrative purposes only. The power management systems described herein may also be used in a similar manner with VR systems.

Summary of Problems and Solutions

VR/AR/MR system have limitations such as size and portability issues, battery life issues, system overheating issues, processing power, memory, bandwidth, data sources, component latency, and other system and optical challenges, which can negatively impact VR/AR/MR system performance. These limitations elevate the importance of power efficient image rendering.

For example, in some wearables, various components in the image pipeline (e.g., GPU, display bridge, display panels, etc.) consume a significant portion of the system resources (e.g., processing power, memory, bandwidth, battery life). Further, these system resource demands can lead to size and portability issues and the system overheating issues. Moreover, component latency issues can also affect VR/AR/MR system performance. For example, system latency between final warping of rendered image data and display of an image corresponding to the warped image data can result in artifacts as described in U.S. Provisional Patent Application Ser. No. 62/702,238 filed on Jul. 23, 2018 and entitled "MIXED REALITY SYSTEM WITH VIRTUAL CONTENT WARPING AND METHOD OF GENERATING VIRTUAL CONTENT USING SAME," the contents of which are hereby expressly and fully incorporated by reference in their entirety, as though set forth in full.

Power management systems are described in U.S. Utility patent application Ser. No. 15/683,677 filed on Aug. 22, 2018 and entitled "VIRTUAL, AUGMENTED, AND MIXED REALITY SYSTEMS AND METHODS" and U.S. Utility patent application Ser. No. 15/804,356 filed on Nov. 6, 2017 and entitled "VIRTUAL AND AUGMENTED SYSTEMS AND METHODS," the contents of which have been previously incorporated by reference herein. The power management systems described therein include features such as inactivation of depth planes or color fields within depth planes, time domain power management, discrete imaging mode, low power depth plane switching, lower power low latency standby/wakeup, lower power side channel, multiple component low power modes, and reducing power to light sources and/or SLMs, as described in U.S. Utility patent application Ser. No. 15/902,710 filed on Feb. 22, 2018 and entitled "VIRTUAL AND AUGMENTED REALITY SYSTEMS AND METHODS," the contents of which have been previously Incorporated by reference.

The embodiments described herein include power management systems and methods for use with various VR/AR/MR systems. These power management systems and methods reduce the system resources consumed by the image pipeline, thereby addressing many of the above described issues. The embodiments described herein also include virtual image warping systems and methods for use with various VR/AR/MR systems. These virtual image warping systems and methods address some of the above described issues.

Illustrative VR, AR, and/or MR System

The description that follows pertains to illustrative VR, AR, and/or MR systems with which embodiments of various power management systems may be practiced. However, it is to be understood that the embodiments also lends themselves to applications in other types of display systems (including other types of VR, AR, and/or MR systems), and therefore the embodiments are not to be limited to only the illustrative system disclosed herein.

VR/AR/MR systems disclosed herein can include a display which presents computer-generated imagery (video/image data) to a user. In some embodiments, the display systems are wearable, which may advantageously provide a more immersive VR/AR/MR experience. Various components of VR, AR, and/or MR virtual image systems 100 are depicted in FIGS. 2 to 5. The virtual image generation system 100 includes a frame structure 102 worn by an end user 50, a display subsystem 110 carried by the frame structure 102, such that the display subsystem 110 is positioned in front of the eyes of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display subsystem 110 is designed to present the eyes of the end user 50 with light patterns that can be comfortably perceived as augmentations to physical reality, with high-levels of image quality and three-dimensional perception, as well as being capable of presenting two-dimensional content. The display subsystem 110 presents a sequence of frames at high frequency that provides the perception of a single coherent scene.

In the illustrated embodiments, the display subsystem 110 employs "optical see-through" display through which the user can directly view light from real objects via transparent (or semi-transparent) elements. The transparent element, often referred to as a "combiner," superimposes light from the display over the user's view of the real world. To this end, the display subsystem 110 includes a partially transparent display. In some embodiments, the transparent display may be electronically controlled. In some embodiments, the transparent display may include segmented dimming to control transparency of one or more portions of the transparent display. In some embodiments, the transparent display may include global dimming to control transparency of the entirety of the transparent display. The display is positioned in the end user's 50 field of view between the eyes of the end user 50 and an ambient environment, such that direct light from the ambient environment is transmitted through the display to the eyes of the end user 50.

In the illustrated embodiments, an image projection assembly provides light to the partially transparent display, thereby combining with the direct light from the ambient environment, and being transmitted from the display to the eyes of the user 50. The projection subsystem may be an optical fiber scan-based projection device, and the display may be a waveguide-based display into which the scanned light from the projection subsystem is injected to produce, e.g., images at a single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (i.e., one layer is within the cone of confusion of an adjacent layer). Additionally or alternatively, picture elements may be blended across two or more layers to increase perceived continuity of transition between layers in the light field, even if those layers are more sparsely stacked (i.e., one layer is outside the cone of confusion of an adjacent layer). The display subsystem 110 may be monocular or binocular.

The virtual image generation system 100 may also include one or more sensors (not shown) mounted to the frame structure 102 for detecting the position and movement of the head 54 of the end user 50 and/or the eye position and inter-ocular distance of the end user 50. Such sensors may include image capture devices (such as cameras), microphones, inertial measurement units, accelerometers, compasses, GPS units, radio devices, and/or gyros). Many of these sensors operate on the assumption that the frame 102 on which they are affixed is in turn substantially fixed to the user's head, eyes, and ears.

The virtual image generation system 100 may also include a user orientation detection module. The user orientation module detects the instantaneous position of the head 54 of the end user 50 (e.g., via sensors coupled to the frame 102) and may predict the position of the head 54 of the end user 50 based on position data received from the sensors. Detecting the instantaneous position of the head 54 of the end user 50 facilitates determination of the specific actual object that the end user 50 is looking at, thereby providing an indication of the specific virtual object to be generated in relation to that actual object and further providing an indication of the position in which the virtual object is to be displayed. The user orientation module may also track the eyes of the end user 50 based on the tracking data received from the sensors.

The virtual image generation system 100 may also include a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), display bridge chips, display controllers, programmable gate arrays (PGAs), for instance field PGAs (FPGAs), and/or programmable logic controllers (PLUs).

The control subsystem of virtual image generation system 100 may include a central processing unit (CPU), a graphics processing unit (GPU), one or more frame buffers, and a three-dimensional database for storing three-dimensional scene data. The CPU may control overall operation, while the GPU may render frames (i.e., translating a three-dimensional scene into a two-dimensional image) from the three-dimensional data stored in the three-dimensional database and store these frames in the frame buffers. One or more additional integrated circuits may control the reading into and/or reading out of frames from the frame buffers and operation of the image projection assembly of the display subsystem 110.

Figure 5:
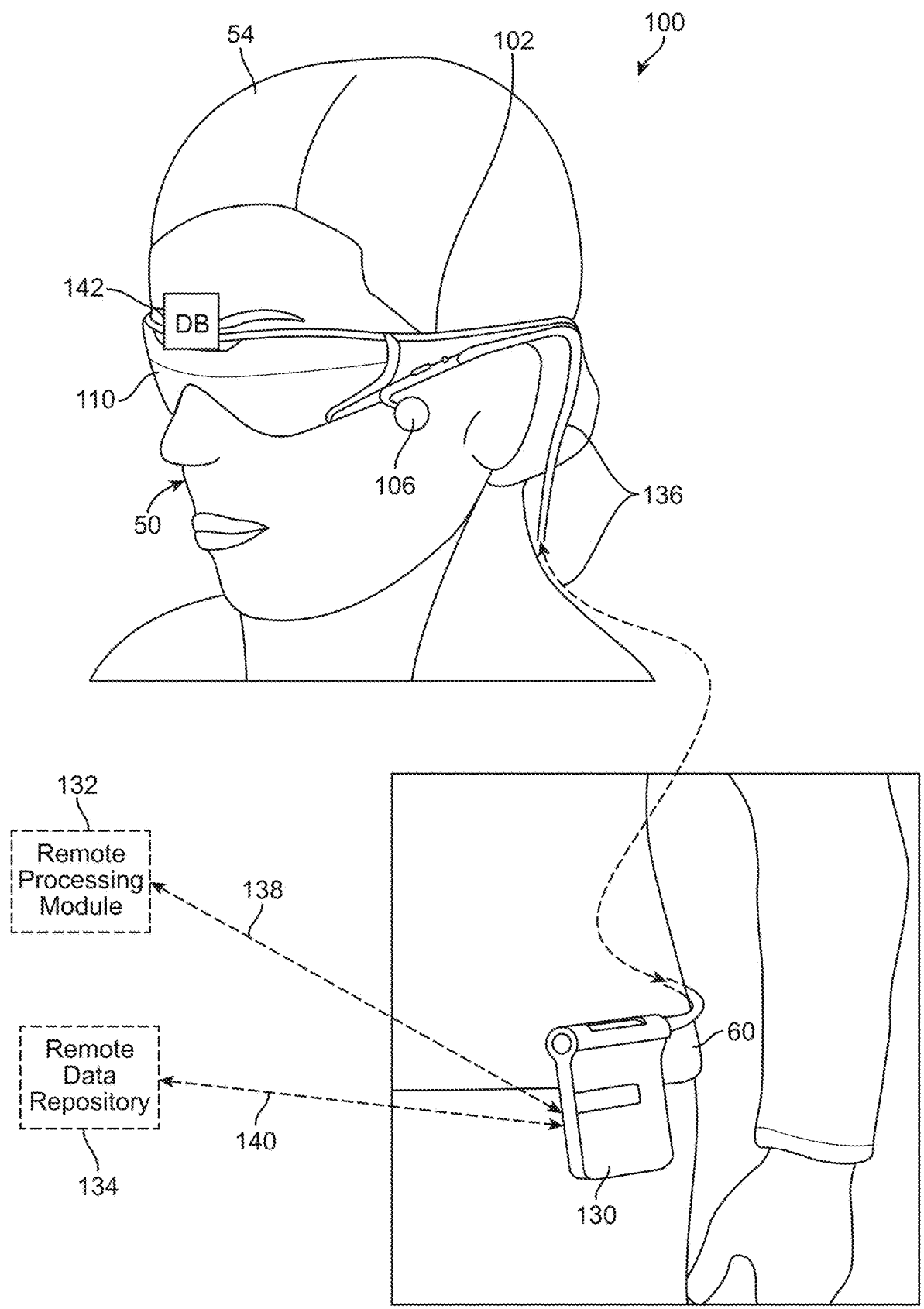

The various processing components of the virtual image generation system 100 may be physically contained in a distributed subsystem. For example, as illustrated in FIGS. 2 to 5, the virtual image generation system 100 may include a local processing and data module 130 operatively coupled, such as by a wired lead or wireless connectivity 136, to a local display bridge 142, the display subsystem 110, and sensors. The local processing and data module 130 may be mounted in a variety of configurations, such as fixedly attached to the frame structure 102 (FIG. 2), fixedly attached to a helmet or hat 56 (FIG. 3), removably attached to the torso 58 of the end user 50 (FIG. 4), or removably attached to the hip 60 of the end user 50 in a belt-coupling style configuration (FIG. 5). The virtual image generation system 100 may also include a remote processing module 132 and remote data repository 134 operatively coupled, such as by a wired lead or wireless connectivity 138, 140, to the local processing and data module 130 and the local display bridge 142, such that these remote modules 132, 134 are operatively coupled to each other and available as resources to the local processing and data module 130 and the local display bridge 142.

The local processing and data module 130 and the local display bridge 142 may each include a power-efficient processor or controller, as well as digital memory, such as flash memory, both of which may be utilized to assist in the processing, caching, and storage of data captured from the sensors and/or acquired and/or processed using the remote processing module 132 and/or remote data repository 134, possibly for passage to the display subsystem 110 after such processing or retrieval. The remote processing module 132 may include one or more relatively powerful processors or controllers configured to analyze and process data and/or image information. The remote data repository 134 may include a relatively large-scale digital data storage facility, which may be available through the internet or other networking configuration in a "cloud" resource configuration. In some embodiments, all data is stored and all computation is performed in the local processing and data module 130 and the local display bridge 142, allowing fully autonomous use from any remote modules.

The couplings 136, 138, 140 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 2 to 5. Thus, the particular choice of wired or wireless communications should not be considered limiting.

In some embodiments, the user orientation module is contained in the local processing and data module 130 and/or the local display bridge 142, while CPU and GPU are contained in the remote processing module. In alternative embodiments, the CPU, GPU, or portions thereof may be contained in the local processing and data module 130 and/or the local display bridge 142. The 3D database can be associated with the remote data repository 134 or disposed locally.

Some VR, AR, and/or MR systems use a plurality of volume phase holograms, surface-relief holograms, or light guiding optical elements that are embedded with depth plane information to generate images that appear to originate from respective depth planes. In other words, a diffraction pattern, or diffractive optical element (DOE) may be embedded within or imprinted/embossed upon a light guiding optical element (LOE; e.g., a planar waveguide) such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2N or 3N stacked LOEs may be used to generate RGB colored images at N depth planes.

In order to present 3-D virtual content to the user, the VR, AR, and/or MR system projects images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Figure 6:
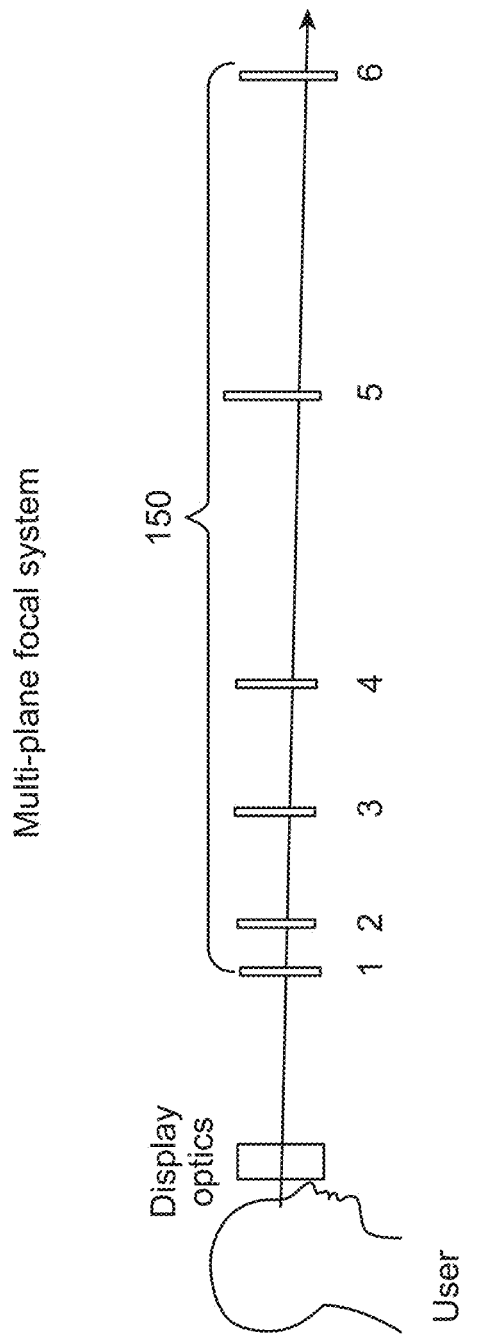
FIG. 6 schematically depicts various planes of a multi-plane focal system according to some embodiments.

Multiple-plane focus systems create a perception of variable depth by projecting images on some or all of a plurality of depth planes located at respective fixed distances in the Z direction from the user's eye. Referring now to FIG. 6, it should be appreciated that multiple-plane focus systems may display frames at fixed depth planes 150 (e.g., the six depth planes 150 shown in FIG. 6). Although MR systems can include any number of depth planes 150, one exemplary multiple-plane focus system has six fixed depth planes 150 in the Z direction. In generating virtual content one or more of the six depth planes 150, 3-D perception is created such that the user perceives one or more virtual objects at varying distances from the user's eye. Given that the human eye is more sensitive to objects that are closer in distance than objects that appear to be far away, more depth planes 150 are generated closer to the eye, as shown in FIG. 6. In other embodiments, the depth planes 150 may be placed at equal distances away from each other.

Depth plane positions 150 may be measured in diopters, which is a unit of optical power equal to the inverse of the focal length measured in meters. For example, in some embodiments, depth plane 1 may be ⅓ diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that other embodiments may generate depth planes 150 at other distances/diopters. Thus, in generating virtual content at strategically placed depth planes 150, the user is able to perceive virtual objects in three dimensions. For example, the user may perceive a first virtual object as being close to him when displayed in depth plane 1, while another virtual object appears at infinity at depth plane 6. Alternatively, the virtual object may first be displayed at depth plane 6, then depth plane 5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3-D view of the coffee cup.

In some embodiments, the VR, AR, and/or MR system may work as a multiple-plane focus system. In other words, all six LOEs may be illuminated simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE retaining collimation of light (e.g., depth plane 6 from FIG. 6) may be utilized. Then an image of a closer tree branch may be injected at time 2 and an LOE configured to create an image appearing to originate from a depth plane 10 meters away (e.g., depth plane 5 from FIG. 6) may be utilized; then an image of a pen may be injected at time 3 and an LOE configured to create an image appearing to originate from a depth plane 1 meter away may be utilized. This type of paradigm can be repeated in rapid time sequential fashion such that the user's eye and brain (e.g., visual cortex) perceives the input to be all part of the same image.

VR, AR, and/or MR systems may project images (i.e., by diverging or converging light beams) that appear to originate from various locations along the Z axis (i.e., depth planes) to generate images for a 3-D experience/scenario. As used in this application, light beams include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

Figure 7:
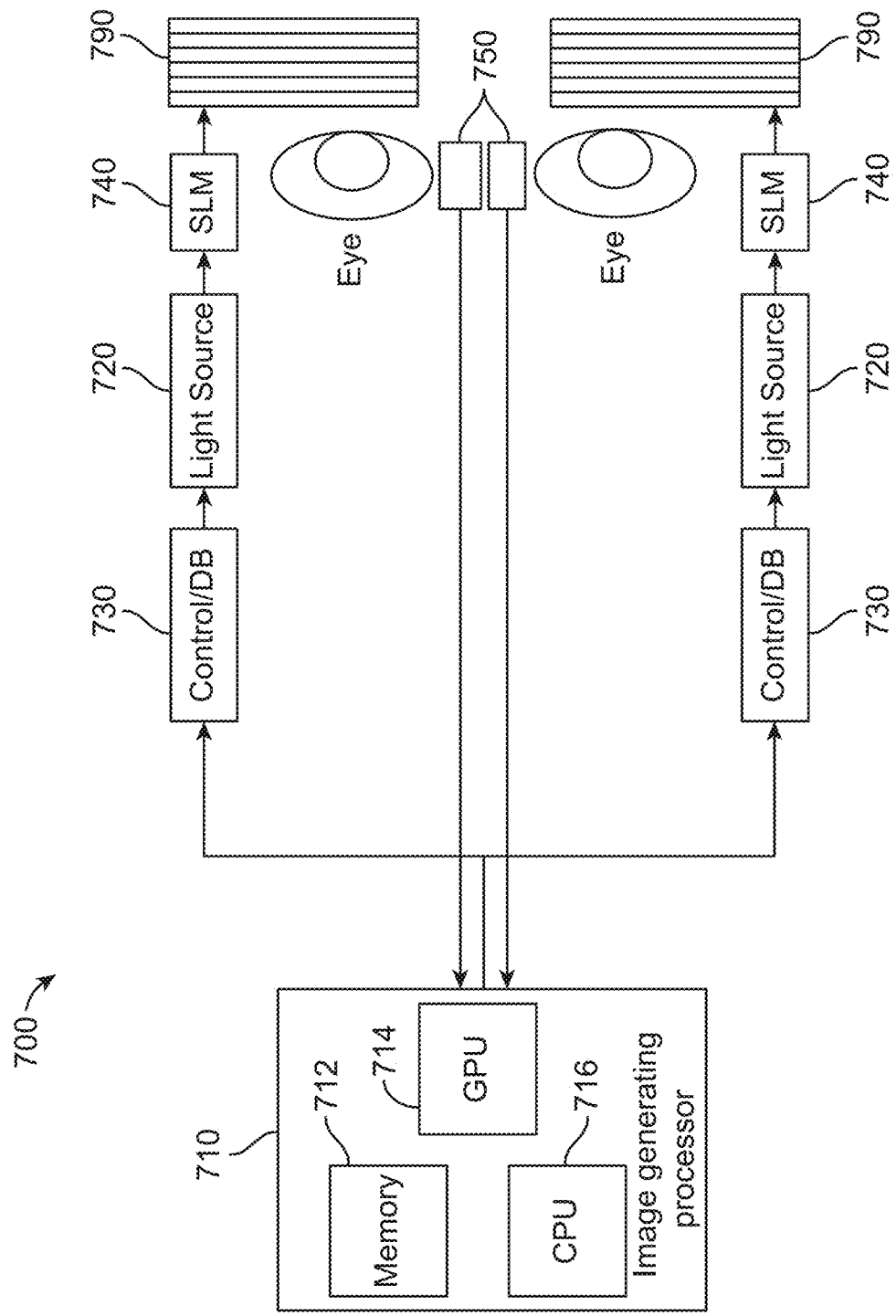
FIG. 7 schematically depicts a VR/AR/MR system according to some embodiments.

Referring now to FIG. 7, an exemplary embodiment of an AR or MR system 700 (hereinafter referred to as "system 700") is illustrated. The system 700 uses stacked light guiding optical element (hereinafter referred to as "LOEs 790"). The system 700 generally includes one or more image generating processors 710, one or more light sources 720, one or more controller/display bridges (DB) 730, one or more spatial light modulators (SLM) 740, and one or more sets of stacked LOEs 790 that function as a multiple plane focus system. The system 700 may also include an eye-tracking subsystem 750.

The image generating processor 710 is configured to generate virtual content to be displayed to the user. The image generating processor 710 may convert an image or video associated with the virtual content to a format that can be projected to the user in 3D. For example, in generating 3D content, the virtual content may need to be formatted such that portions of a particular image are displayed at a particular depth plane while others are displayed at other depth planes. In one embodiment, all of the image may be generated at a particular depth plane. In another embodiment, the image generating processor 710 may be programmed to provide slightly different images to the right and left eyes such that when viewed together, the virtual content appears coherent and comfortable to the user's eyes.

The image generating processor 710 may further include a memory 712, a GPU 714, a CPU 716, and other circuitry for image generation and processing. The image generating processor 710 may be programmed with the desired virtual content to be presented to the user of the system 700. It should be appreciated that in some embodiments, the image generating processor 710 may be housed in the system 700. In other embodiments, the image generating processor 710 and other circuitry may be housed in a belt pack that is coupled to the system 700. In some embodiments, the image generating processor 710, or one or more components thereof, may be a part of a local processing and data module (e.g., local processing and data module 130). As mentioned above, the local processing and data module 130 may be mounted in a variety of configurations, such as fixedly attached to the frame structure 102 (FIG. 2), fixedly attached to a helmet or hat 56 (FIG. 3), removably attached to the torso 58 of the end user 50 (FIG. 4), or removably attached to the hip 60 of the end user 50 in a belt-coupling style configuration (FIG. 5).

The image generating processor 710 is operatively coupled to the light source 720 which projects light associated with the desired virtual content and one or more spatial light modulators 740. The light source 720 is compact and has high resolution. The light source 720 is operatively coupled to a controller/DB 730. The light source 720 may be include color specific LEDs and lasers disposed in various geometric configurations. Alternatively, the light source 720 may include LEDs or lasers of like color, each one linked to a specific region of the field of view of the display. In another embodiment, the light source 720 may include a broad-area emitter such as an incandescent or fluorescent lamp with a mask overlay for segmentation of emission areas and positions. Although the light source 720 is directly connected to the system 700 in FIG. 2B, the light source 720 may be connected to the system 700 via optical fibers (not shown). The system 700 may also include condenser (not shown) configured to collimate the light from the light source 720.

The SLM 740 may be reflective (e.g., an LCOS, an FLCOS, a DLP DMD, or a MEMS mirror system), transmissive (e.g., an LCD) or emissive (e.g. an FSD or an OLED) in various exemplary embodiments. The type of SLM 740 (e.g., speed, size, etc.) can be selected to improve the creation of the 3D perception. While DLP DMDs operating at higher refresh rates may be easily incorporated into stationary systems 700, wearable systems 700 may use DLPs of smaller size and power. The power of the DLP changes how 3D depth planes/focal planes are created. The image generating processor 710 is operatively coupled to the SLM 740, which encodes the light from the light source 720 with the desired virtual content. Light from the light source 720 may be encoded with the image information when it reflects off of, emits from, or passes through the SLM 740.

Light from the SLM 740 is directed to the LOEs 790 such that light beams encoded with image data for one depth plane and/or color by the SLM 740 are effectively propagated along a single LOE 790 for delivery to an eye of a user. Each LOE 790 is configured to project an image or sub-image that appears to originate from a desired depth plane or FOV angular position onto a user's retina. The light source 720 and LOEs 790 can therefore selectively project images (synchronously encoded by the SLM 740 under the control of controller/DB 730) that appear to originate from various depth planes or positions in space. By sequentially projecting images using each of the light source 720 and LOEs 790 at a sufficiently high frame rate (e.g., 360 Hz for six depth planes at an effective full-volume frame rate of 60 Hz), the system 700 can generate a 3D image of virtual objects at various depth planes that appear to exist simultaneously in the 3D image.

The controller/DB 730 is in communication with and operatively coupled to the image generating processor 710, the light source 720 and the SLM 740 to coordinate the synchronous display of images by instructing the SLM 740 to encode the light beams from the light source 720 with appropriate image information from the image generating processor 710. While the system includes an image generating processor 710, the controller/DB 730, in some embodiments, may also perform at least some image generating processes including, for example, the processes of the memory 712, the GPU 714, and/or the CPU 716. In some embodiments, the controller/DB 730 may include one or more components shown in the image generating processor 710, such as, for example, the memory 712, the GPU 714, and/or the CPU 716.

The system 700 also includes an optional eye-tracking subsystem 750 that is configured to track the user's eyes and determine the user's focus. In one embodiment, the system 700 is configured to illuminate a subset of LOEs 790, based on input from the eye-tracking subsystem 750 such that the image is generated at a desired depth plane that coincides with the user's focus/accommodation. For example, if the user's eyes are parallel to each other, the system 700 may illuminate the LOE 790 that is configured to deliver collimated light to the user's eyes, such that the image appears to originate from optical infinity. In another example, if the eye-tracking subsystem 750 determines that the user's focus is at 1 meter away, the LOE 790 that is configured to focus approximately within that range may be illuminated instead.

Figure 8:
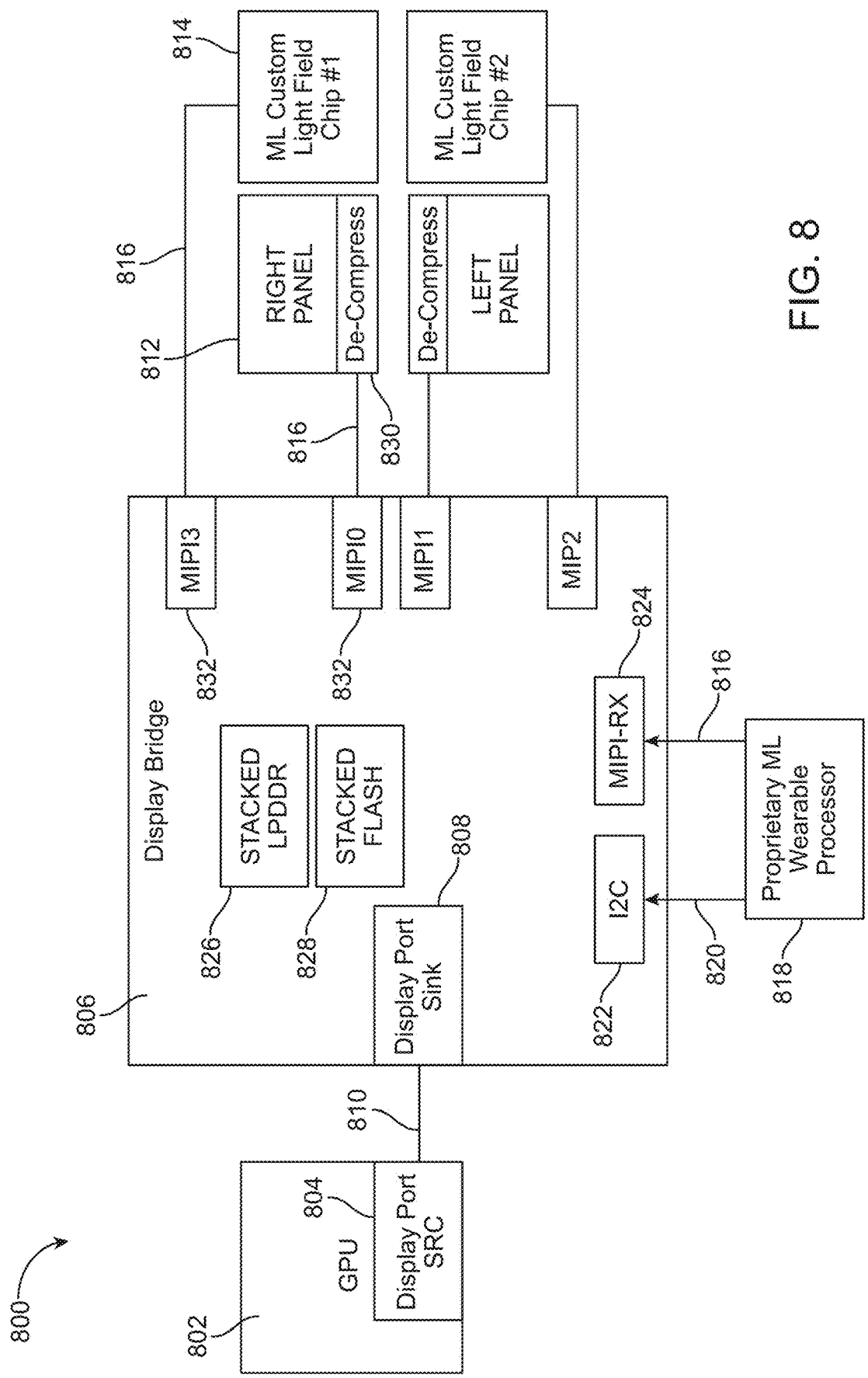
FIG. 8 schematically depicts image generating components of a VR/AR/MR system according to some embodiments.

FIG. 8 schematically depicts image generating components of a VR/AR/MR system 800, according to some embodiments. The VR/AR/MR system 800 includes a graphics processing unit (GPU) 802 having a display port (DP) source 804 and coupled to a display bridge (DB) 806 having a DP sink 808 via a DP link 810. The GPU 802 may be located in a belt pack of the VR/AR/MR system 800, the DB 806 may be located in a wearable component of the VR/AR/MR system 800, and the DP link 810 may be a fiber-optic link. In some embodiments, the DP link 810 may be a PCIE link or other, for example, proprietary, high speed link. In some embodiments, the GPU 802 and the DB 806 may both be in the belt pack of the VR/AR/MR system 800. In some embodiments, the GPU 802 and the DB 806 may both be in the wearable component of the VR/AR/MR system 800. In some embodiments, the DB 806 may include the GPU 802. The DB 806 is also coupled to left and right display panels 812 and left and right light field chips 814 via four MIPI links 816. In some embodiments, the MIPI links 816 may be a DP link, a PCIE link, or other, for example, proprietary, high speed link. In these embodiments, the DB 806, the left and right display panels 812, and the left and right field chips 814 may include the appropriate ports for the link. The DB 806 may also be coupled to a wearable processor 818 via a MIPI link 816 and an I2C or SPI connector 820 (coupled to a/n MIPI/I2C 822 or SPI receiver 824 in the DB 806). The MIPI link 816 in the system 800 (i.e., between the DB 806 and the left and right display panels 812, the left and right light field chips 814, and the wearable processor 818) are coupled to MIPI transmitters 832 and MIPI receivers 824 in the sending and receiving components. The MIPI link 816 may include one or more data lanes (e.g., four video data lanes) and a clock lane. The DB 806 also includes memory 826 (e.g., stacked low-power DDR memory or embedded DRAM) and memory 828 (e.g., stacked flash memory). The left and right display panels 812 also include respective left and right decompression engines 830. In some embodiments, the DB 806 may include a video processor (e.g., a pixel engine) for pixel manipulation. The video processor customizes data received through data streams (e.g., video streams from the GPU 802) for primary panels (e.g., left and right panels 812 and/or the left and right light field chips 814).

Figure 8A:
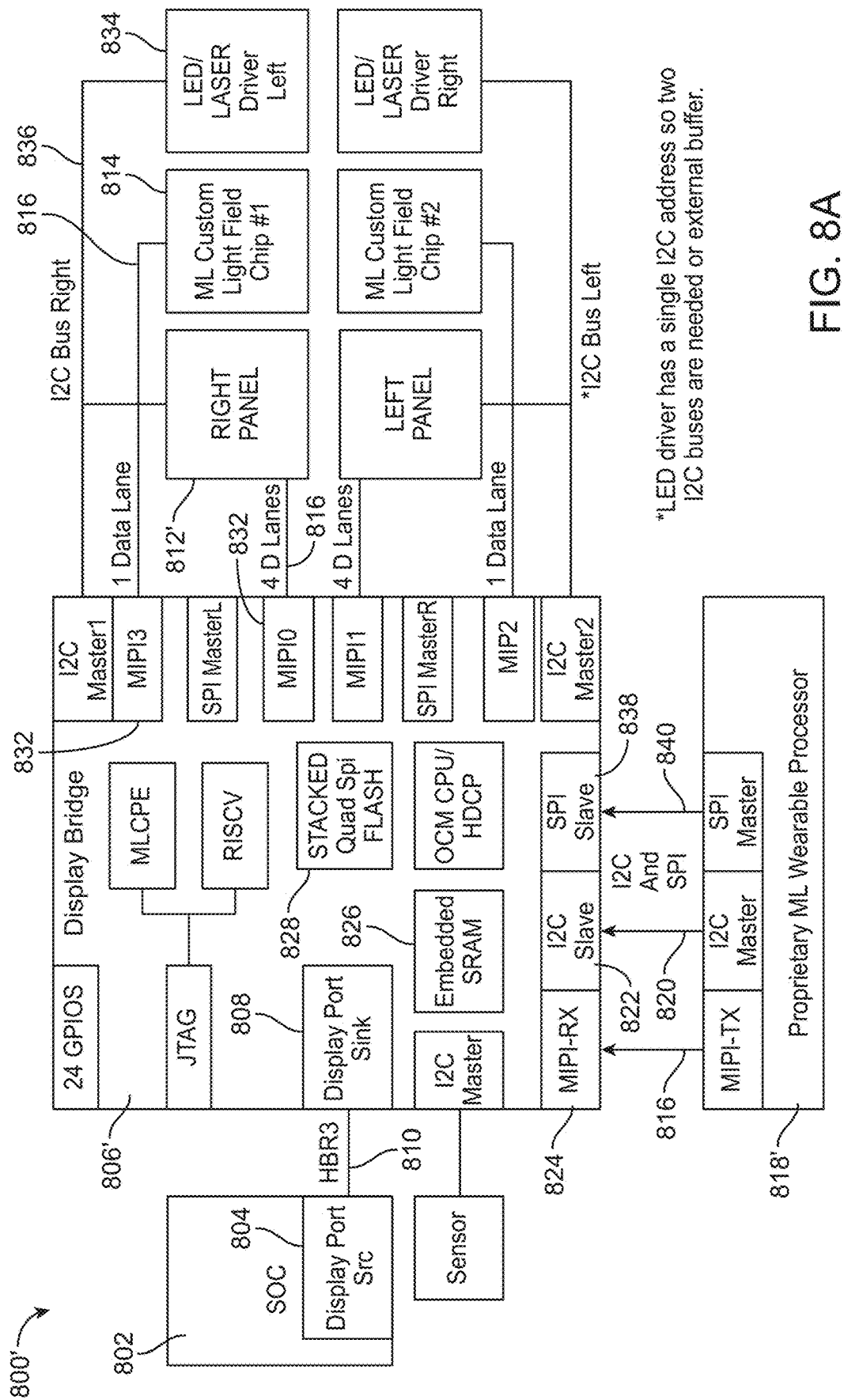
FIG. 8A schematically depicts image generating components of a VR/AR/MR system according to some embodiments.

FIG. 8A schematically depicts image generating components of a VR/AR/MR system 800', according to some embodiments. The VR/AR/MR system 800' depicted in FIG. 8A includes many of the components of the VR/AR/MR system 800 depicted in FIG. 8. The VR/AR/MR system 800' includes a graphics processing unit (GPU) 802 having a display port (DP) source 804 and coupled to a display bridge (DB) 806' having a DP sink 808 via a DP link 810. The DB 806' is also coupled to left and right display panels 812' and left and right light field chips 814' via four MIPI links 816. In some embodiments, the DB 806' may be coupled to the left and right display panels 812' and left and right light field chips 814' via SPI and/or I2C connectors. In addition, DB 806' is further coupled to left and right LED/LASER Drivers 834 via left and right buses (e.g., I2C Buses) 836. The left and right buses 836 also couple both the DB 806' and the left and right LED/LASER Drivers 834 to the left and right display panels 812'. The DB 806' may also be coupled to a wearable processor 818' via a MIPI link 816, an I2C connector 820, and/or an SPI connector 838, which may be coupled to an MIPI receiver 824, an I2C receiver 822, or an SPI receiver 840 in the DB 806'. The DB 806' also includes memory 826 (e.g., embedded SRAM) and memory 828 (e.g., stacked quad SPI flash memory).

The MIPI links 816 described above may have bidirectional capability (e.g., for returning read data, acknowledgment, and/or error information from the left and right display panels 812, 812' to the DB 806, 806'). Lane0 of the MIPI links 816 may be used for transmission to the DB 806, 806', while the other lanes may be unidirectional. The MIPI links 816 may be used for transmission to the DB 806, 806' during low power transmission mode for the DB 806, 806' to initiate Generic Reads from the left and right display panels 812, 812'.

Figure 9:
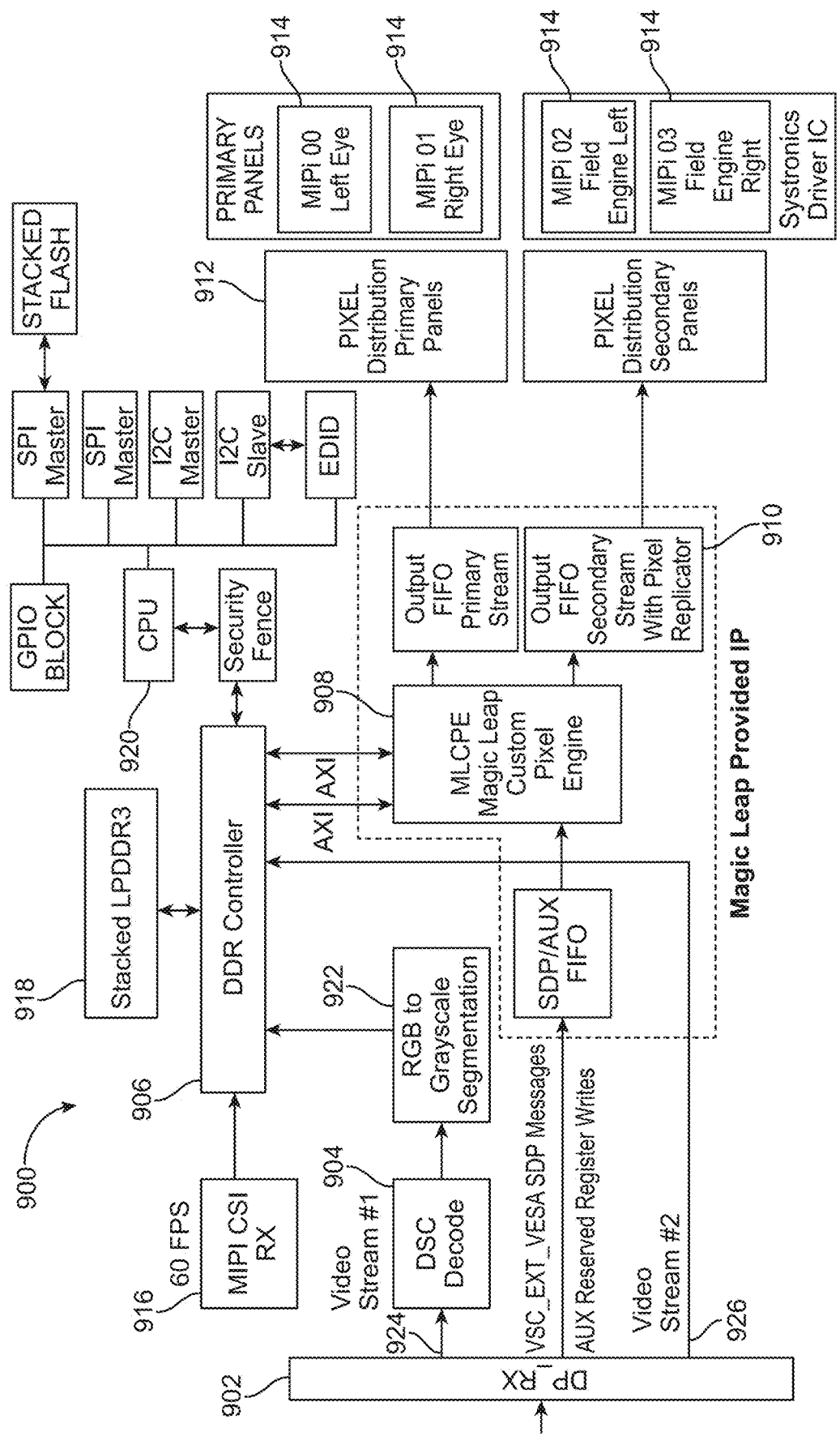
FIG. 9 schematically depicts a display bridge for use with VR/AR/MR systems according to some embodiments.

FIG. 9 schematically depicts a DB 900 for use with VR/AR/MR systems, according to some embodiments. The DB 900 includes a DP receiver 902 configured to receive one or more streams of image data. The DP receiver 902 is communicatively coupled to a DSC decoder 904, a DDR controller 906, a pixel engine 908, an output FIFO primary and secondary streams 910, and pixel distribution primary and secondary panels ("PIXEL distribution modules") 912, which are in turn communicatively coupled to four MIPI channels 914. The DB 900 also includes a MIPI receiver 916, memory 918 (e.g., a low-power DDR stacked die), a CPU module 920, and an RGB to grayscale segmentation block 922, which are all communicatively coupled to the DDR controller 906. The RGB to grayscale segmentation block 922 receives data from the DSC decoder 904 and sends output to the memory 918' as described herein. DB 900 is configured to process two video streams. A first video stream 924 is processed by the DSC decoder 904 and the RGB to grayscale segmentation block 922, and then sent to the DDR controller 906 for writing to memory 918. A second video stream 926 is sent directly from the DP receiver 902 to the DDR controller 906 for writing to memory 918.

Figure 9A:
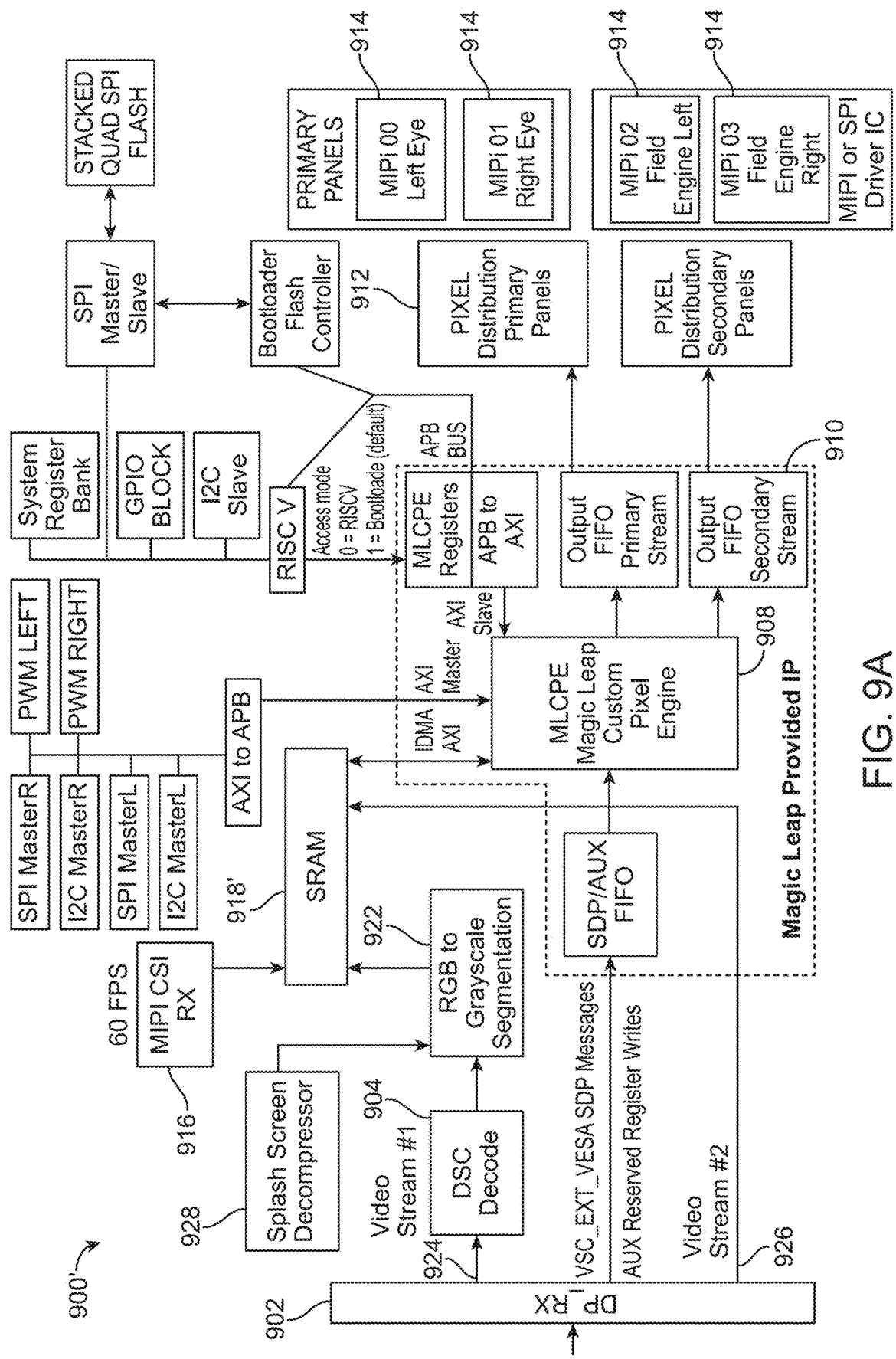
FIG. 9A schematically depicts a display bridge for use with VR/AR/MR systems according to some embodiments.

FIG. 9A schematically depicts a DB 900' for use with VR/AR/MR systems, according to some embodiments. The DB 900' depicted in FIG. 9A includes many of the components of the DB 900 depicted in FIG. 9. The DB 900' includes a DP receiver 902 configured to receive one or more streams of image data. The DP receiver 902 is communicatively coupled to a DSC decoder 904, a pixel engine 908, an output FIFO primary and secondary streams 910, and pixel distribution primary and secondary panels 912, which are in turn communicatively coupled to four MIPI channels 914. The DB 900' also includes a MIPI receiver 916 and an RGB to grayscale segmentation block 922, which are both coupled to a memory 918' (e.g., an SRAM). The RGB to grayscale segmentation block 922 receives data from the DSC decoder 904 and sends output to the memory 918' as described herein. The DB 900' further includes a splash screen decompressor 928 coupled to the memory 918'. DB 900' is configured to process two video streams. A first video stream 924 is processed by the DSC decoder 904 and the RGB to grayscale segmentation block 922, and then written to memory 918'. A second video stream 926 is sent directly from the DP receiver 902 to be written to memory 918'.

Figure 10:
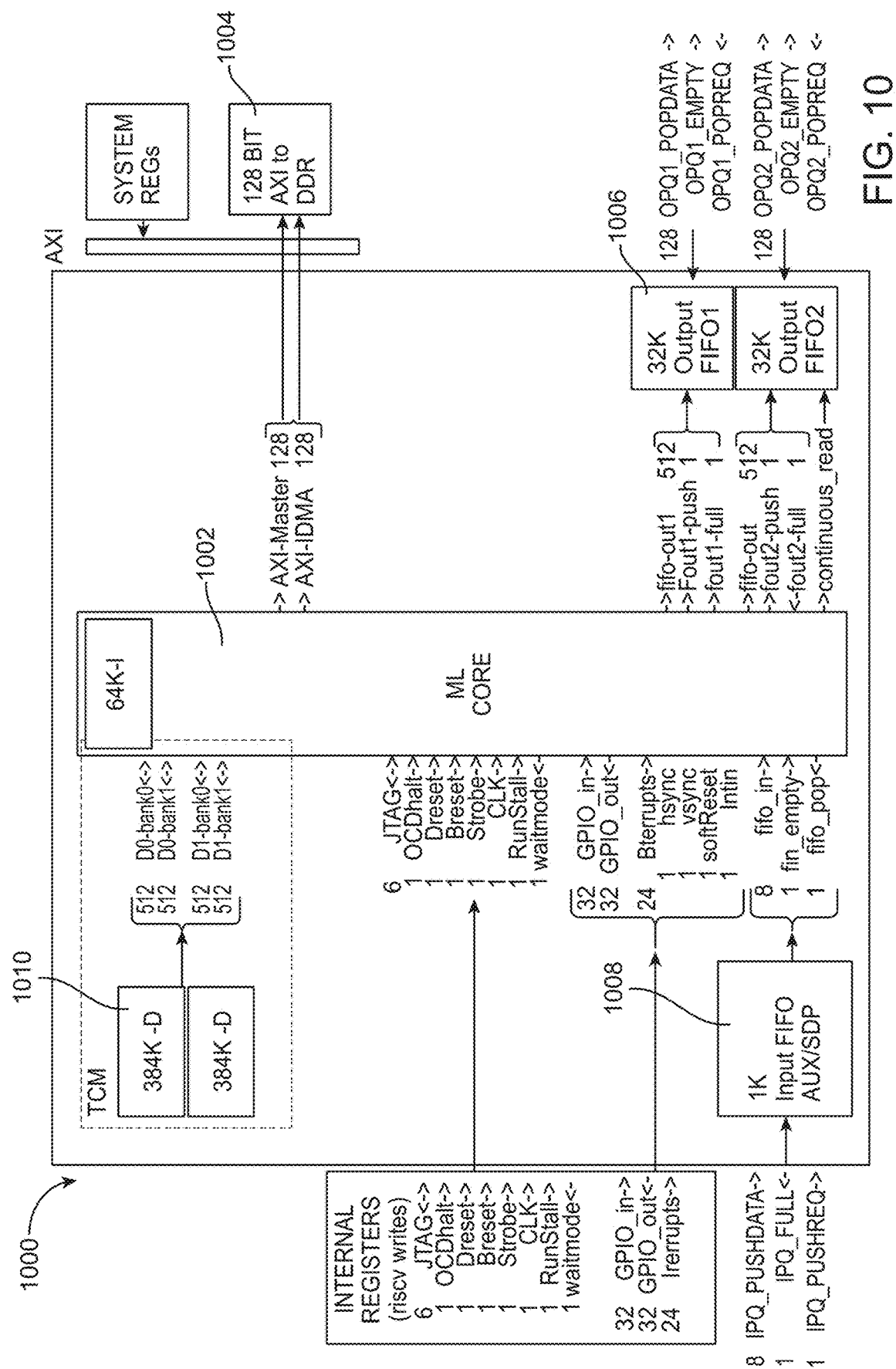
FIG. 10 schematically depicts a pixel engine for use with display bridges of VR/AR/MR systems according to some embodiments.

FIG. 10 schematically depicts a pixel engine 1000 for use with DBs, according to some embodiments. The pixel engine 1000 includes a core 1002 that executes code for color fields and generates pixels for display based on input parameters. The pixel engine 1000 reads information for the color fields from memory (e.g., low-power DDR) and generates pixels (e.g., one output line at a time). The core 1002 is programmable and may include SRAM and instruction RAM. The core 1002 may also have an AXI communication channel 1004 (e.g., to communicate with the memory), a pair of FIFO outputs 1006 (e.g., to communicate with displays and light field chips), a secondary data packet/auxiliary data first in first out (SDP/AUX FIFO) input 1008 (e.g., to communicate with a DP source), and a dual bank of tightly coupled SRAM 1010 to contain pixel data for processing. In some embodiments, the pixel engine 1000 may be responsible for compensating for optical distortion related to optics and projectors, performing continuous warp reprojection, frame rate expansion, dynamic occlusion, segmented foveation blending, pixelated dimming control, pixel chromatic aberration correction, partial display support, custom dark and partial dark modes, content uncollapsing, and many other AR/VR algorithms using a vector engine, for example with custom instructions. In some embodiments, the pixel engine 1000 calculates head-pose updates directly from sensors communicatively coupled to the DB (e.g., DB 806) or sensor data provided by the wearable processor 818.

Figure 10A:
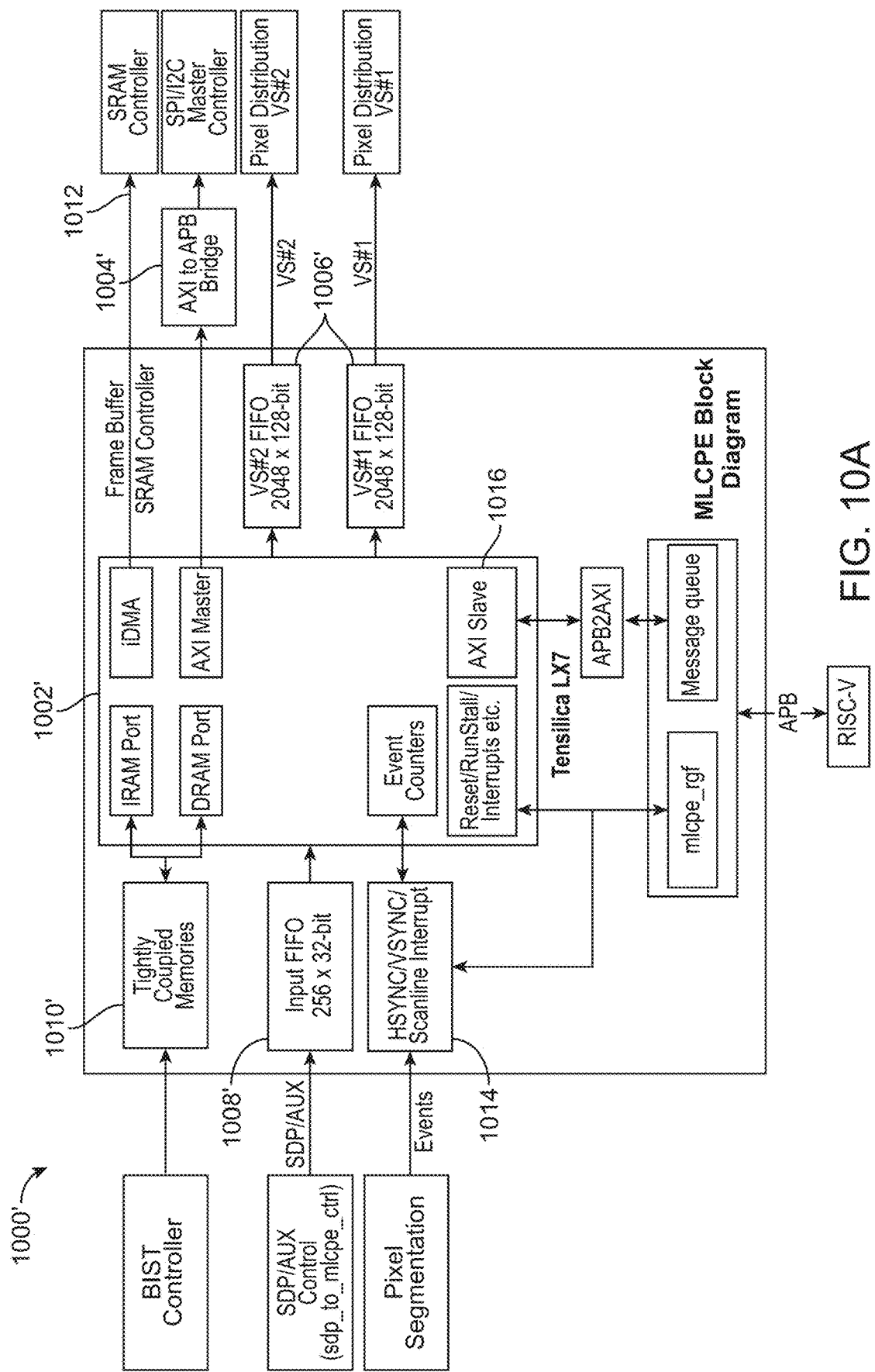
FIG. 10A schematically depicts a pixel engine for use with display bridges of VR/AR/MR systems according to some embodiments.

FIG. 10A schematically depicts a pixel engine 1000' for use with DBs, according to some embodiments. The pixel engine 1000' includes a core 1002' that executes code for color fields and generates pixels for display based on input parameters. The pixel engine 1000' reads information for the color fields from memory (e.g., low-power DDR or SRAM) and generates pixels (e.g., one output line at a time). The core 1002' is programmable and may include SRAM and instruction RAM. The core 1002' may also have an AXI communication channel 1004' (e.g., to communicate with the memory), a pair of FIFO outputs 1006' (e.g., to communicate with displays and light field chips), a secondary data packet/auxiliary data first in first out (SDP/AUX FIFO) input 1008' (e.g., to communicate with a DP source), and a dual bank of tightly coupled SRAM 1010' to contain pixel data for processing. The tightly coupled SRAM 1010' reduces the need to communicate with the other memory in the system. Further, the core 1002' may have a connection 1012 to an SRAM controller and an HSYNC/VSYNC/Scanline Interrupt 1014 (e.g., to receive input from a pixel segmentation block). Moreover, the core 1002' may include an APB register bank, an APB to AXI slave port 1018, and SPI/I2C master ports. The APB to AXI slave port 1018 may be used to copy firmware from flash memory to the DB.

In some embodiments, the pixel engine 1000' may be responsible for compensating for optical distortion related to optics and projectors, performing continuous warp reprojection, frame rate expansion, dynamic occlusion, segmented foveation blending, pixelated dimming control, pixel chromatic aberration correction, partial display support, custom dark and partial dark modes, content uncollapsing, and many other AR/VR algorithms using a vector engine, for example with custom instructions. In some embodiments, the pixel engine 1000' calculates head-pose updates directly from sensors communicatively coupled to the DB (e.g., DB 806) or sensor data provided by the wearable processor 818.

Figure 11:
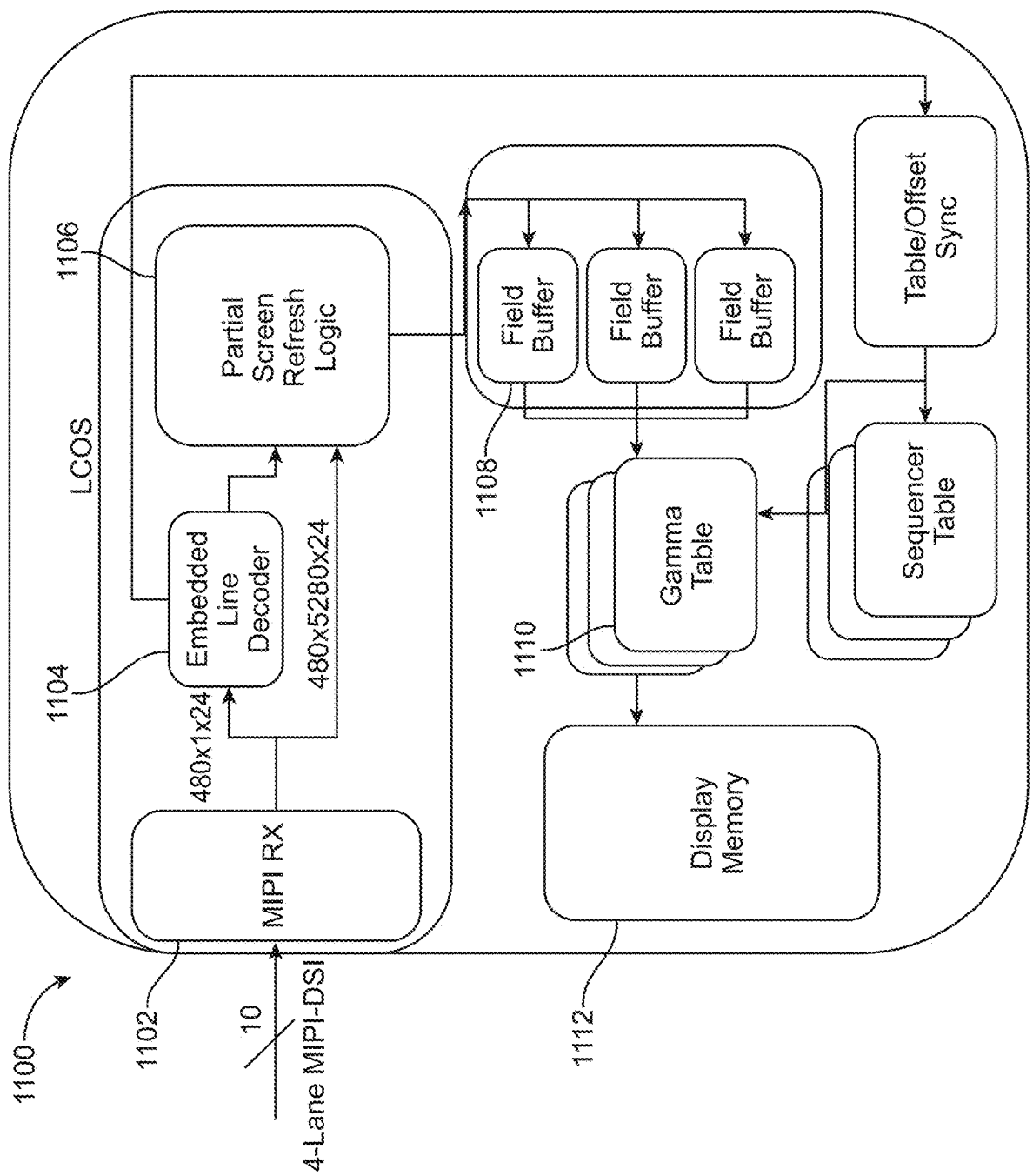
FIG. 11 schematically depicts a display panel for use with VR/AR/MR systems according to some embodiments.

FIG. 11 schematically depicts a display panel 1100 for use with VR/AR/MR systems, according to some embodiments. The display panel 1100 includes a MIPI receiver 1102, communicatively coupled to an embedded line decoder 1104, a partial screen refresh logic 1106, various buffers 1108, various gamma correction modules 1110, and display memory 1112. The MIPI receiver 1102 may be configured to operate with a MIPI DSI-2 interface, a DP link interface, and/or other, for example, proprietary, serial link, with one or more data lanes (e.g., four video data lanes) and one clock lane. The MIPI receiver 1102 may have various features including burst mode with synchronization events, clock to lane de-skewing, and manual configuration of resolution/timing via registers. The embedded line decoder 1104 may be configured to read the first line of frame data to extract data embedded therein. The embedded data may define the operating mode and format for the frame. The partial screen refresh logic 1104 may be configured to operate in two modes, i.e., blank screen and partial display (both described below). The buffers 1108 may have a maximum latency of one color field. Gamma correction modules 1110 may support a gamma table to transform 8-bit input video to 10 bit output. The display panel 1100 may include a table/offset synchronization module and a sequencer table.

Image Data Formats

Segmented Color Sequential Format

Figure 12:
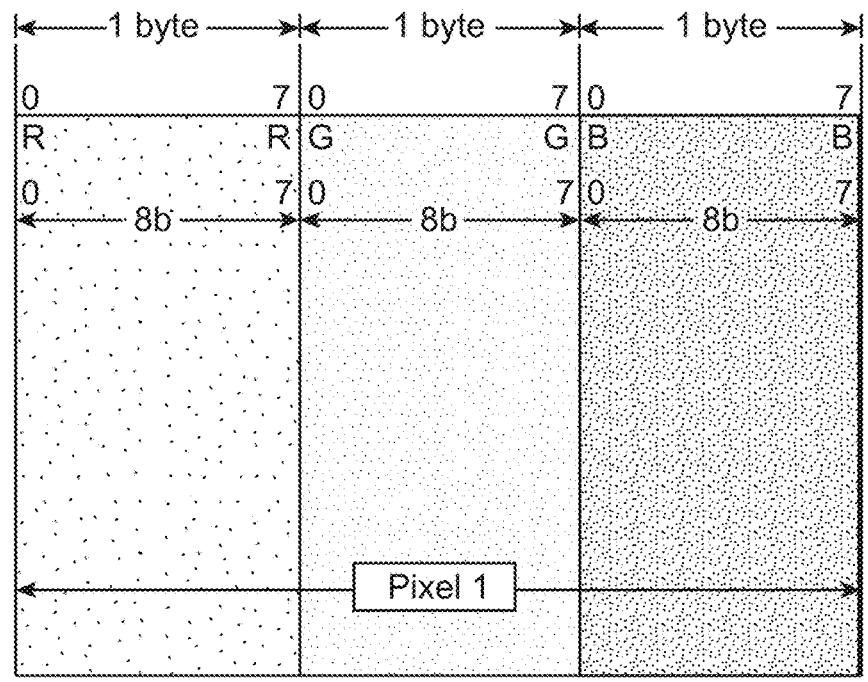
FIG. 12 schematically depicts two input data formats for use with VR/AR/MR systems according to some embodiments.
Figure 12:
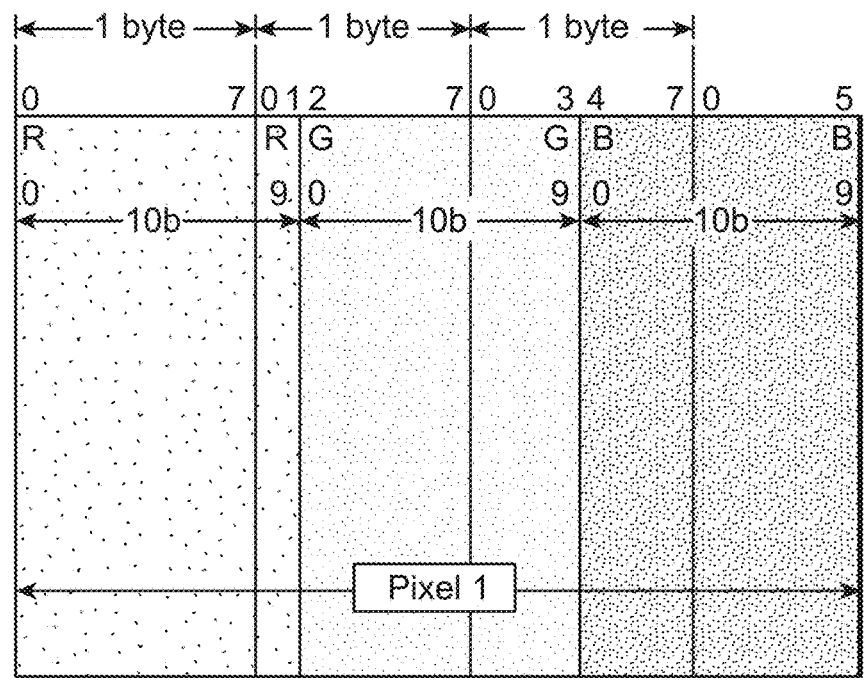

FIG. 12 schematically depicts two input data formats that may be supported by the DP port (see e.g., DP SRC 804 and DP sink 808 in FIGS. 8 and 8A). The top data format 1200 is RGB 24-bit color (8 bits per field) and the bottom data format 1202 is RGB 30 bit color (10 bits per field). The input data may have been display stream compression (DSC) compressed. The DP port may also support sequential grayscale data format (described below).

Figure 13:
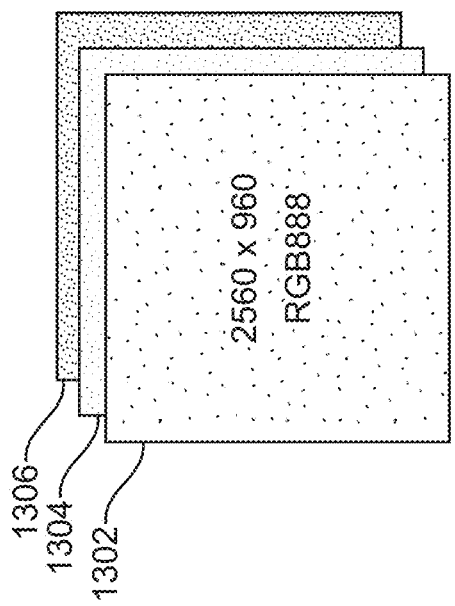
FIG. 13 schematically depicts a color image data format for use with VR/AR/MR systems according to some embodiments.
Figure 13:
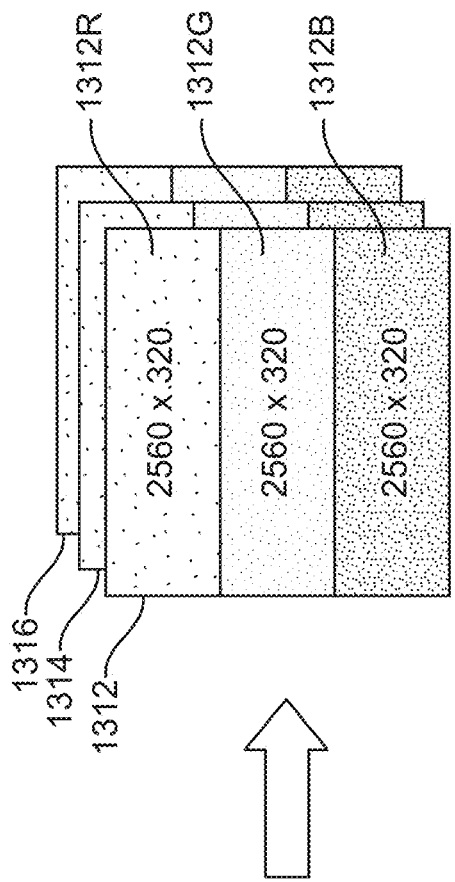

FIG. 13 schematically depicts a color image data format for use with VR/AR/MR systems, according to some embodiments. In this color image data format, color image data (e.g., 24-bit or 30 bit RGB data) that is typically organized into three primary color fields 1302, 1304, 1306 is reorganized into three images 1312, 1314, 1316. Each of the three images 1312, 1314, 1316 is divided into thirds, each third including a partial color field (e.g. 1312R, 1312G, 1312B).

Color Sequential Grayscale Format

The color image data is generated in a GPU and reorganize into the three images 1312, 1314, 1316. The three images 1312, 1314, 1316 can be sent from the GPU to a DB via a DP. The reorganization of the color image data into the three images 1312, 1314, 1316 results in portions of each color field (e.g., partial color fields 1312R, 1312G, 1312B) arriving at the DB earlier in the image pipeline. This earlier access to image data may enable the DB to begin work on the image data earlier than in image pipelines without re-organized color image data.

Figure 14:
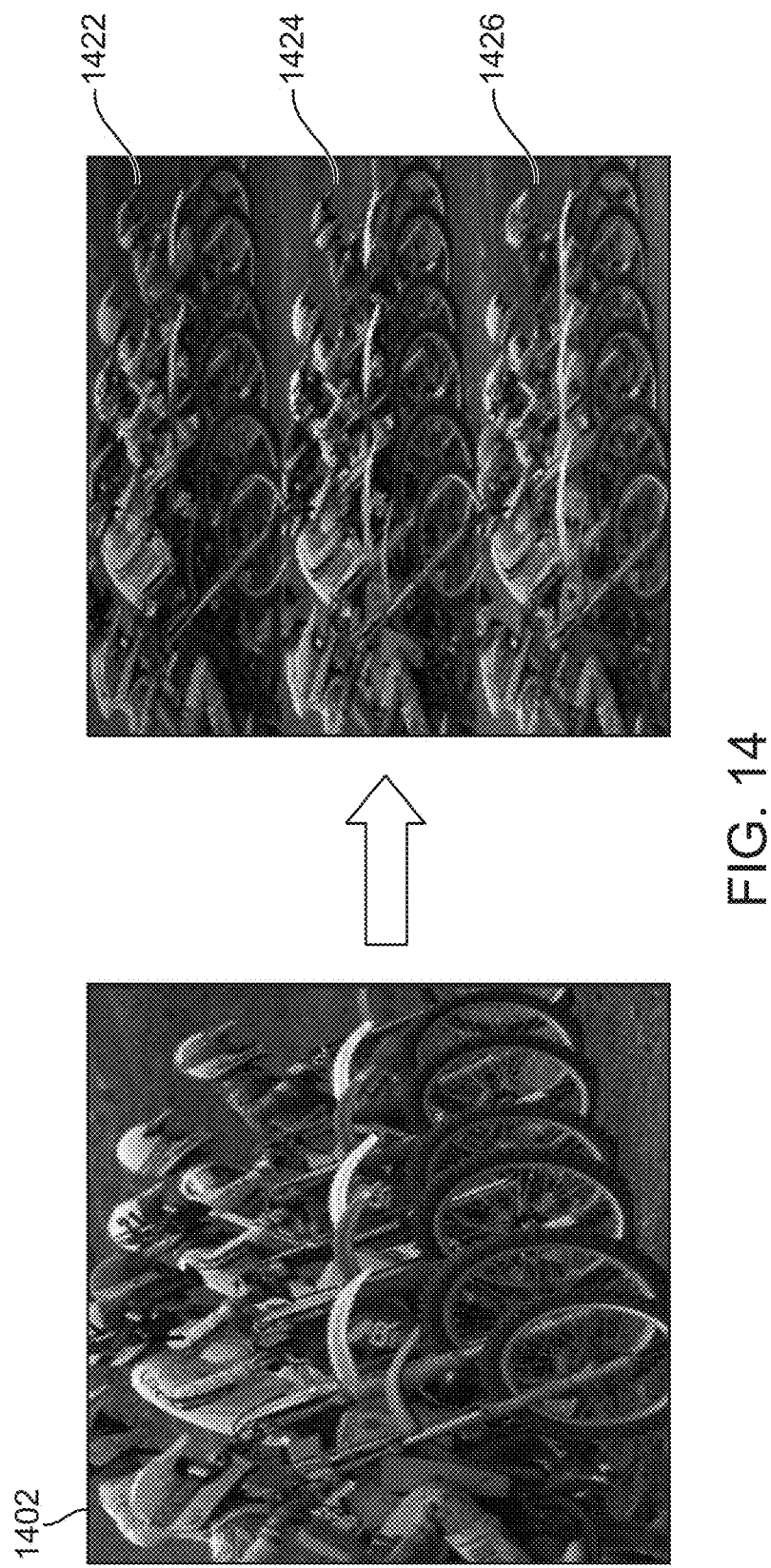
FIG. 14 schematically depicts a grayscale image data format for use with VR/AR/MR systems according to some embodiments FIG. 15 schematically depicts color segmentation of color image data for use with VR/AR/MR systems according to some embodiments.

FIG. 14 schematically depicts a color image 1402 that has been reorganized into three partial color fields. In addition, the three partial color fields have been converted to three sequential grayscale images 1422, 1424, 1426. The position of the three sequential grayscale images 1422, 1424, 1426 is used to encode the color of each partial field. Converting the color fields to grayscale may reduce the amount of data transmitted from the GPU to the DB. Conversion to grayscale may occur at the GPU or the DB.

Color Segmentation

Figure 15:
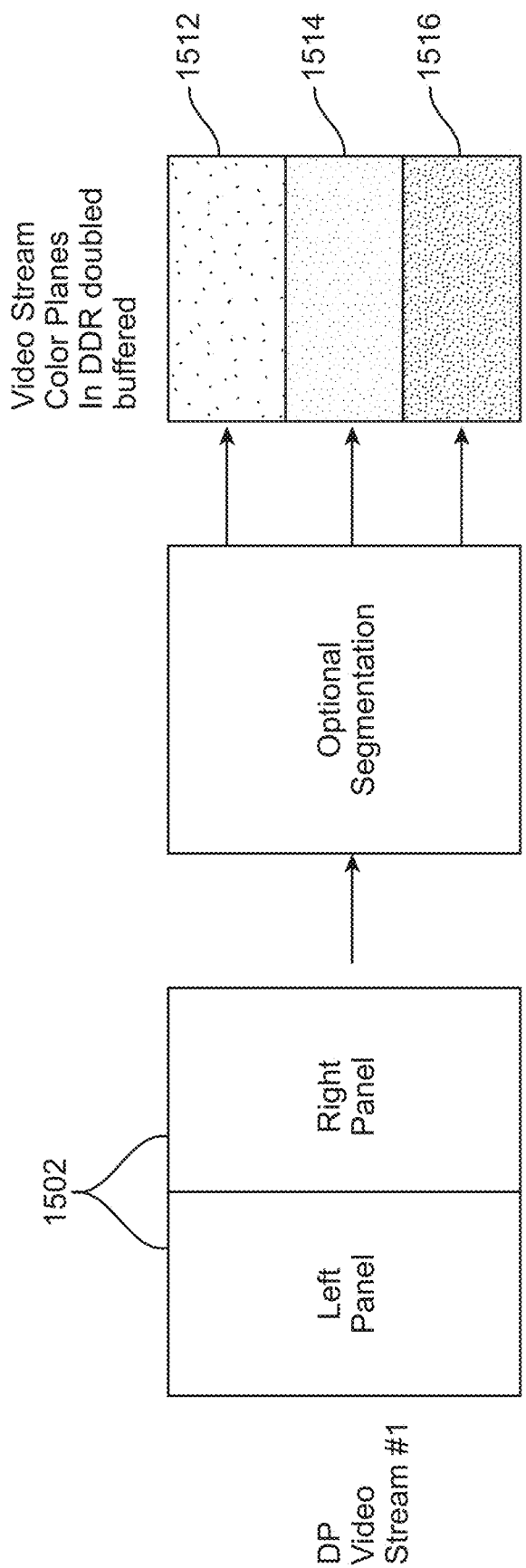
FIG. 15A schematically depicts color segmentation of color image data in DBs for use with VR/AR/MR systems, according to some embodiments.
FIG. 15B schematically depicts packing of image data without color segmentation in DBs for use with VR/AR/MR systems, according to some embodiments.
FIG. 15C schematically depicts a RGB 30 data format for storing color image data 1502.
FIG. 15D schematically depicts an input display panel resolution of 1440 pixels by 1440 pixels stored as 128 bit aligned data in SRAM.
FIG. 15E schematically depicts an input display panel resolution of 512 pixels by 512 pixels stored as 128 bit aligned data in SRAM.
FIG. 15F schematically depicts an input display panel resolution of 512 pixels by 512 pixels for a special image stored as 128 bit aligned data in SRAM.
FIG. 15G schematically depicts a data structure after the color segmentation of the frame.

FIG. 15 schematically depicts color segmentation of color image data in DBs for use with VR/AR/MR systems, according to some embodiments, for example, in which color image data is sent from the GPU to the DB for further processing. When the DB receives a register indicating color sequential grayscale format, the DB converts packed color image data into color sequential grayscale data as described herein. The DB receives color image data 1502 from the GPU through the DP. Then the DB optionally segments the color image data 1502 into three fields 1512, 1514, 1516. The three fields 1512, 1514, 1516 are stored in memory, for example, DDR double buffered memory, for further processing into color sequential grayscale format. This segmentation may occur in real time as the color image data stream is received. The register receiving the color image data 1502 stream may also indicate the address in memory, for example, the low-power DDR, where the image data will be stored.

Figure 15A:
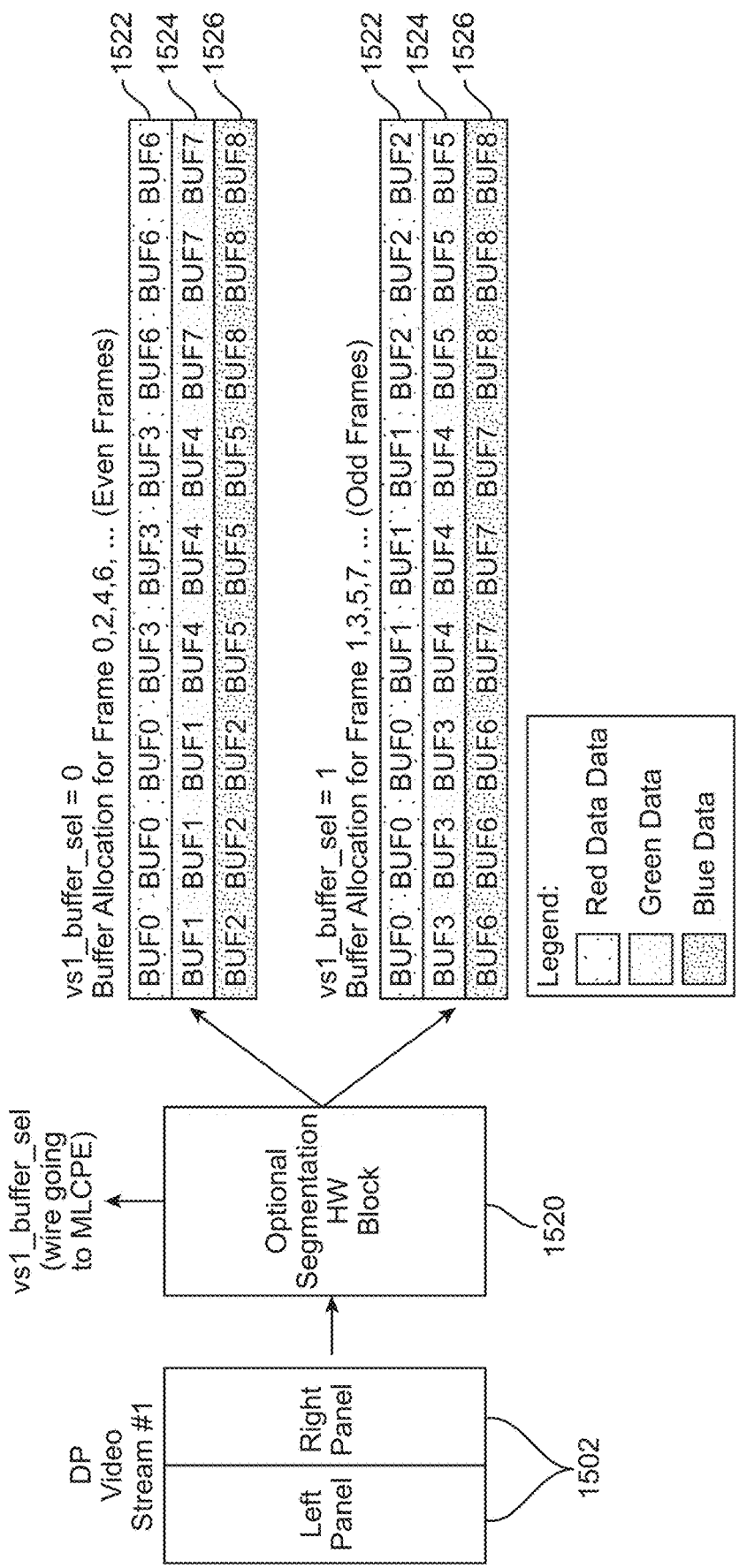

FIG. 15A schematically depicts color segmentation of color image data in DBs for use with VR/AR/MR systems, according to some embodiments, for example, in which color image data is sent from the GPU to the DB for further processing. When the DB receives a register indicating color sequential grayscale format, the DB converts packed color image data into color sequential grayscale data as described herein. The DB receives color image data 1502 from the GPU through the DP. Then the DB or an optional segmentation hardware block 1520 segments the color image data 1502 into three fields 1522, 1524, 1526. The three fields 1522, 1524, 1526 are stored in nine output buffers (BUF0 to BUF8). The subset of buffers in which the three fields 1522, 1524, 1526 are stored varies between even frames (i.e., zero, two, four, six, . . . ) and odd frames (i.e., one, three, five, seven, . . . ). An incoming message from the segmentation block 1520 or the DB indicates the currently active buffer state for the segmentation block output. The segmentation block 1520 separates the color image data 1502 into three primary color grayscale fields (i.e., red, green, blue). This segmentation may occur in real time as the color image data 1502 stream is received.

Figure 15B:
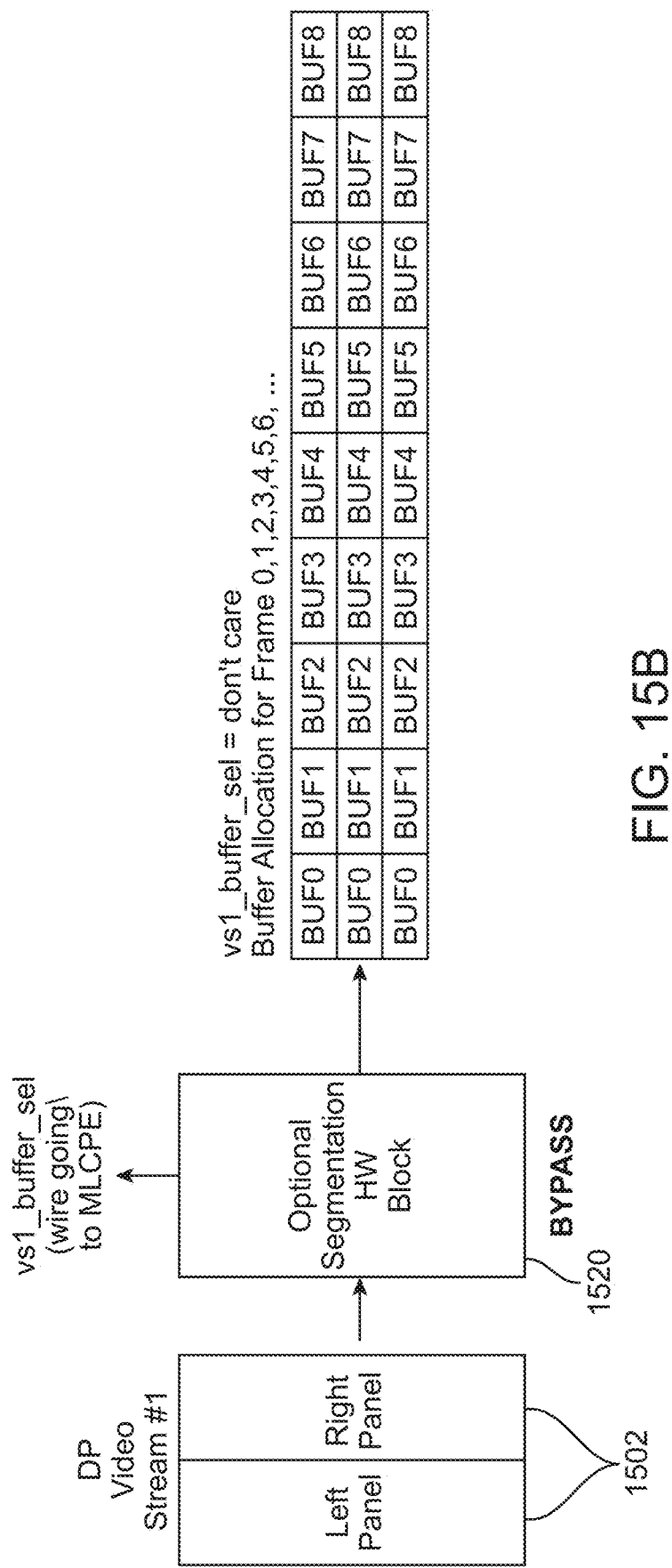

When the segmentation block 1520 is disabled, the color image data 1502 is copied to the nine output buffers (BUF0 to BUF8) in RGB packed mode using a numerical ordering matching the time of arrival as shown in FIG. 15B. In this mode, the nine output buffers (BUF0 to BUF8) in order because there is no segmentation.

When the color image data 1502 is in the form of RAW 8 bit, the segmentation block 1520 may on-the-fly convert the pixels to RAW 10 bit by adding two extra zero bits in the least significant bit of every color component before storing the segment data. Even if segmentation is not enabled, the color image data 1502 may be stored in RAW 10 bit format for system consistency.

Figure 15C:
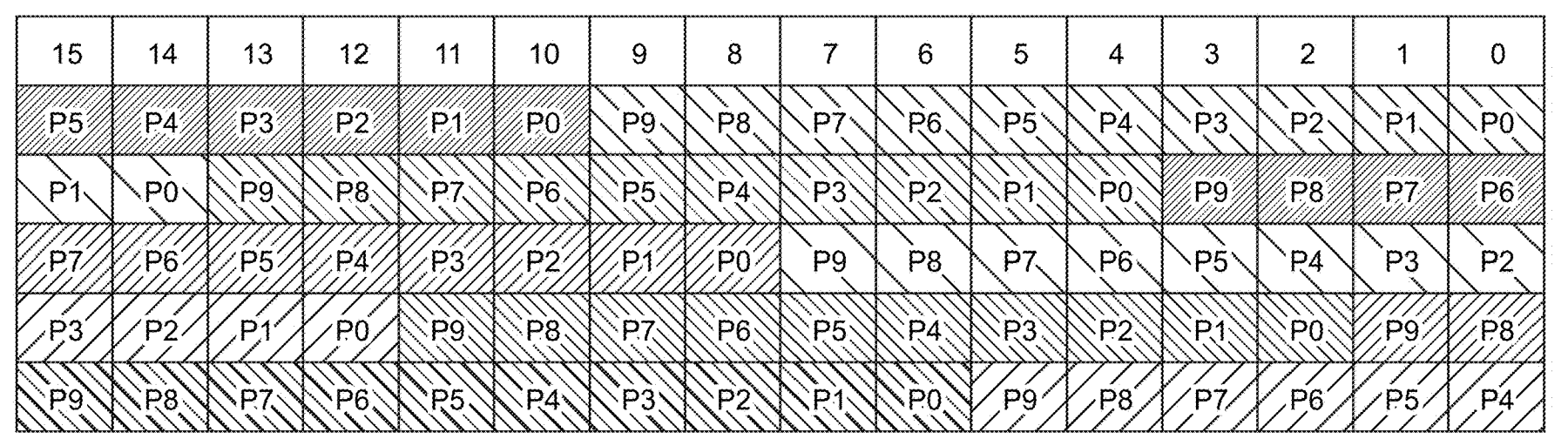
Figure 15D:
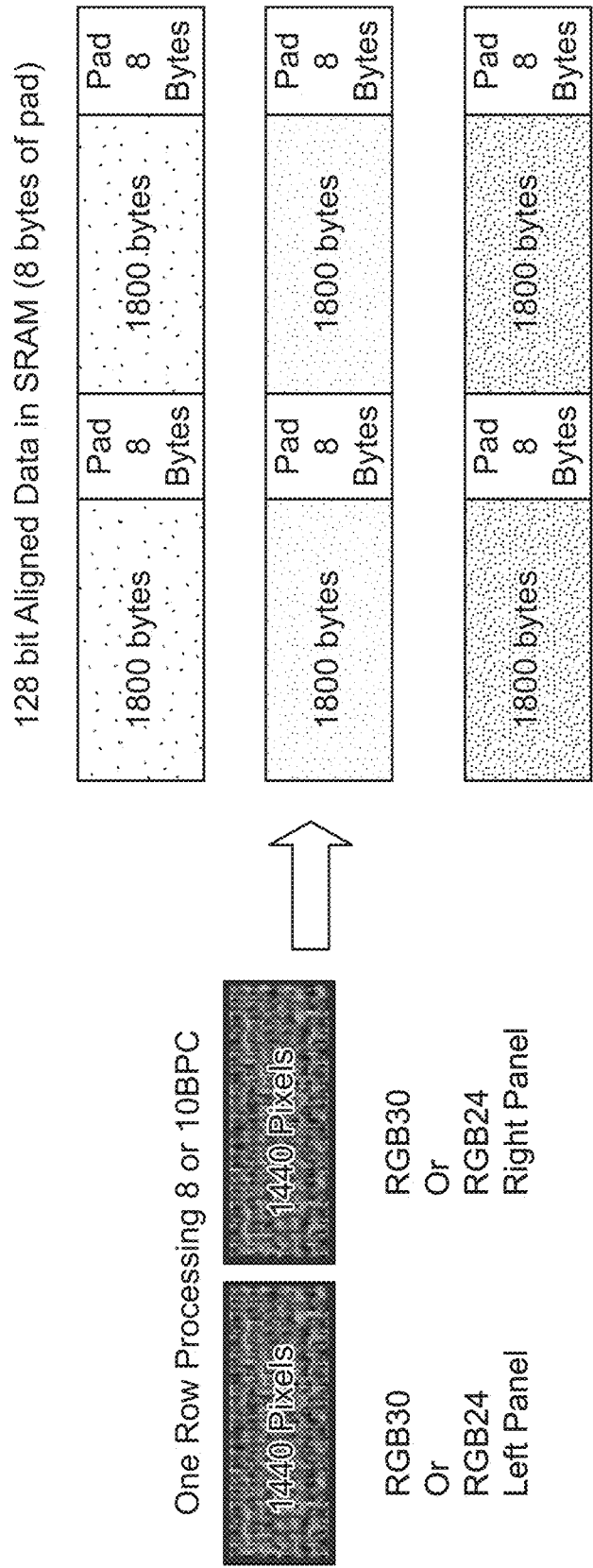
Figure 15E:
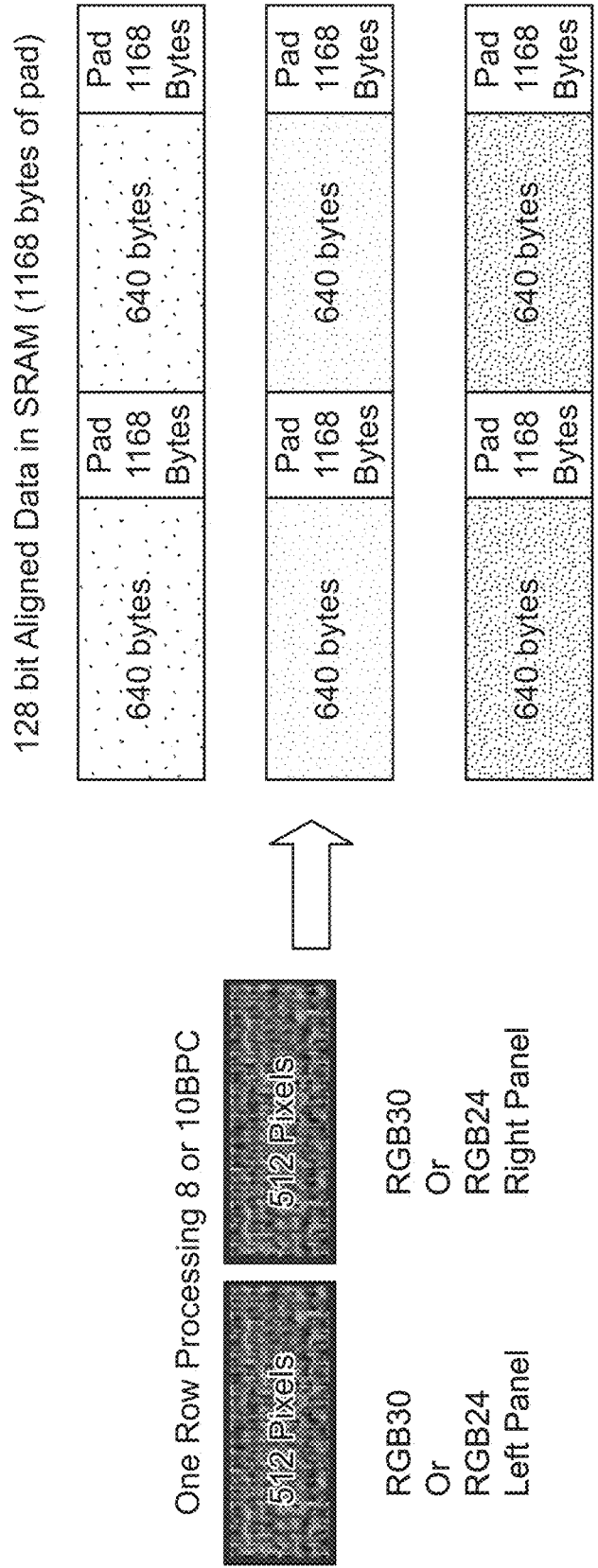
Figure 15F:
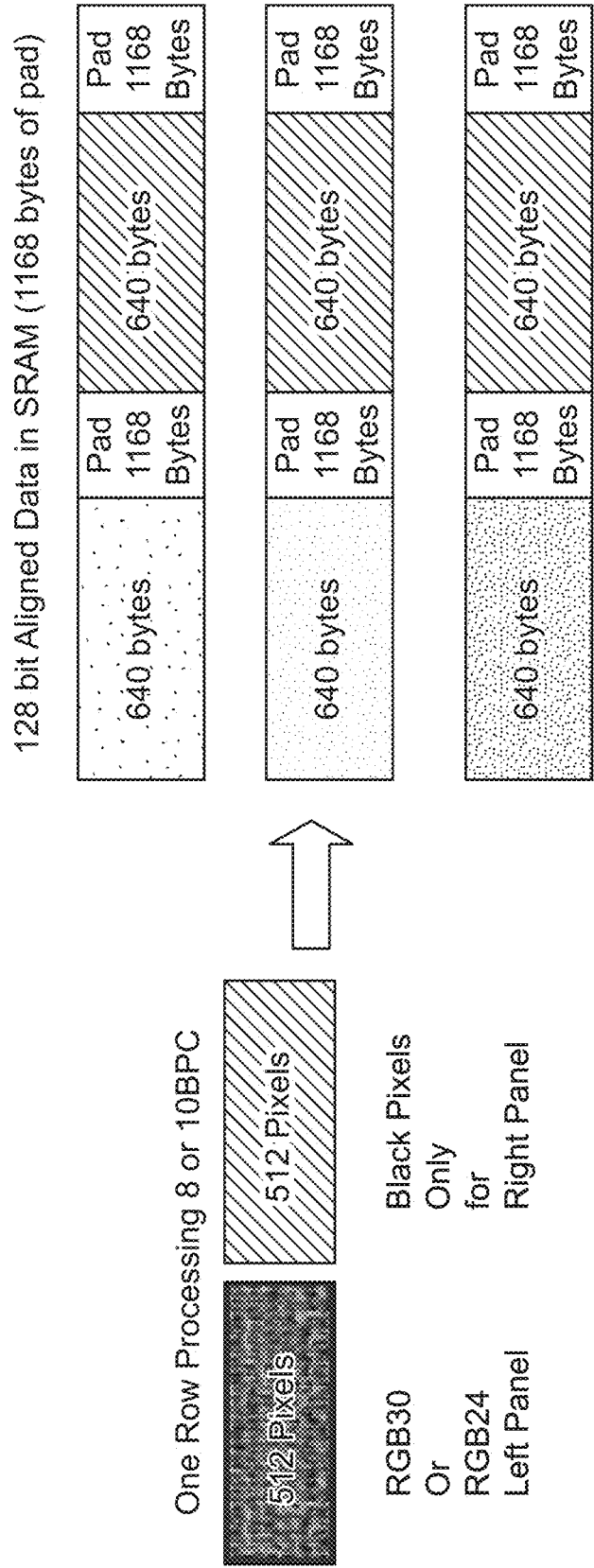

FIG. 15C schematically depicts a "RGB 30" data format for storing color image data 1502. FIG. 15D schematically depicts an input display panel resolution of 1440 pixels by 1440 pixels stored as 128 bit aligned data in SRAM. Each left and right segmented color includes 1800 bytes with 8 bytes of padding. Using the data formats in FIG. 15D, the segmentation block 1520 can assume that the starting address for each of the nine buffers will always be 128 bit aligned. FIG. 15E schematically depicts an input display panel resolution of 512 pixels by 512 pixels stored as 128 bit aligned data in SRAM. Each left and right segmented color includes 640 bytes with 1168 bytes of padding. As such, the color image data 1502 can still be stored as 128 bit aligned data in SRAM. FIG. 15F schematically depicts an input display panel resolution of 512 pixels by 512 pixels for a special image (e.g., splash screen) stored as 128 bit aligned data in SRAM. In this particular embodiment, the left panel has 512 color pixels, but the right panel has 512 pixels that are all set to black. As shown in FIG. 15E, each left and right segmented "color" includes 640 bytes with 1168 bytes of padding. As such, the color image data 1502 can still be stored as 128 bit aligned data in SRAM. While 1440 pixels by 1440 pixels and 512 pixels by 512 pixels resolutions have been described, similar data formats can be used to store color image data 1502 having different resolutions.

Figure 15G:
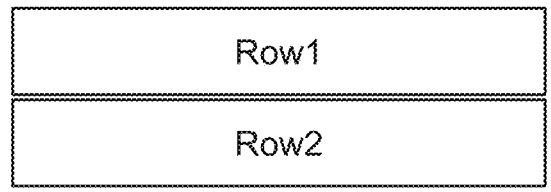
Figure 15G:
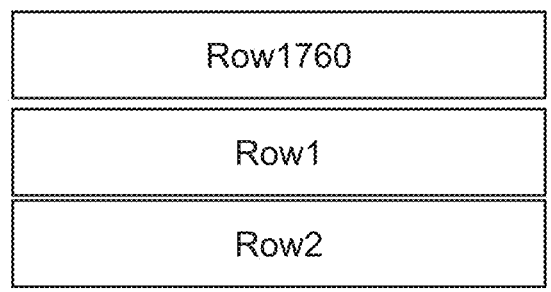
Figure 15G:
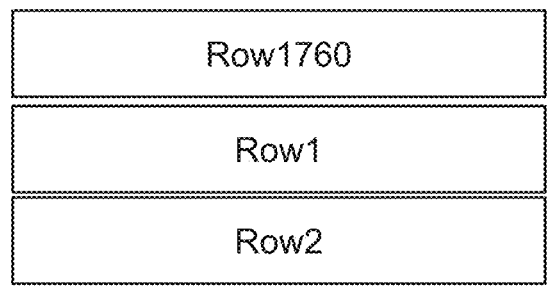
Figure 15G:
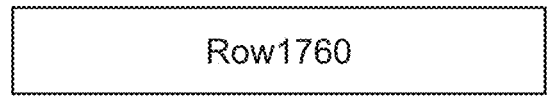

FIG. 15G schematically depicts a data structure after the color segmentation of the frame. The data structure shown in FIG. 15G does not include padding, therefore the data structure has a fixed destination pitch. That is the byte address distance from one row to the next row has a fixed number of bytes.

Each color field requires three separate buffers, with each buffer holding one third of the color field image. For the display resolutions having a number of rows that is not evenly divisible by three, the buffer can include one or two additional rows such that the number of buffers is evenly divisible by three. The extra rows/buffers can be used to store image metadata.

Multi-Stream Mode

As shown in FIGS. 9 and 9A above, the DB 900, 900' may support a multi-stream mode, where in the image data includes two streams 924, 926. In some embodiments, video stream one 924 may include the image data for display, and video stream two 926 may include no image data for display, but rather configuration data, for example, for one or more light field chips (e.g., left and right light field chips 814 in FIGS. 8 and 8A). In some embodiments, video stream two 926 may also include light field panel data that is separated by the pixel engine 908 for use by the light field chips. As shown in FIGS. 9 and 9A, this configuration data may be communicated to and used by the DDR controller 906, the memory 918, 918', the pixel engine 908, and the PIXEL distribution module 912. In some embodiments, the configuration data can include panel resolution, light field controller data, warp data, distortion data, occlusion data, foveated region data, bridge control data, and the like.

Video stream one 924 and video stream two 926 may be synchronous. Video stream two 926 may support a partial line for every frame. The partial line facilitates defining the timing of video stream one 924 and video stream two 926. The partial line may be disposed at the end of a blanking section. The DB may be configured to generate MIPI output for video stream two 926 to facilitate spacing in memory 918, 918'. In full dark mode (described herein), video stream two 926 will not be transmitted by the DP source. In partial dark mode (described herein), the DB may be configured to generate output for video stream one 924 to keep the link active until video stream two 926 has been transmitted. Video stream two 926 may shift line phase once every Vblank to facilitate synchronization of the two streams 924, 926.

Figure 16:
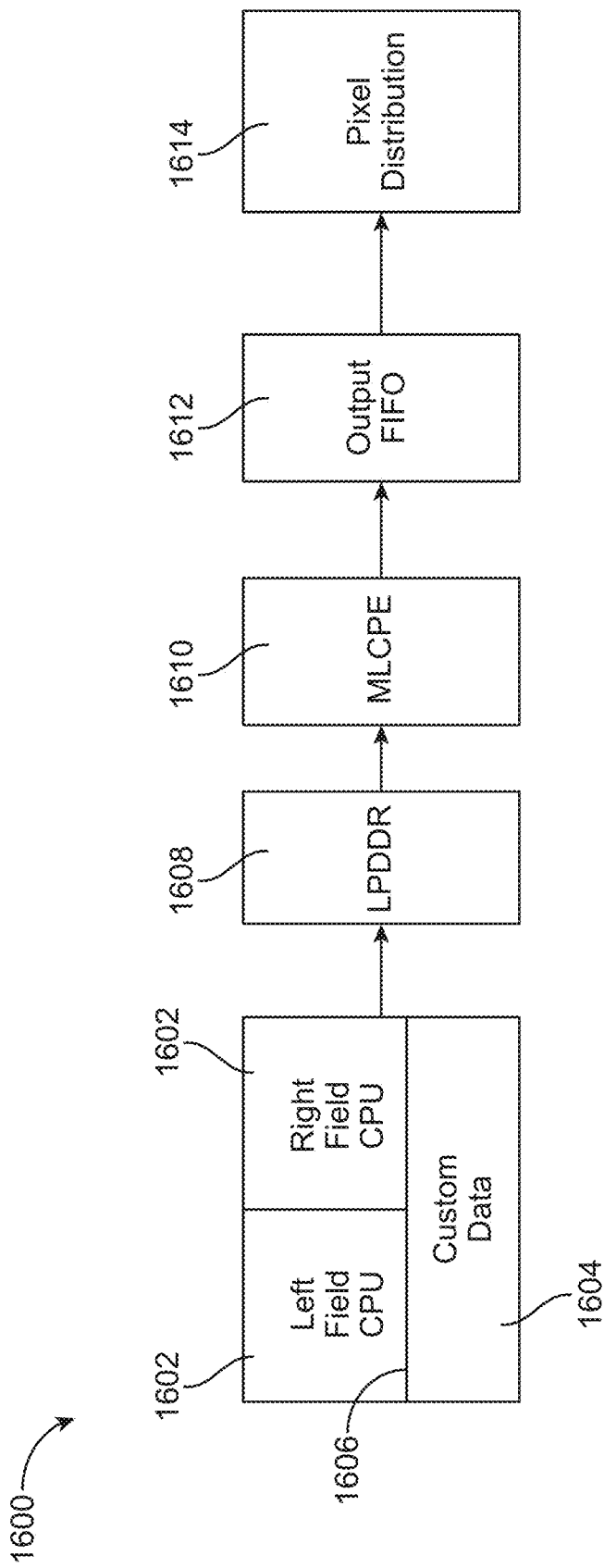
FIG. 16 schematically depicts the secondary display stream flow through display bridges for use with VR/AR/MR systems according to some embodiments.

FIG. 16 schematically depicts the secondary display stream 1600 (e.g., video stream two 926) and its flow through the DB. The secondary display stream 1600 includes light field processor data 1602 for controlling the left and right light field processors, and other custom data 1604. The light field processor data 1602 and the custom data 1604 are separated by a programmable row 1606. The DB splits the data separated by the programmable row 1606 such that the custom data 1604 is stored in memory, for example, memory 1608 (e.g., low-power DDR memory), and the light field processor data 1602 is sent to pixel distribution 1614 (e.g., PIXEL distribution module 912) through a pixel engine 1610 and an output FIFO memory 1612. In pixel distribution 1614, the light field processor data 1602 is split into left and right channels before being sent to MIPI links for communication to display panels (not shown). If the custom data 1604 is present for a particular frame the output MIPI timing may be adjusted to accommodate the custom data 1604, thereby reducing the resolution of the light field processor data 1602.

There may be no relationship between the secondary display stream 1600 input resolution and the corresponding MIPI output resolution. The location in the memory 918, 918' corresponding to the secondary display stream 1600 may be double buffered such that information for a new frame may be written without deleting the information for the previous frame. The double buffering of the memory 918, 918' for the secondary display stream 1600 may be selectively activated.

Figure 16A:
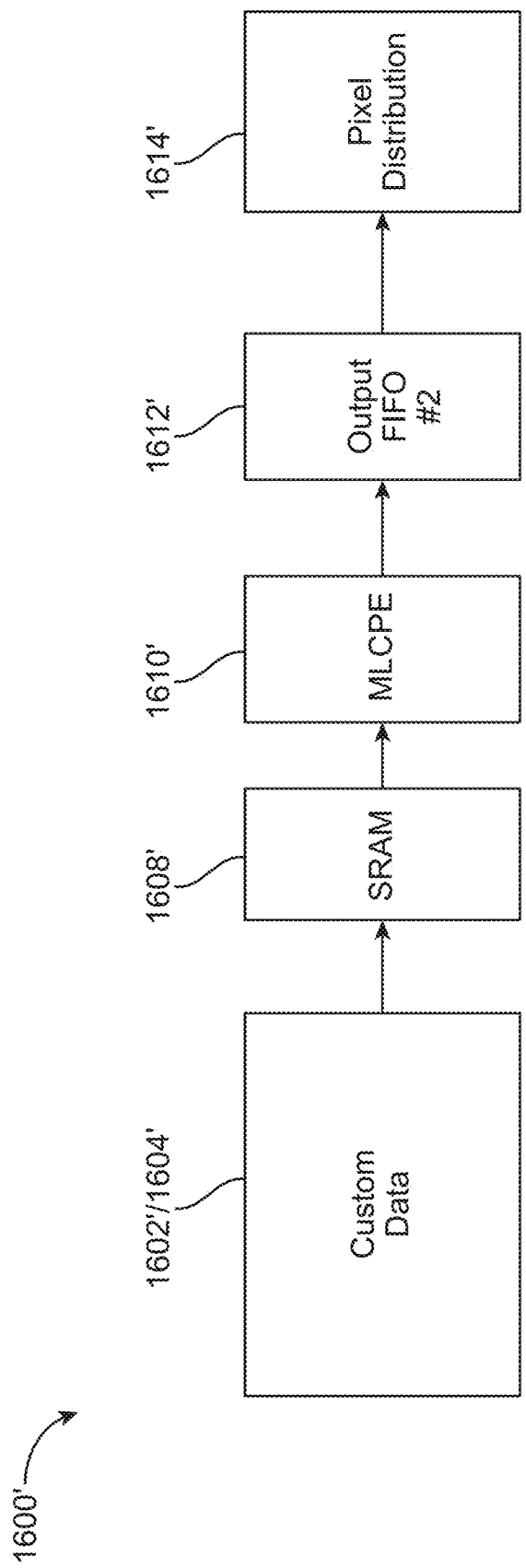
FIG. 16A schematically depicts the secondary display stream flow through display bridges for use with VR/AR/MR systems according to some embodiments.

In some embodiments, the secondary display stream (e.g., video stream two 926) may be larger than necessary. Consequently, the DB may compress the secondary display stream for transmission to the display. FIG. 16A schematically depicts the secondary display stream 1600' (e.g., video stream two 926) and its flow through the DB. The secondary display stream 1600' includes light field processor data 1602' having custom data 1604'. The light field processor data 1602' may be stored in a memory 1608' (e.g., SRAM), from which the light field processor data 1602' is sent through a pixel engine 1610', an output FIFO memory 1612', and a pixel distribution 1614' (e.g., PIXEL distribution module 912). The pixel engine 1610' may only copy from the memory 1608' the sub pixels within the light field processor data 1602' subject to output. Removing the data split operation in secondary display stream 1600 from the secondary display stream 1600' depicted in FIG. 16A simplifies hardware design, but adds complexity to pixel engine 1610' firmware design. The final resolution for the MIPI output of video stream two 926 may not be fixed.

Secondary Data Packet (SDP)

In addition to image data for display, video stream one also includes one or more SDP messages from the GPU to the DB. In some embodiments that use a VESA packet format, the SDP messages may be encoded in the video image data during vertical blanking before any video image data for display is communicated. The SDP messages may also be encoded in the video image data during horizontal blanking. The SDP messages are received by the DB and stored in buffers (e.g., for access by the pixel engine). The SDP messages may include pose data updates.

Figure 17:
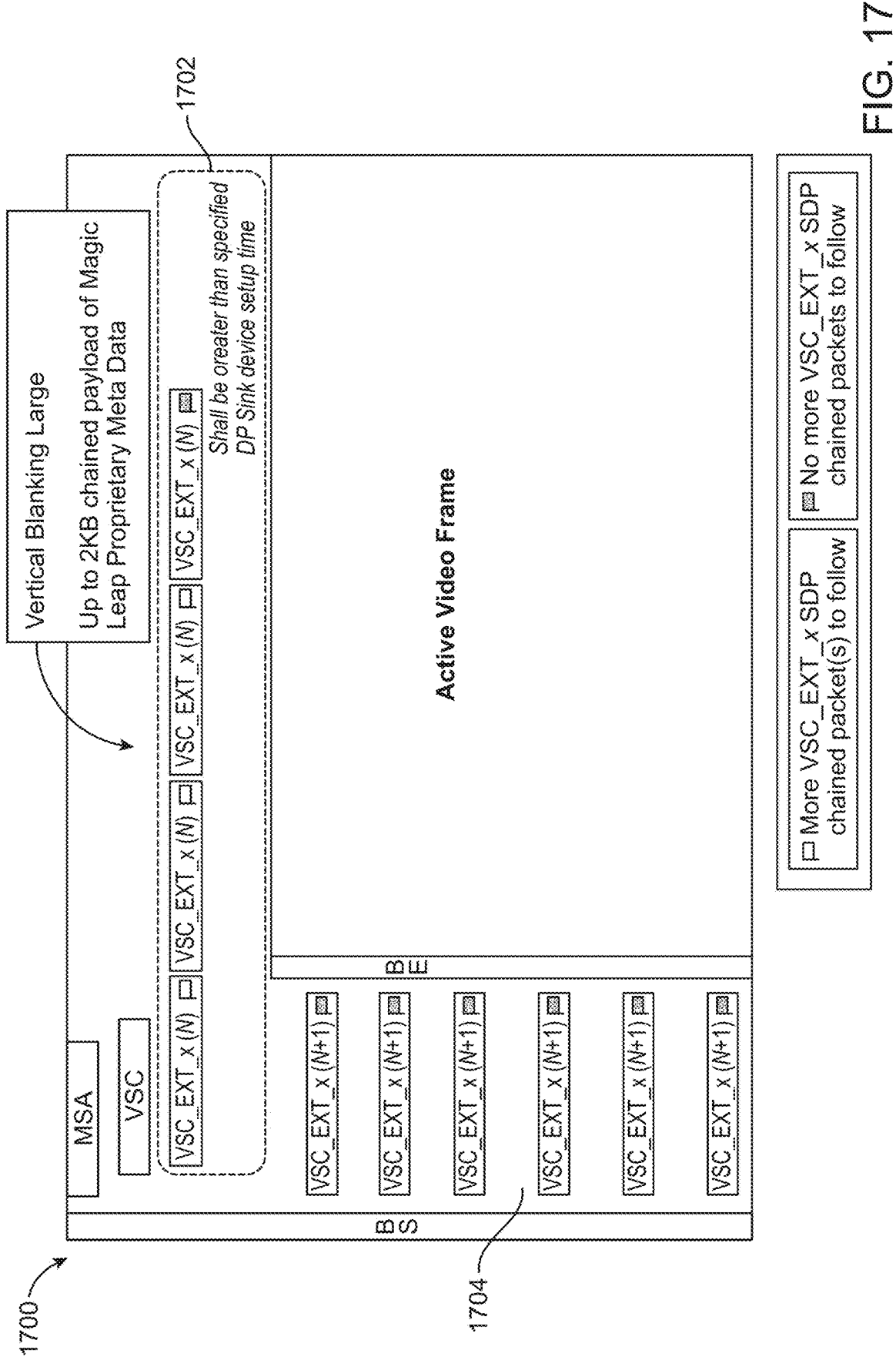
FIG. 17 schematically depicts an image data packet according to some embodiments.

FIG. 17 schematically depicts a large chained VSC_EXT_VESA packet 1700 having a plurality of SDP messages encoded therein according to some embodiments. Up to two KB of SDP messages may be embedded in the vertical blanking segments 1702 of the packet 1700 due to its relatively large size. On the other hand the relatively smaller size of the horizontal blanking segment 1704 facilitates only smaller SDP messages. FIG. 17 depicts six horizontal blanking packets that may be broken down into three chained packets. The use of chained packets allows for slightly larger SDP messages. In embodiments with smaller SDP messages, no chaining is required.

Figure 17A:
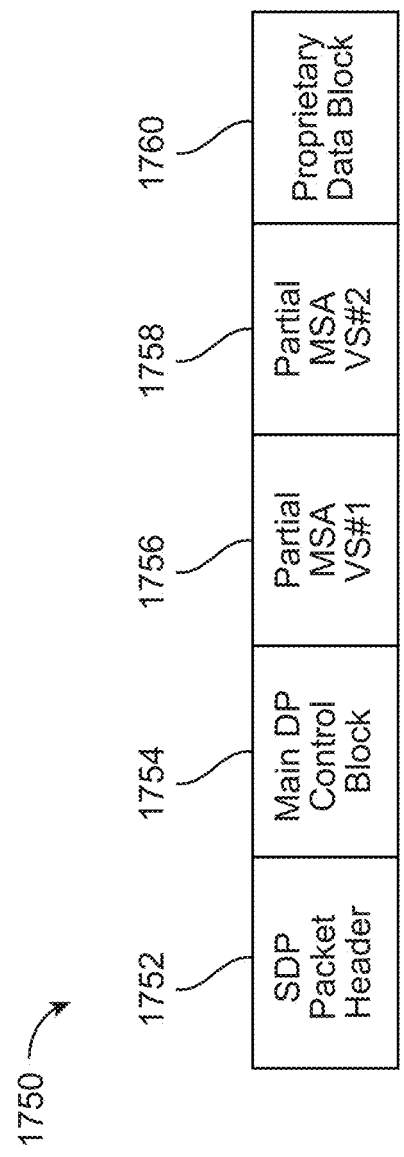
FIG. 17A schematically depicts a VSC_EXT_VESA SDP message 1750 associated with vertical blanking.

FIG. 17A schematically depicts a VSC_EXT_VESA SDP message 1750 associated with vertical blanking. The VSC_EXT_VESA SDP message 1750 may only be included in video stream one 924. Therefore, the VSC_EXT_VESA SDP message 1750 may include information for both video streams one and two. In some embodiments, the VSC_EXT_VESA SDP message 1750 includes a header 1752 (20 bytes), a main DP control block 1754 (five bytes), partial MSA information for video streams one and two 1756, 1758 (18 bytes each), and a proprietary data block 1760 (variable size, e.g., hundred and 73 bytes).

Figure 17B:
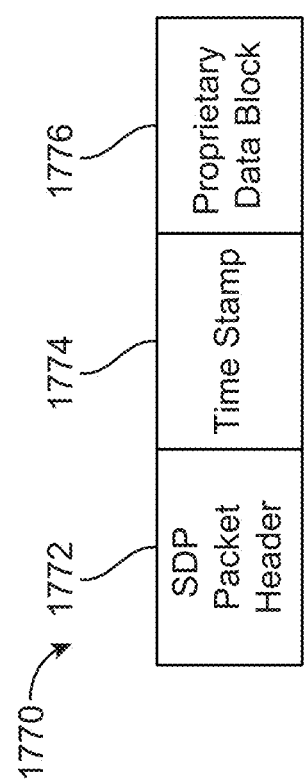
FIG. 17B schematically depicts a Horizontal Blanking SDP message 1770 associated with horizontal blanking.

FIG. 17B schematically depicts a Horizontal Blanking SDP message 1770 associated with horizontal blanking. In some embodiments, the Horizontal Blanking SDP message 1770 includes a header 1772 (4 bytes), a timestamp 1774 (4 bytes), and a proprietary data block 1776 (28 bytes).

SDP and AUX Message FIFO Memory

Figure 18:
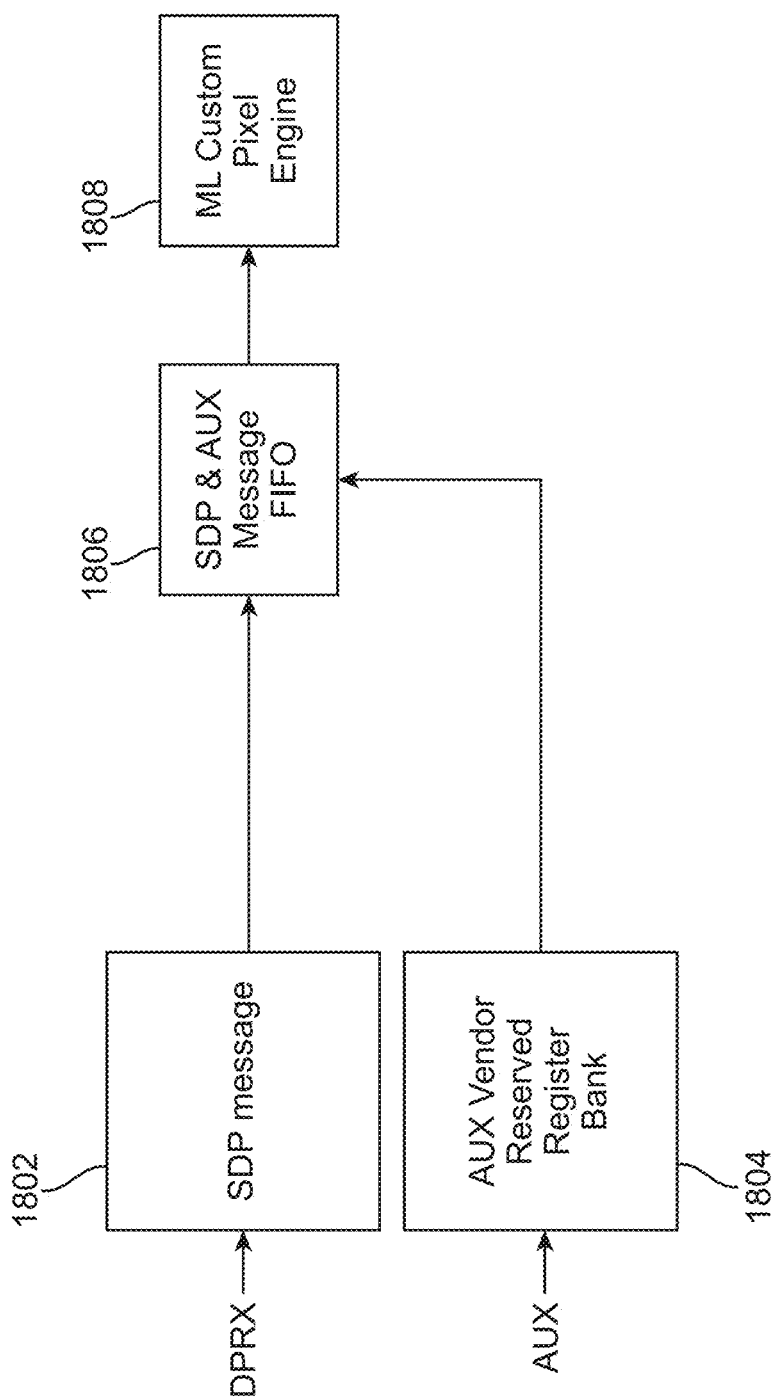
FIG. 18 schematically depicts data flow through display bridges for use with VR/AR/MR systems according to some embodiments.

FIG. 18 schematically depicts the flow of data from SDP messages and auxiliary (AUX) channel messages in the DB according to some embodiments. Because the DP may be shut down to conserve power (described below), various configuration data may be communicated via an AUX channel. Configuration data may be communicated via an AUX channel using register writes. In some embodiments, the AUX channel is used along with the DP to communicate configuration data.

FIG. 18 depicts configuration data from SDP messages 1802 from the DP receiver and from the AUX channel 1804. The SDP and AUX messages 1802, 1804 are stored on a FIFO memory 1806. From the FIFO memory 1806, the SDP and AUX messages 1802, 1804 can be sent to and used by a pixel engine 1808.

Output Video Stream Compression

Configuration data for a display panel is most efficiently communicated directly from a controller to the display panel. In VR/AR/MR systems where a DB is interposed between a CPU and a display panel, configuration data can be sent to the display panels as embedded signals in the video stream.

Figure 19:
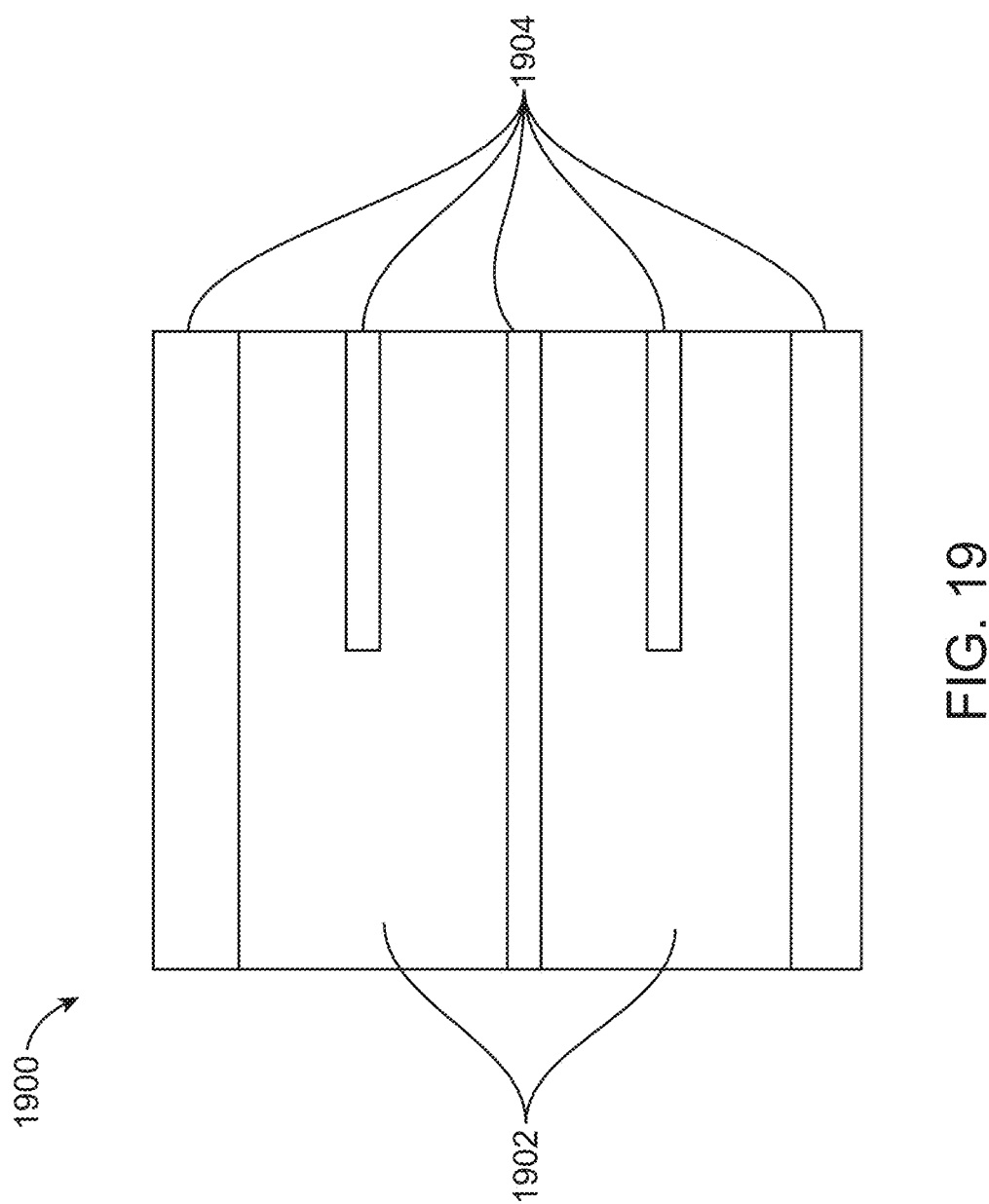
FIG. 19 schematically depicts a video stream according to some embodiments.

FIG. 19 schematically depicts a video stream 1900 with pixel data 1902 interleaved with embedded signals 1904 including configuration data. The embedded signals 1904 can be disposed in any location in the video stream 1900 (e.g., beginning, middle, end). The embedded signals 1904 can also be complete or partial rows.

The DB can receive configuration data from AUX channel register writes, SDP metadata, and custom data sections of video stream two. The pixel engine will receive the configuration data and generate an output MIPI stream including embedded signals with the configuration data relevant to the particular display panel. The output timing of the MIPI stream may be expanded to conform to the embedded signaling.

Full Dark Low-Power Mode

In some embodiments, there will be no virtual image data for a particular VR/AR/MR user pose/field of view. As such, the GPU output will be sent to black/full dark. When the GPU detects a full dark frame, shutting down the image pipeline for video stream one 924 will conserve system power. Sources of power savings include but are not limited to DP link, DP source processor, DP source memory, DP optical link, GPU compression, DB decompression, DB color segmentation, DB memory writing, pixel engine memory reading, pixel processing, MIPI transmitter, MIPI receiver, display panel memory reading and writing, etc. Turning off video stream one 924 and its display panels will save power. In some embodiments, the light field chips will continue to operate from data previously received.

When the GPU detects a full dark frame, the GPU notifies the DP source MCU (e.g., via a "STP" SDP message or a k-code power down sequence on the main the DP link). In some embodiments, a GPU compositor creates and writes a vertical blank SDP message to initiate the full dark mode. The DP source MCU then bypasses the memory transfer of the full dark frame to the DP source pipeline and places most of the DP source pipeline components (e.g., DSC encoder) in low-power mode. The DP source MCU disables various registers to shut down downstream components of the imaging pipeline such as the display bridge and the displays.

The GPU may initiate the full dark mode by sending a SDP message to the DB during vertical blanking. The DP receiver decodes the SDP message and puts itself in a full dark low-power mode. The DP receiver also sends a message placing the pixel engine into full dark low-power mode. Various other components of the imaging pipeline are also placed in full dark low-power mode, including the MIPI data lanes, which will be placed in LP11 mode. The DP source CPU will shut down the physical components of the DP. The displays may be shut down by setting the number of active lines to zero. The displays may enter a black/self-refresh mode. The DP sink bridge may disregard any data sent by the source after receiving the vertical blank SDP message until it receives a wake-up signal. Various components of the image pipeline are shut down asynchronously as the previous non-dark image is processed through the pipeline and displayed. In some embodiments, as long as non-frame data is needed, the display pipeline including the DP port will remain in a shutdown mode.

When the GPU detects a non-full dark frame after a full dark frame, the GPU initiates a wake-up sequence. In some embodiments, the DP source MCU may power up the DP transmitter and receiver. The GPU compositor may create and write a vertical blank SDP message to initiate either partial dark or regular mode. Then the DP source MCU may send a wake-up message via an AUX channel. The displays may wake up by setting the number of active lines to a non-zero value. Optional fast link training may take place. In some embodiments, the fast link training may be stored on the DB and the stored fast link training may be used for fast wakeup.

Figure 32:
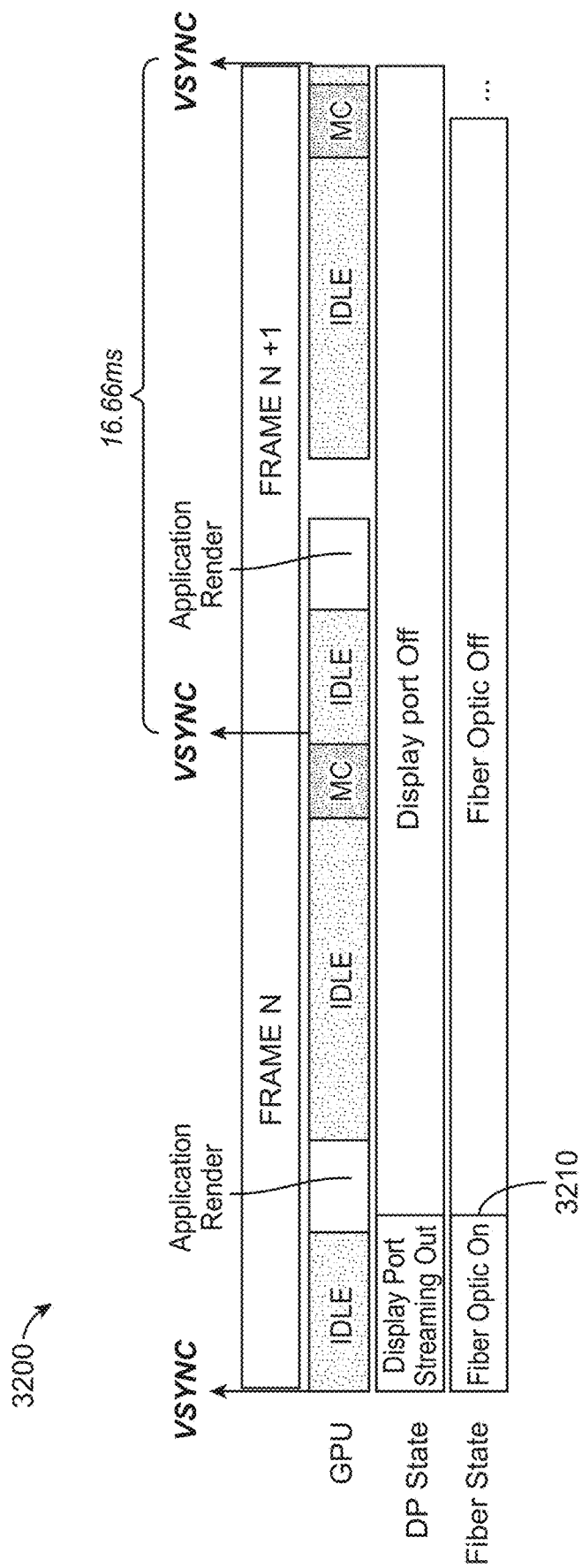
FIG. 32 schematically depicts the MIPI timing of a display system entering and sustaining full dark mode 3200 according to some embodiments.

FIG. 32 schematically depicts the MIPI timing a display system entering and sustaining full dark mode 3200, according to some embodiments. The system enters full dark mode at 3210. In some embodiments, the display panels are actually working on self-refresh but displaying only black pixels. As such, a significant portion of the power savings from full dark mode is from shutdown of the MIPI receiver, the memory, the DB, the light source, and the fiber-optic connector.

Figure 33:
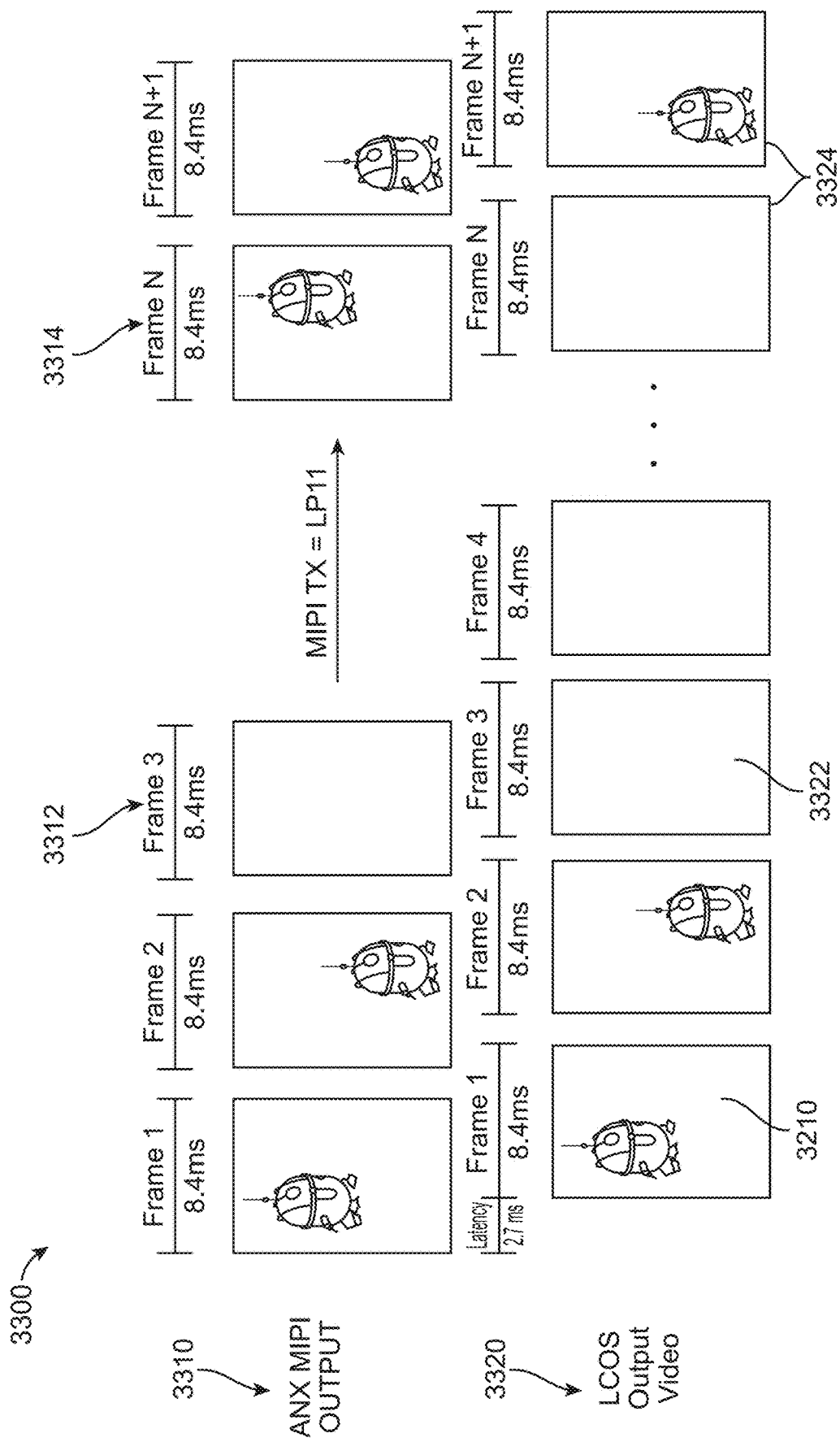
FIG. 33 schematically depicts a display system entering, sustaining, and exiting full dark mode according to some embodiments.

FIG. 33 schematically depicts a display system entering, sustaining, and exiting full dark mode 3300, according to some embodiments. FIG. 33 depicts the MIPI data 3310 from the DB and the display (e.g., LCOS) output video 3320 over time. The MIPI data 3310 transitions from regular mode to full dark at frame three 3312. Although the video data is full dark (i.e., blank or zero), the MIPI data 3310 includes one frame of full dark 3312, which includes an embedded control line to place the system into full dark mode. In response to receiving the embedded control line, the display output video 3320 displays a full dark frame at frame three 3322. The system then sustains full dark mode for a variable number of frames as required by the video data. At frame N 3314 of the MIPI data 3310, the MIPI data returns to regular mode, thereby waking up the system. However, because the display is no longer synchronized with the DB MIPI output, the display disregards the first frame of regular mode by displaying a last black frame 3324. Starting with the N+1 frame 3326, the display output video wakes up, synchronizes, and operates in regular mode.

Figure 34:
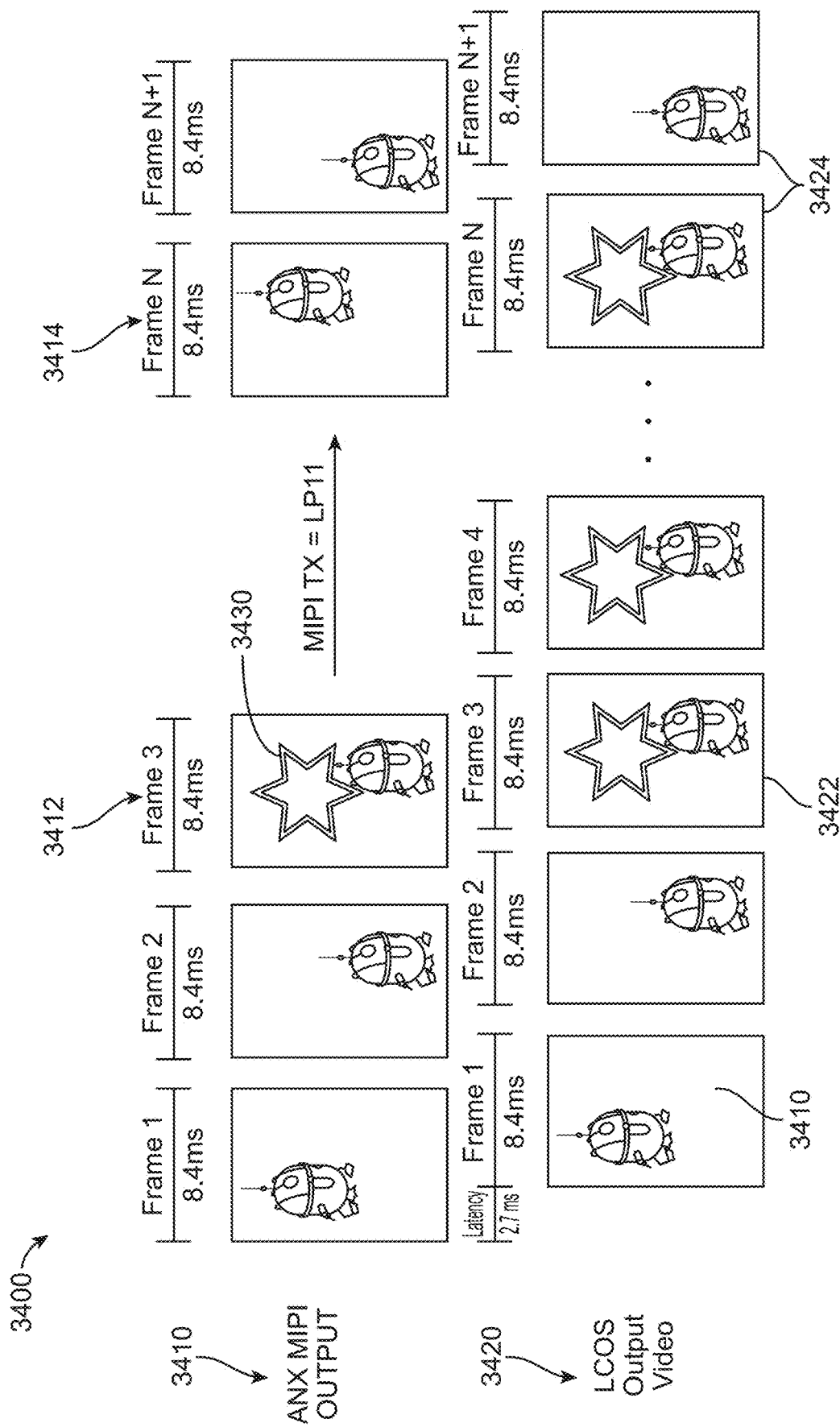
FIG. 34 schematically depicts a display system entering, sustaining, and exiting full dark mode for panel self-refresh according to some embodiments.

FIG. 34 schematically depicts a display system entering, sustaining, and exiting full dark mode for panel self-refresh 3400, according to some embodiments. FIG. 34 depicts the MIPI data 3410 from the DB and the display (e.g., LCOS) output video 3420 over time. The MIPI data 3410 initiates panel self-refresh at frame three 3412. Frame three 3412 MIPI data 3410 includes an indicator 3430 for panel self-refresh. In response to receiving the panel self refresh indicator, the panel stores the MIPI data 3410 in one or more buffers therein. The display output video 3420 shows a frame 3422 corresponding to frame three 3412 of the MIPI data 3410 until the panel self-refresh is complete. During panel self-refresh, the SRAM buffers can be shut down because the video data is stored in the buffers in the display panel. At frame N 3414 of the MIPI data 3410, the MIPI data returns to regular mode, thereby waking up the system. However, because the display is no longer synchronized with the DB MIPI output, the display disregards the first frame of regular mode by displaying a last copy of the third frame 3424. Starting with the N+1 frame 3426, the display output video wakes up, synchronizes, and operates in regular mode. Display panel self-refresh may occur during display of a splash screen during which content is more often stationary.

Partial Dark Low-Power Mode

Figure 20:
FIGS. 20-24A schematically depict partial dark low-power modes according to some embodiments.

The trigger for partial dark low-power mode is the presence of a threshold amount of nonblack content in a particular VR/AR/MR user pose/field of view. FIG. 20 depicts a first partial dark low-power mode in which content is disposed only at the top 2002 of the screen 2000. Examples of such content include status bars, battery charge levels, volume settings, etc. The DP source in this mode will initiate a power-down sequence (similar to the one described above for full dark low-power mode) after a predetermined number of rows specified in an SDP message. The SDP message may indicate the first partial dark low-power mode and the number of rows that are active in the frame. This first partial dark low-power mode can save power by reducing the amount of DB writes to memory, pixel engine fetches from memory, pixel engine processing, MIPI output, etc.

Figure 21:
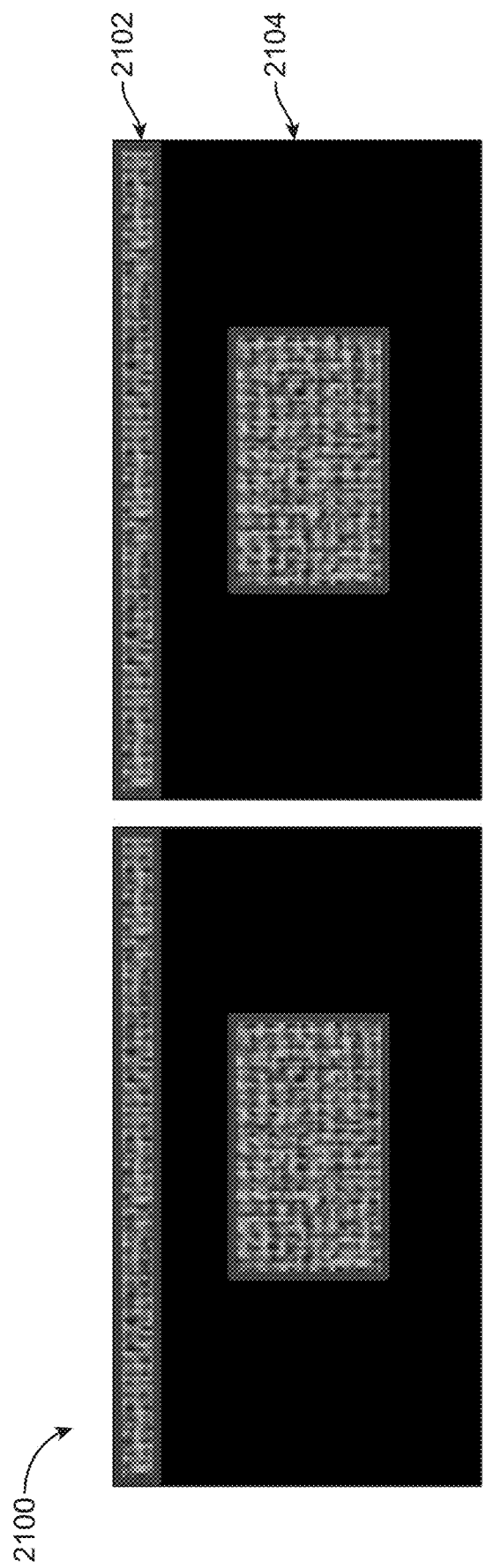
Figure 22:
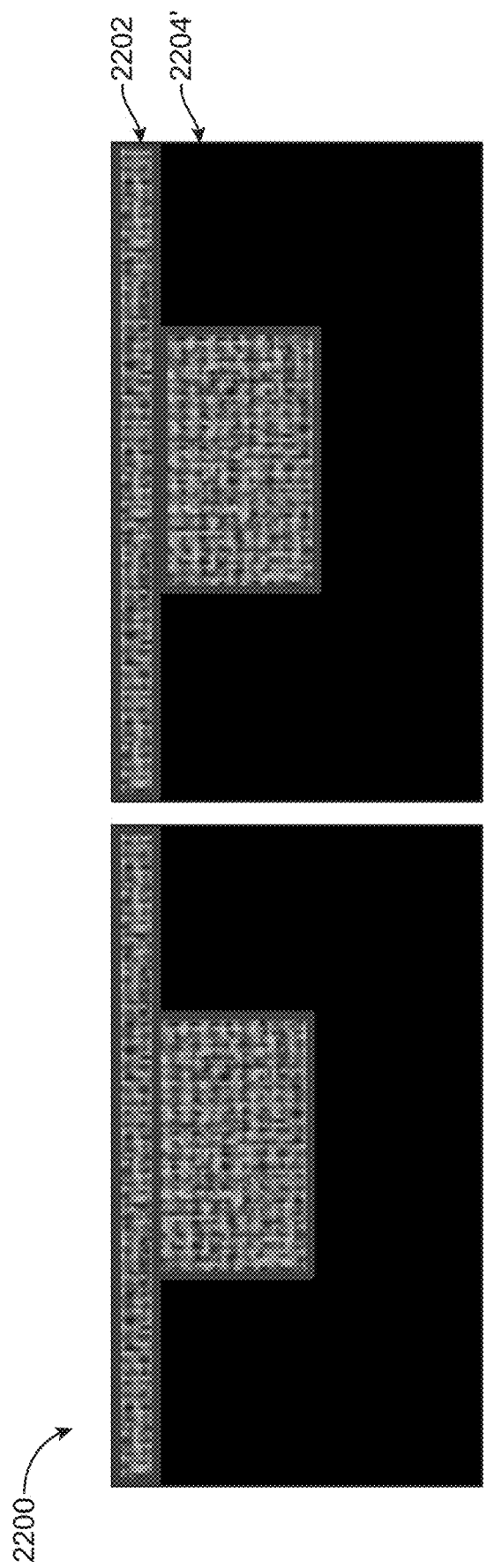

FIG. 21 depicts a second partial dark low-power mode in which content is disposed at the top 2102 and the middle 2104 of the screen 2100. In this second partial dark low-power mode, the GPU may reorganize the output data to minimize the number of active rows as shown in FIG. 22. In FIG. 22, the contents in the middle 2104 of the screen 2100 in FIG. 21 has been moved as displaced image data 2204' to be adjacent the content in the top 2202 of the screen 2200. Reorganizing the image data reduces the number of active rows (depicted in FIG. 22A) thereby reducing the overall power consumption of the display pipeline components.

After the top image data 2202 and the displaced image data 2204' have made their way through the image pipeline, components of the image pipeline are put into partial dark low-power mode as described herein to save power. The pixel engine in the DB performs segmentation of the image data and re-maps the displaced image data 2204' using configuration data from the SDP to reform the source image 2100 shown in FIG. 21. Reducing the number of active rows (see FIG. 22A) facilitate earlier shutdown of the DP link.

Figure 23:
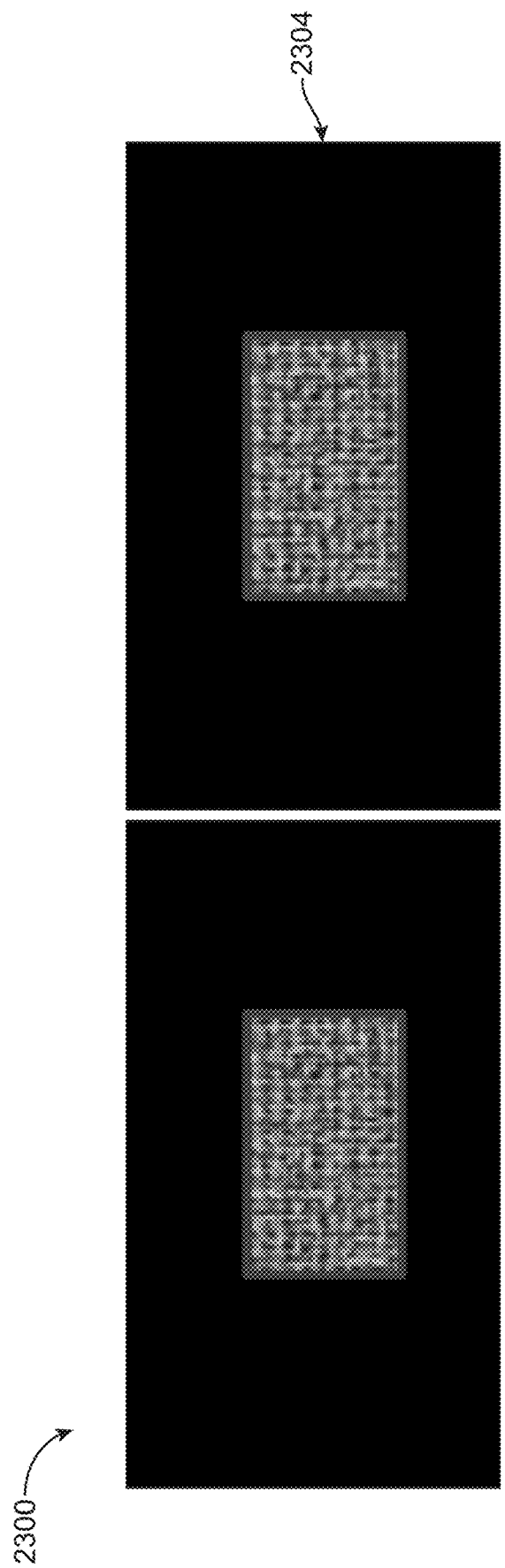

FIG. 23 depicts a third partial dark low-power mode in which content is disposed only at the middle 2304 of the screen 2300. Like the mode shown in FIGS. 21 and 22, the GPU may reorganize the middle data 2304 by moving it as displaced image data 2404' to the top of the screen 2400 is shown in FIGS. 24 and 24A.

After the displaced image data 2404' has made its way through the image pipeline, components of the image pipeline are put into partial dark low-power mode as described herein to save power. The pixel engine in the DB performs segmentation of the image data and re-maps the displaced image data 2404' using configuration data from the SDP to reform the source image 2300 shown in FIG. 23.

In the three partial dark low-power modes depicted in FIGS. 20-24 and described above, an SDP message informs the DP receiver about both the mode at the number of active rows. This allows the DP receiver to shut down after the active rows have been communicated from the GPU to the DB. In embodiments where compression is enabled, compression may be optionally disabled depending on the number of active rows. For instance, a minimum set of rows may be required to enable compression or compression may be enabled all the time just varying the number of VESA DSC slices to improve power efficiency.

Figure 24:
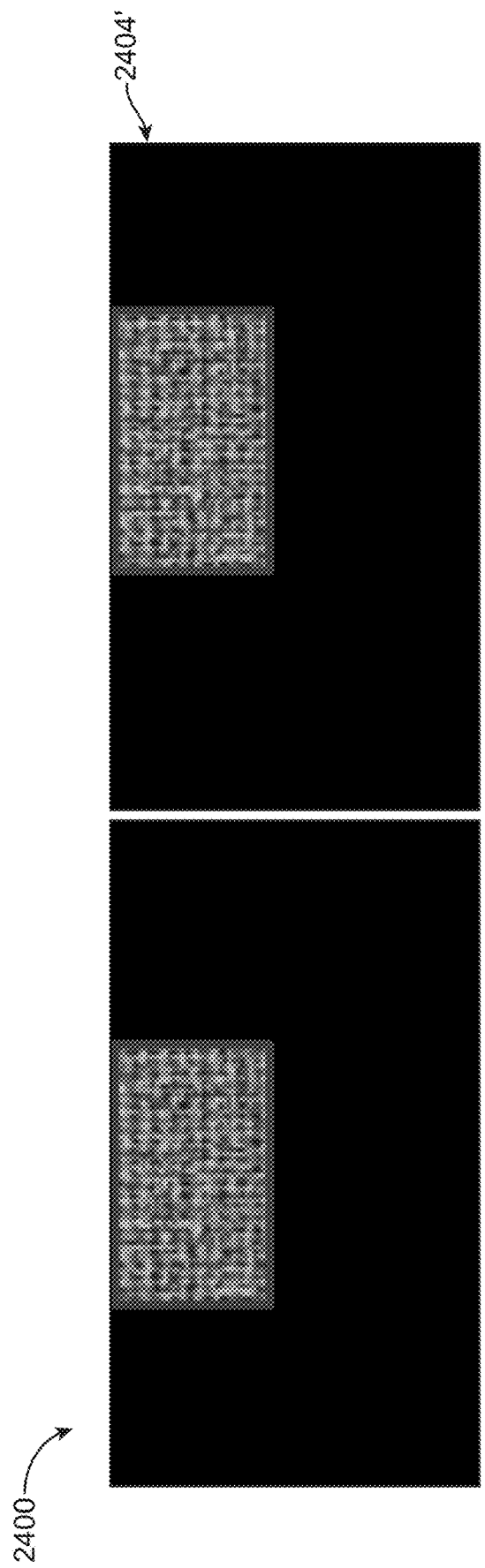
Figure 24A:

In other embodiments, the horizontal packing depicted in FIGS. 22-24 and described above may be replaced or combined with vertical packing. In some embodiments, although FIGS. 22-24 illustrate several modes, one or more separate regions on a single stream may be compacted to reduce the data rate. In some embodiments, the number of separate regions may be limited to make the implementation more practical based on other constraints.

Figure 24B:
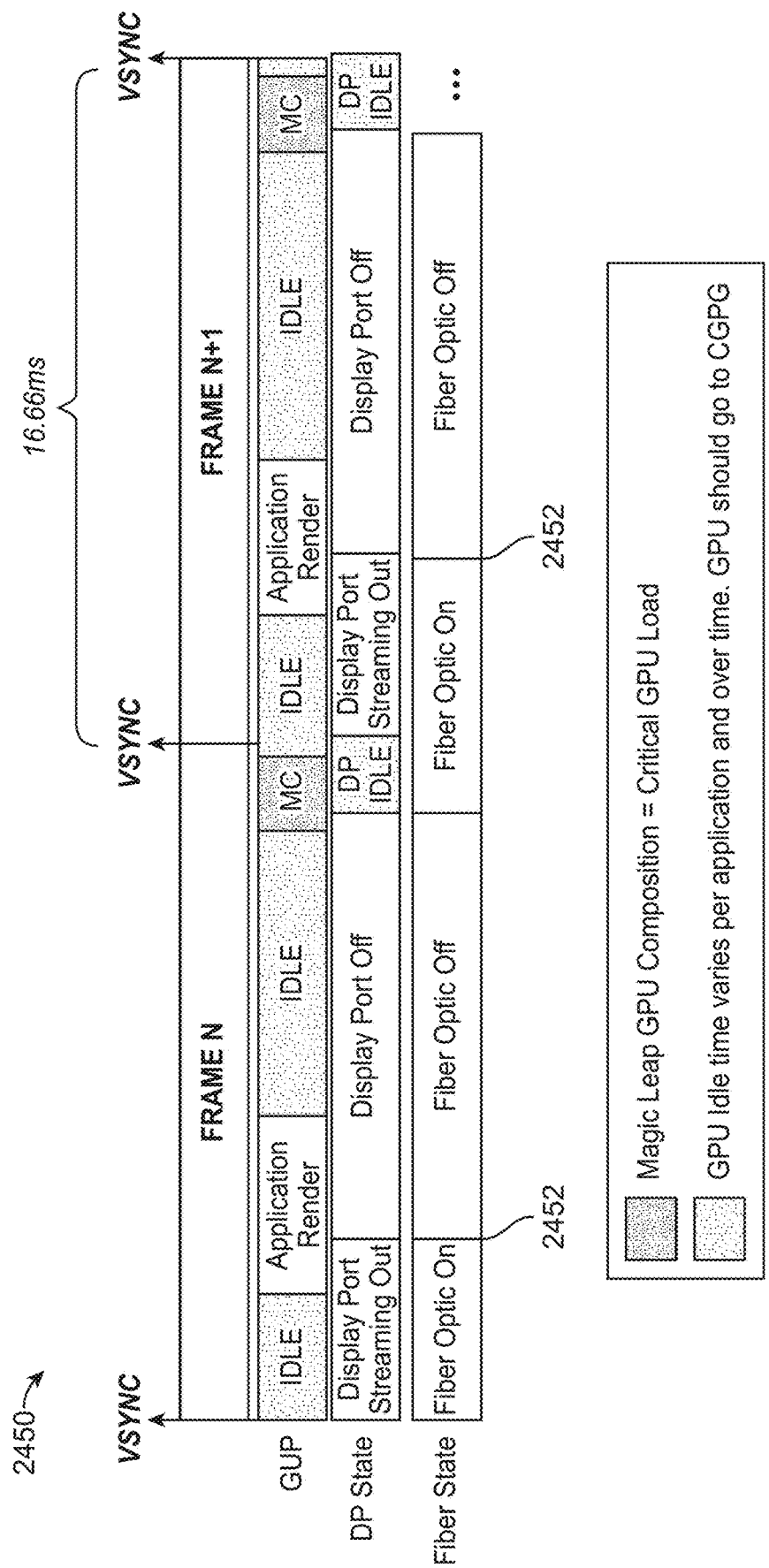
FIG. 24B schematically depicts the MIPI timing of a display system entering and sustaining partial dark mode according to some embodiments.

FIG. 24B schematically depicts the MIPI timing of a display system entering and sustaining partial dark mode 2450, according to some embodiments. The system enters partial dark mode at 2452, after the non-black subject matter in the frame has been displayed. In some embodiments, the display panels are actually working on self refresh but displaying only black pixels. As such, a significant portion of the power savings from full dark mode is from shutdown of the MIPI receiver, the memory, the DB, the light source, and the fiber-optic connector. The partial dark mode 2450 may only operate on video stream one 924. Therefore video stream two 926 may never be affected by the partial dark mode 2450.

Custom Packing for Partial Screen Refresh Mode

In AR/MR modes, there are a potentially large number of black pixels representing no modification to light from the real world. However, the black pixels and the corresponding nonblack pixels may be arranged in such complicated patterns that simple horizontal or vertical packing is not amenable.

In the custom packing for partial screen refresh mode, the GPU may reorganize the image data such that only regions/ portions/sections/tiles (e.g., square shaped tiles) that have changed from the previous frame to the frame currently being rendered are sent from the GPU to the DB via the DP. The SDP messages may include information indicating that the custom packing for partial screen refresh mode is enabled, the locations of the various changed tiles in the FOV, etc. The DB can use the locations of the various changed tiles in the FOV story the various changed tiles in appropriate locations in the output buffer.

Figure 25:
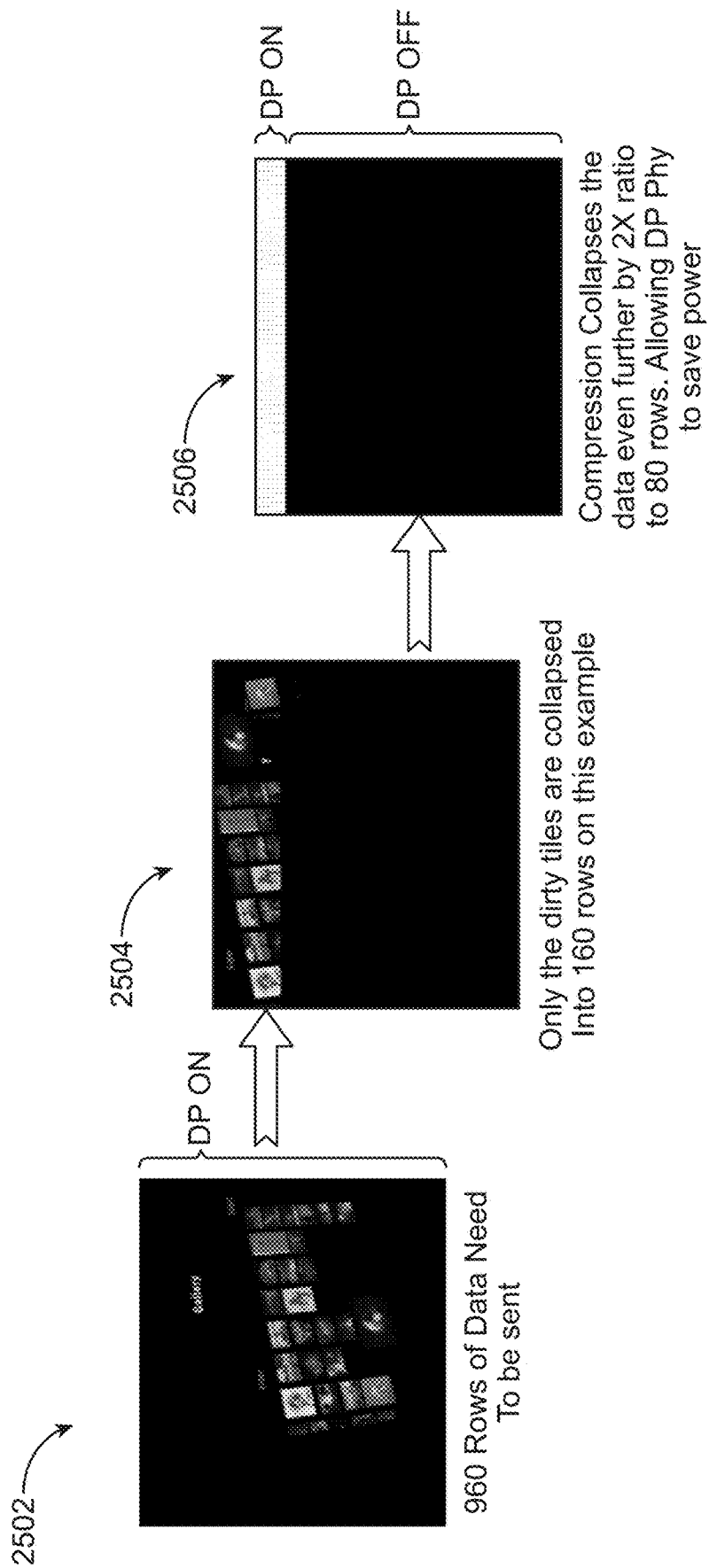
FIG. 25 schematically depict partial dark image data packing according to some embodiments.

As shown in FIG. 25, the GPU will pack the changed tiles such that they form a minimum number of rows of image data. Source frame 2502 shows a virtual image including various black pixels and nonblack pixels. Sending the source frame 2502 would require a certain number of rows (e.g. 960) to be sent from the GPU to the DB. Collapsed frame 2504 shows that the tiles including changed image data are now packed into the top of the collapsed frame 2504. Sending the collapsed frame 2504 would require a smaller number of rows (e.g., 160) to be sent from the GPU to the DP. Compressed frame 2506 shows that the tiles at the top of the collapsed frame 2504 have been compressed into even fewer rows. Sending the compressed frame 2506 would require an even smaller number of rows (e.g., 80) to be sent from the GPU to the DP. The collapsing of tiles and compression of the resulting collapsed frame 2504 to form the compressed frame 2506 allows various components of the image pipeline to be shut down (as described herein) early in the frame transfer/rendering interval to increase power savings.

As described herein, after the compressed frame 2506 is sent and processed, the GPU may initiate shutdown of various image pipeline components by sending a k-code power down sequence on the main DP link or DPCD power state commands. The shutdown may include powering down of the DP. Powering down the image pipeline components, including the DP link, may be signaled by the GPU via the AUX channel. During wake up, the GPU powers up the DP link drivers, and optionally trains the link using fast link training patterns.

The GPU will only direct image pipeline component shutdown is the number of rows transmitted is smaller than a threshold based on wake-up time and a cost-benefit analysis of power savings from component shutdown versus power usage on wake-up. A cyclic redundancy check (CRC) may or may not be performed at the end of a frame transferred/rendered using custom packing for partial screen refresh mode. The CRC information may be sent via an AUX channel.

Custom Partial Display Mode/Custom Dark Mode

Custom packing for partial screen refresh mode has two operating modes. In the custom partial display mode, the changed tiles are sent from the GPU to the DB and displayed by the display panel.

In the custom dark mode, the SDP messages include a specific background color (black in most cases). Any region of the field of view that does not belong to a change tile with content is set to the specific background color. The custom dark mode can be enabled when the total image changes but only a small amount of tiles contain content. In other words, many tiles previously containing image data have been converted to black in the current frame. By initially setting the regions without content to black, only to tiles with actual content will be sent from the GPU to the DB, thereby saving power in the image pipeline with earlier component shutdown. The SDP messages may also include the number of dark or background tiles.

Custom Packing for Blending and Scaling

If a multi-stream implementation is not supported, custom packing mode may send tiles to be blended with tiles from the previous frame (rather than copied over). Square or radio blending mass may be preprogrammed on the DB for blending new and previous tiles for output.

Tiles may also be scaled before being copied to an output frame buffer. The SDP messages may include a scaling factor for use in scaling the tiles. In some embodiments, this approach may be used for foveation implementations.

Custom Pixel Manipulation and Rate Conversion

The pixel engine can warp image data to minimize artifacts resulting from user pose changes (e.g., rapid head rotation) after the image data is rendered but before the image based on the image data is displayed to the user. These artifacts and some image warps to minimize the artifacts are described in U.S. Provisional Patent Application Ser. No. 62/702,238 filed on Jul. 23, 2018 and entitled "MIXED REALITY SYSTEM WITH VIRTUAL CONTENT WARPING AND METHOD OF GENERATING VIRTUAL CONTENT USING SAME," the contents of which have been previously Incorporated by reference.

In one embodiment of custom pixel warping without rate conversion, the GPU sends an SDP to the DB at the beginning of the frame. The SDP contains information such as compression enabled/disabled, custom packing enabled/disabled, custom grayscale mode enabled/disabled, packet pose, etc. The GPU also sends image data to the DB. If compression is enabled, the DB un-compresses the image data using the appropriate algorithm. If the image data requires color segmentation, the DB performs the color segmentation and stores to result in memory. The pixel engine receives configuration data via the AUX register writes, SDP messages, or as part of the second video stream. In some embodiments, the configuration data may include updated head pose information. In some embodiments, the DB may receive updated information from a wearable processor (e.g., IMU data) for the DB to generate head pose updates. In some embodiments, an IMU may be connected to the DB Bridge SPI port, and the DB may access raw IMU samples directly from the IMU. The configuration data may be stored in a message FIFO memory. The pixel engine reads the field data from the low-power DDR and performs the necessary conversions to provide output pixels to drive the display panels. The DB then repeats the steps described above for each supported color field. After all the color fields are processed, the DB proceeds to the next frame.

FIG. 26A shows the input to and output from a DB (i.e., relating to the image data in a video stream one 924) when rate conversion is not enabled according to some embodiments. Because the input image data was receive not formatted in color sequential mode, the DB must receive the first full frame of image data ("DP in frame 0") 2602 before it can segment the image data 2602 and send the first out frame of image data "DP out frame 0" 2604 to the display panel. Similarly, the DB must receive the entire second full frame of image data 2606 before it can send the second out frame 2608 to the display panel. This results in an 8.33 ms latency between receiving each image data and sending the corresponding out frame to the display panel. This delay is non-ideal.

FIG. 26B shows the input to and output from a DB (i.e., relating to the image data in a video stream one 924) when rate conversion is not enabled according to some embodiments. Because the input image data was formatted in color sequential mode, the first color field (e.g., red) image data 2602R is received well ahead of the end of the image frame. Accordingly the out frame image data corresponding to the first color field 2604R can be sent to the display panel earlier in the image pipeline. Using grayscale color segmentation mode, the latency can be reduced from 8.33 ms to 2.78 ms.

Rate Up-Conversion

FIG. 26C shows the input to and output from a DB (i.e., relating to the image data in a video stream one 924) when rate conversion is enabled according to some embodiments. The DB receives image data at 60 Hz, but outputs image data at 120 Hz. In some embodiments, the DB receives image data at 45 Hz, but outputs image data at 90 Hz. Regardless of the image data frequency, the output image data is double the frame rate. In the embodiment depicted in FIG. 26C, the input image data was not formatted in color sequential mode like the embodiment depicted in FIG. 26A. Accordingly, there is a latency of 8.33 ms between the DB receiving the in frame of image data 2602 and the DB sending the out frame of image data 2604. The difference in this rate up conversion image pipeline is that the out frame of image data 2604 includes each color field twice at double the speed to double the effective refresh rate from 60 Hz to 120 Hz in which the pixel engine will update the headpose for each field warping the incoming image to have the effect of zero latency for each of the two output frames The pipeline depicted in FIG. 26C also includes a DP off segment 2610 between receiving sequential in frames of image data to conserve power. Running the GPU at a lower refresh rate (e.g., 60 Hz) also conserves power. Compression can be used to reduce the latency.

Rate Up Conversion with Warping

FIG. 26D shows the inputs to and output from a DB (i.e., relating to the image data in a video stream one 924) when rate conversion and warping our enabled according to some embodiments. The image pipeline depicted in FIG. 26D is similar to the image pipeline depicted in FIG. 26C. The difference is that FIG. 26D also shows the SDP and AUX messages being sent from the GPU to the pixel engine in the DB. The SDP and AUX messages include current pose information that can be used to warp the rendered image data for more accurate image rendering. The current pose information may be provided by IMUs that are running at 1000 Hz. The DB computes a pose delta from the packet pose and the current pose for use in warping. Minimizing the time between receiving current pose information and warping the rendered image data increases accuracy. The AUX channel is used instead of the SDP channel when the DP is powered down. The warping depicted in FIG. 26D can also address the physical distortion of various components in the optical stack using distortion information in the SDP/AUX messages.

In all of the above image pipelines, parallel receipt of inputs, processing, and transmission of outputs minimizes latency between inputs and display and delays in the image pipeline.

Composite video stream two 926, may be an uncompressed RGB888 packed data stream. Accordingly, rate conversion for video stream two 926 may be as simple as duplicating the data stream for a two times frame rate up conversion.

Partial Dark Tracking Mask

In some embodiments, the GPU may segment each frame into groups (e.g., rows) of tiles, and generate a mask that indicates if a particular group (e.g., row) of tiles has non-black content. The GPU may use the mask to generate a render output to the downstream components of the image pipeline. A new mask may be generated for each new frame. The image pipeline components may be communicatively coupled by a dynamic circuit network (DCN).

In one embodiment, a frame may have 1760 rows of pixels and each row of tiles may have 16 rows of pixels. In this embodiment, 110 bits may be used to store the black/non-black status of the 110 tile rows in each frame. A bit corresponding to an all-black tile row can be set to zero, and a bit corresponding to a non-black tile row can be set to one. The bits may be defaulted to zero and set to one when a tile row is non-black. The GPU or another image pipeline component may use the information in these bits to select non-black tile rows to be sent onto the DCN. The GPU or another image pipeline component may use the information in these bits to pack and unpack non-black tile rows as described herein.

As described herein, sending only non-black tile rows and packing these rows increases the opportunity to implement power optimizations including, but not limited to, the following:

Reduce the display port link power (e.g., no rows to send, or just a subset of the rows);

Reduce the DP source processor memory bandwidth and power (e.g., there is no need for the DCN to fetch all black pixels from DRAM; this saves DRAM bandwidth, DRAM power, and DCN power);

Eliminate the need to DSC compress a full frame on the DP Source;

Eliminate the need for the DP sink bridge to DSC decompress a full frame;

Eliminate the need for the DP sink bridge device to perform color segmentation of a full frame;

Eliminate the need for the DP sink bridge device to write a full frame to LPDDR saving power;

The pixel engine block will not need to fetch a full frame from LPDDR saving power;

The pixel engine will not need to perform pixel processing on a full frame saving power;

Reduce the MIP I-TX power to the panel with reduced signaling;

Reduce the MIPI-RX power in the panel; and

Reduce the panel power by preventing it from having to store or retrieve data from its SRAM to support a partially black screen.

The DCN may include direct memory access controller (DMA) to fetch non-black rows into the DCN without involving any processor. The DMA may read the mask to identify the non-black rows. The non-black rows may be sent to the display engine via the DCN and the DP without re-organizing or re-composing (e.g., collapsing or compacting) to save power.

As described herein, if non-black rows form a significant portion of a frame, re-composition of the frame or partial dark mode may not save power. Such frames may be sent directly to the DP sink bridge via the DCN.

Additional Aspects

In addition to the claimed invention and by way of non-limiting examples, further embodiments or aspects of the invention are described herein.

1. A method in a virtual, augmented, or mixed reality system, comprising:
a GPU receiving a frame of image data;
the GPU identifying a plurality of regions/portions/sections/tiles in the frame of image data that have changed from a previous frame of image data;
the GPU moving at least some of the plurality of regions/portions/sections/tiles to a beginning of the frame of data to form a reordered frame of image data;
the GPU sending the reordered frame of image data to a DB;
shutting down a portion/component/function of the GPU;
shutting down a communication link between the GPU and a DB;
shutting down a portion/component/function of the DB;
shutting down a communication link between the DB and a display panel; and shutting down a portion/component/function of the display panel.

2. The method of aspect 1, further comprising the GPU compressing the reordered frame of image data before sending the reordered frame of image data to the DB.

3. The method of aspect 1, wherein the reordered frame of image data is smaller than the frame of image data.

4. The method of aspect 1, further comprising the DB storing the reordered frame of image data in a buffer.

5. The method of aspect 1, further comprising:
determining a size of the reordered frame of image data; and
shutting down the portion/component/function of the GPU, the communication link between the GPU and a DB, the portion/component/function of the DB, the communication link between the DB and a display panel, the portion/component/function of the display panel only when the reordered frame of image data is smaller than a predetermined maximum size.

6. The method of aspect 1, further comprising the GPU sending a STP message to the DB after sending the reordered frame of image data to the DB.

7. The method of aspect 6, further comprising the GPU sending the STP message to the DB via a SDP.

8. The method of aspect 1, wherein the portion/component/function of the GPU is selected from the group consisting of memory read, compression, and color segmentation.

9. The method of aspect 1, wherein the portion/component/function of the DB is memory write.

10. The method of aspect 1, wherein the portion/component/function of the display panel is selected from the group consisting of video RAM and a MIPI receiver.

11. The method of aspect 1, further comprising the GPU sending a wake up signal to the DB.

12. The method of aspect 11, wherein the GPU sends the wake up signal via an AUX communication link.

13. The method of aspect 1, wherein the portion/component/function of the GPU, the communication link between the GPU and a DB, the portion/component/function of the DB, the communication link between the DB and a display panel, the portion/component/function of the display panel are shut down asynchronously.

14. The method of aspect 1, further comprising the DB reconstructing the frame of image data from the reordered frame of image data.

15. The method of aspect 1, further comprising setting a portion of the frame of image data not in the plurality of regions/portions/sections/tiles in the frame of image data to a background color.

16. The method of aspect 1, further comprising the DB blending the reordered frame of image data with a previous frame of image data.

17. The method of aspect 16, further comprising the DB masking the previous frame of image data before blending the reordered frame of image data therewith.

18. The method of aspect 1, further comprising the DB blending the reordered frame of image data with image data relating to an updated foveated region.

19. The method of aspect 1, further comprising the DB scaling the reordered frame of image data.

20. The method of aspect 18, further comprising:
the DB receiving a scaling factor from the GPU; and
the DB scaling the reordered frame of image data using the scaling factor.

21. The method of aspect 18, wherein the scaling is a part of a foveation operation.

22. The method of aspect 1, further comprising the DB performing a function on the image data, the function being selected from the group consisting of warping, pixelated dimming, occlusion, chromatic correction aberration, frame rate and expansion.

23. The method of aspect 1, further comprising storing the reordered frame of image data in a FIFO memory before shutting down a portion/component/function of the GPU.

24. The method of aspect 1, further comprising the DB sending an embedded line control message to the display panel.

MIPI Output Data Configuration

As described herein, the DB processes image data received from the GPU and sends processed image data to a display panel for display to the user. In grayscale format, the display panel will receive image data through a MIPI link format in which all the red pixels are followed by all the green pixels and then all the blue pixels for color sequential displays, otherwise standard packed RGB is used. Assuming a display resolution of Y by X, the output timing from the MIPI receiver would be Y/3 by 3X. Each row will have one third of the pixels since only one third of the colors are being sent, but the number of rows will be tripled. Also, an additional 24 rows for signaling and three rows for VSA, VBP, and VFP results in 5307 rows.

Figure 27:
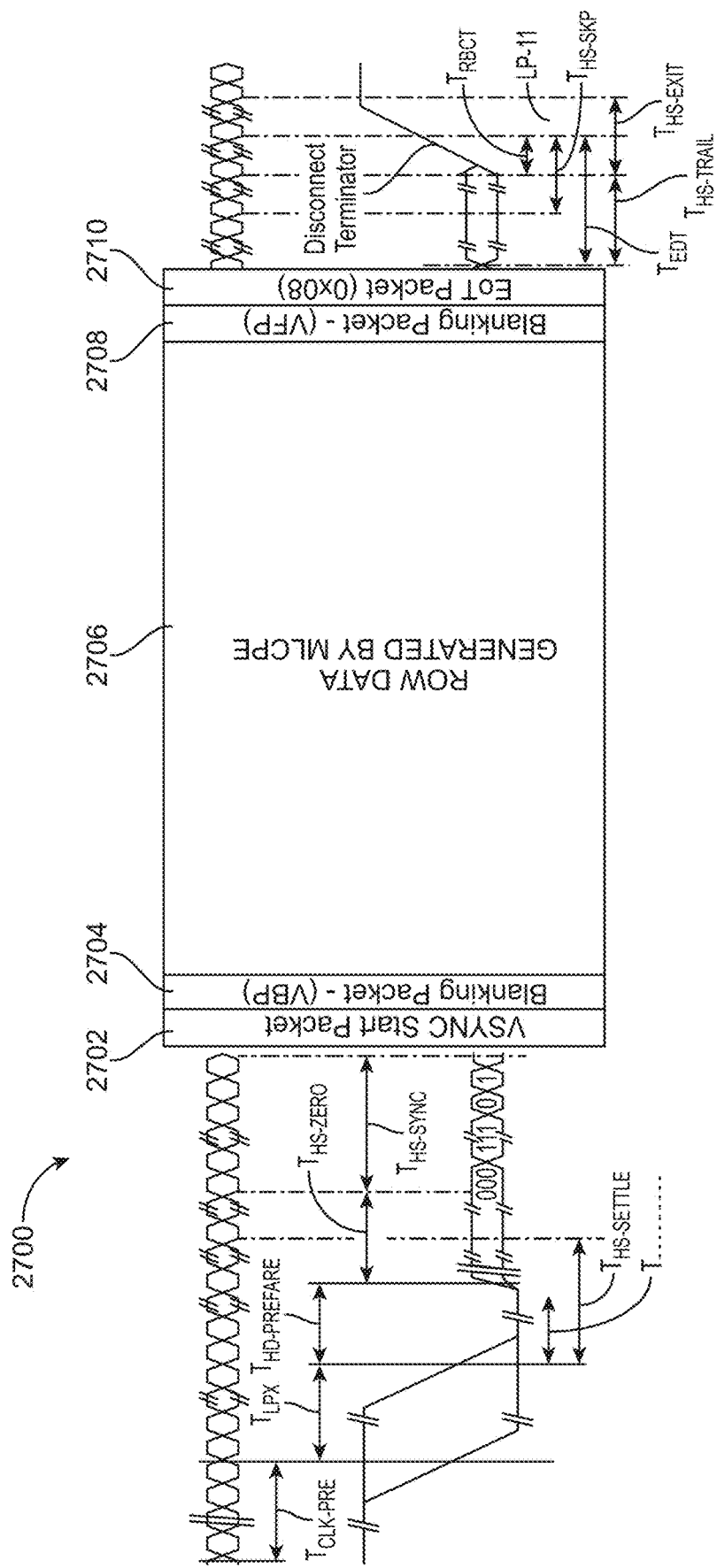
FIGS. 27-31B schematically depict MIPI receiver output data according to some embodiments.

FIG. 27 depicts a sample MIPI receiver output data 2700 according to some embodiments. The output data 2700 includes a VSYNC start packet 2702, followed by a first blanking packet/VBP 2704, followed by the image data generated by the pixel engine 2706, followed by a second blanking packet/VFP 2708, and an EOT packet 2710.

Figure 28:
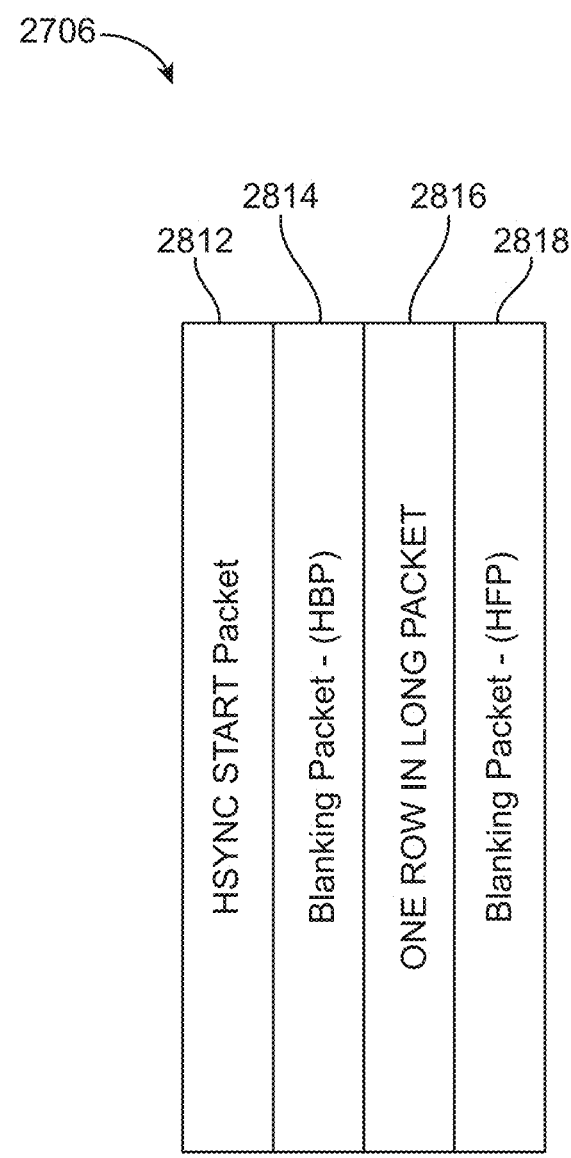

As shown in FIG. 28, the image data 2706 generated by the pixel engine consists of an HSYNC start packet 2812, followed by a first blanking packet/HBP 2814, followed by one row of image data and or embedded signaling data in long packet format 2816, followed by a second blanking packet/HFP 2818.

Figure 29:
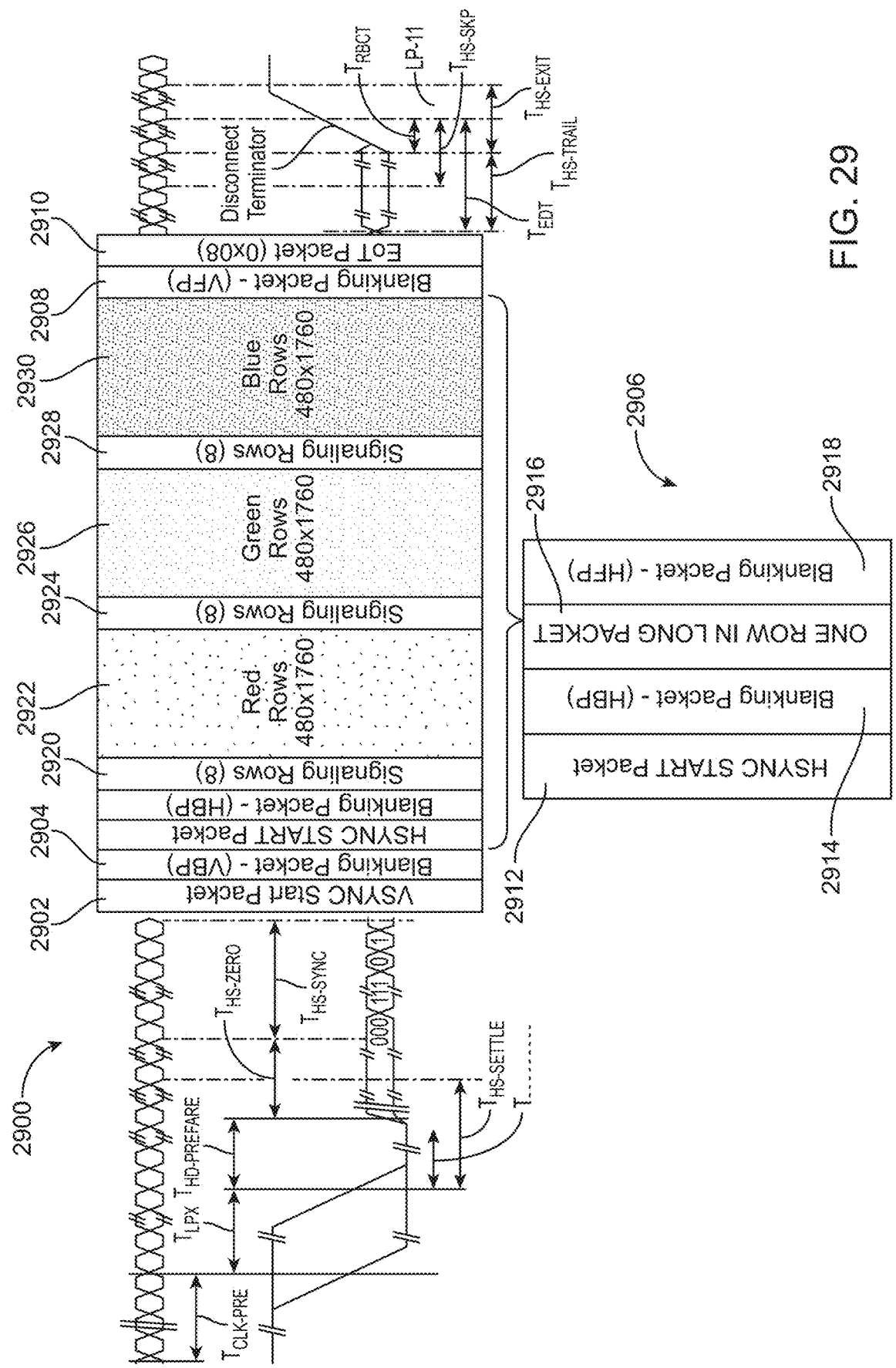

FIG. 29 depicts a sample MIPI receiver output data 2900 corresponding to a video frame with red, green, and blue pixel rows broken down according to some embodiments when compression is not used. Each color field includes 1760 individual rows with 480 pixels in each row. The output data 2900 includes a VSYNC start packet 2902, followed by a first blanking packet/VBP 2904, followed by the image data generated by the pixel engine 2906, followed by a second blanking packet/VFP 2908, and an EOT packet 2910. The image data generated by the pixel engine 2906 consists of an HSYNC start packet 2912, followed by a first blanking packet/HBP 2914, followed by one row of image data and or embedded signaling data in long packet format 2916, followed by a second blanking packet/HFP 2918. The image data 2916 includes a first signaling row 2920, followed by the first color (red) field rows 2922, followed by a second signaling row 2924, followed by the second color (green) field rows 2926, followed by a third signaling row 2928, followed by the third color (blue) field rows 2930.

Full Dark Low Power Mode

Figure 30:
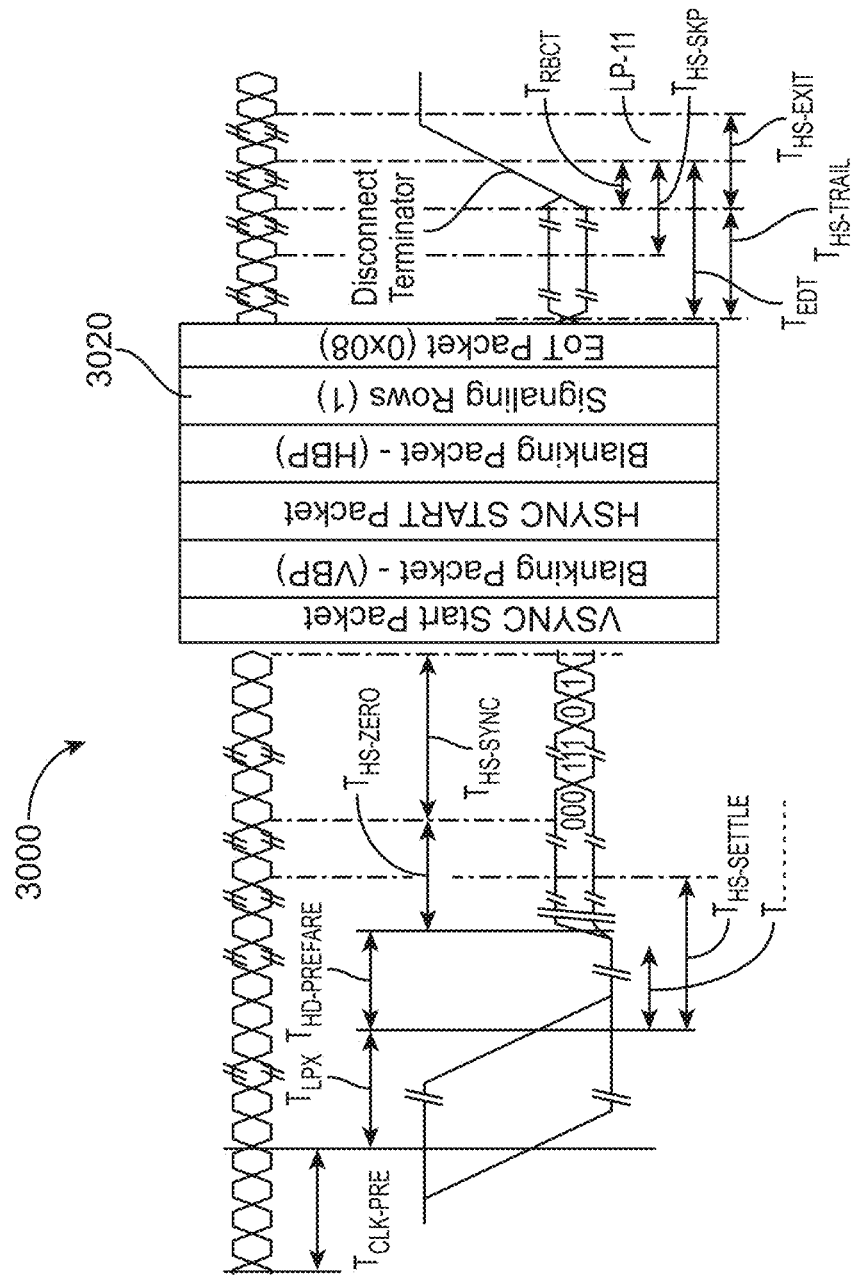
Figure 30A:
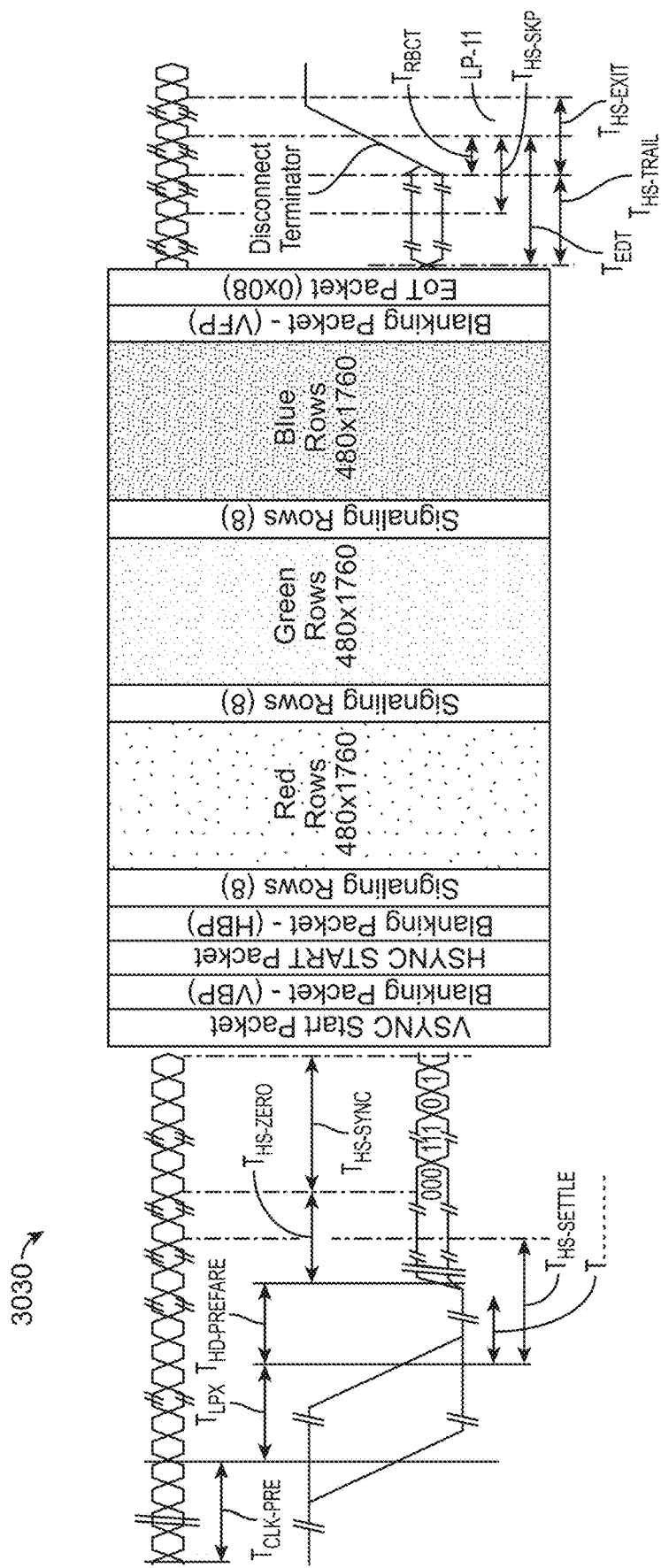

In full dark low-power mode (described above), the DB will communicate to the display panel entry into that low-power mode using the first signaling row 3020 as shown in FIG. 30. After entry into low-power mode is communicated, the DB will enter a low power mode (LP11). The display panel will also save power by placing the MIPI receiver in LP11 mode, not store any information in the panel video RAM, and not retrieve any information from the panel video RAM.

FIG. 38 schematically depicts the MIPI timing of the image frame data 3030 communicated to the DB to initiate full dark low-power mode. As described herein, the image frame data 3030 is similar to that for regular image mode. The exception is that the GPU writes a vertical blank SDP message in the image frame data 3030 to initiate the full dark mode.

Partial Dark Low Power Modes

Figure 31:
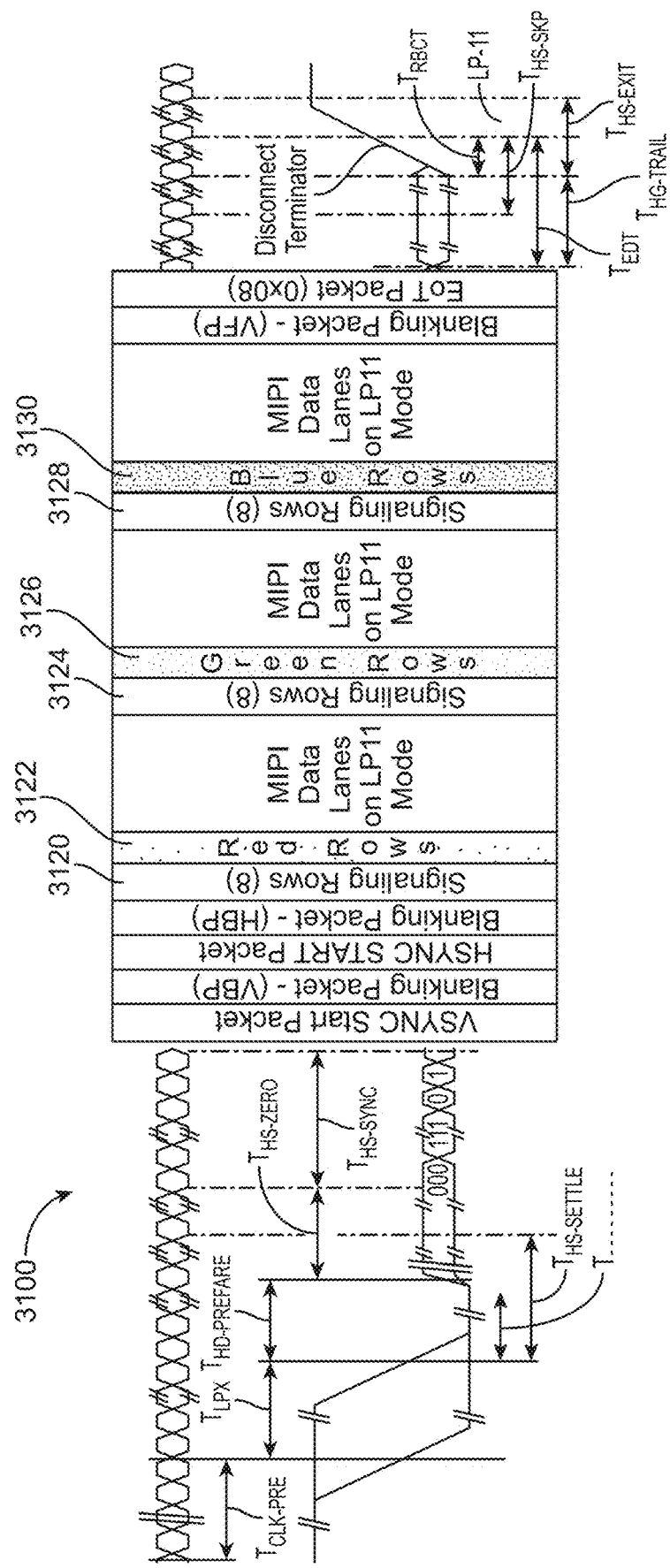

In the various partial dark low-power modes (described above), the DB will communicate the parameters of the partial dark low-power mode (e.g., low-power mode enabled and number of active rows) for each color field in the corresponding signaling row 3120, 3124, 3128 preceding the color field rows 3122, 3126, 3130, as shown in FIG. 31. The timing of the frame for partial dark low-power mode is similar to that for color field display depicted in FIG. 29, with the exception that only a programmable variable fraction of the 1760 rows containing image data per color field be sent from the DB to the display panel through the MIPI link. After the rows containing image data are received, the MIPI link is put into low-power or LP11 mode to save power during all the black rows and taken out of LP11 ahead of each field.

Figure 31A:
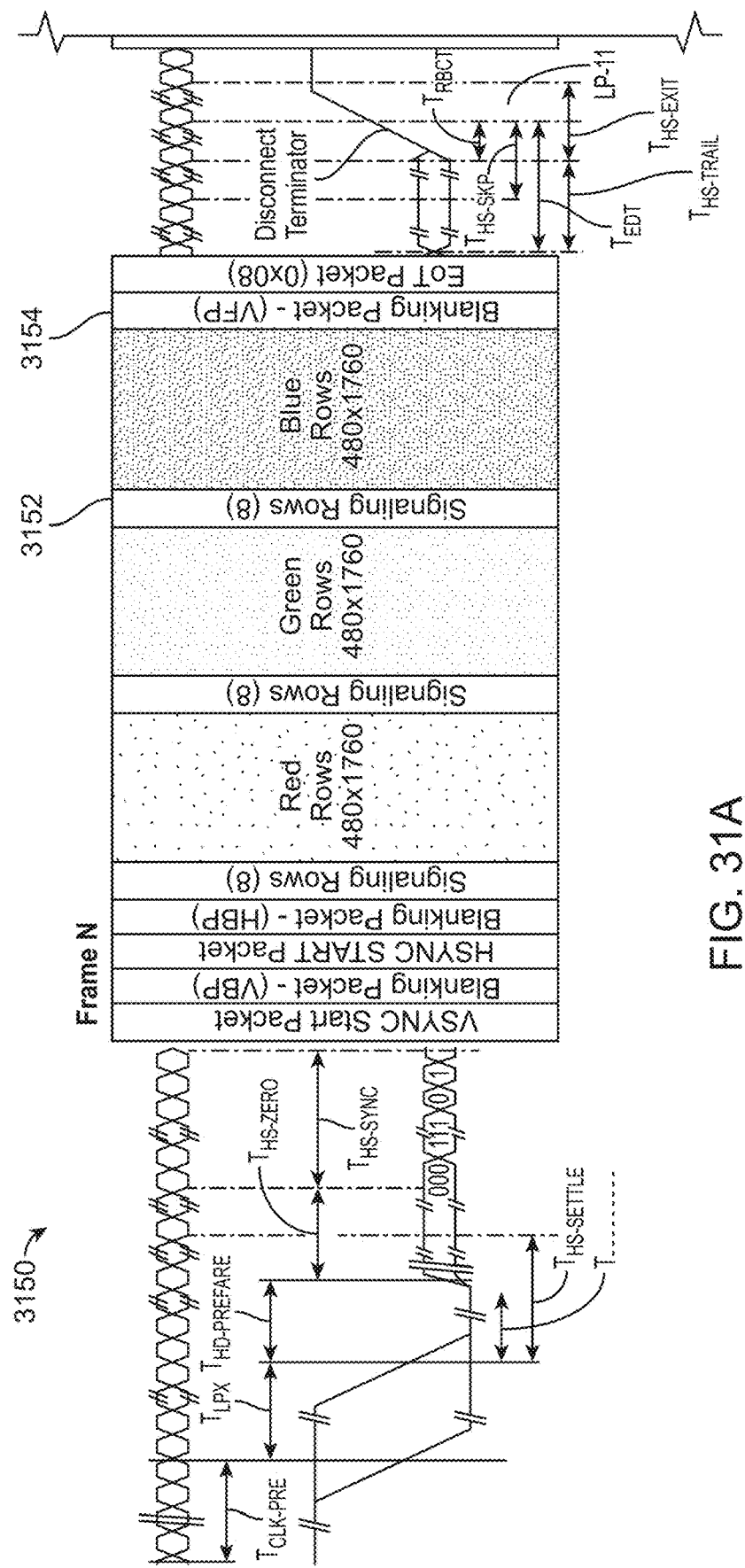
Figure 31A:
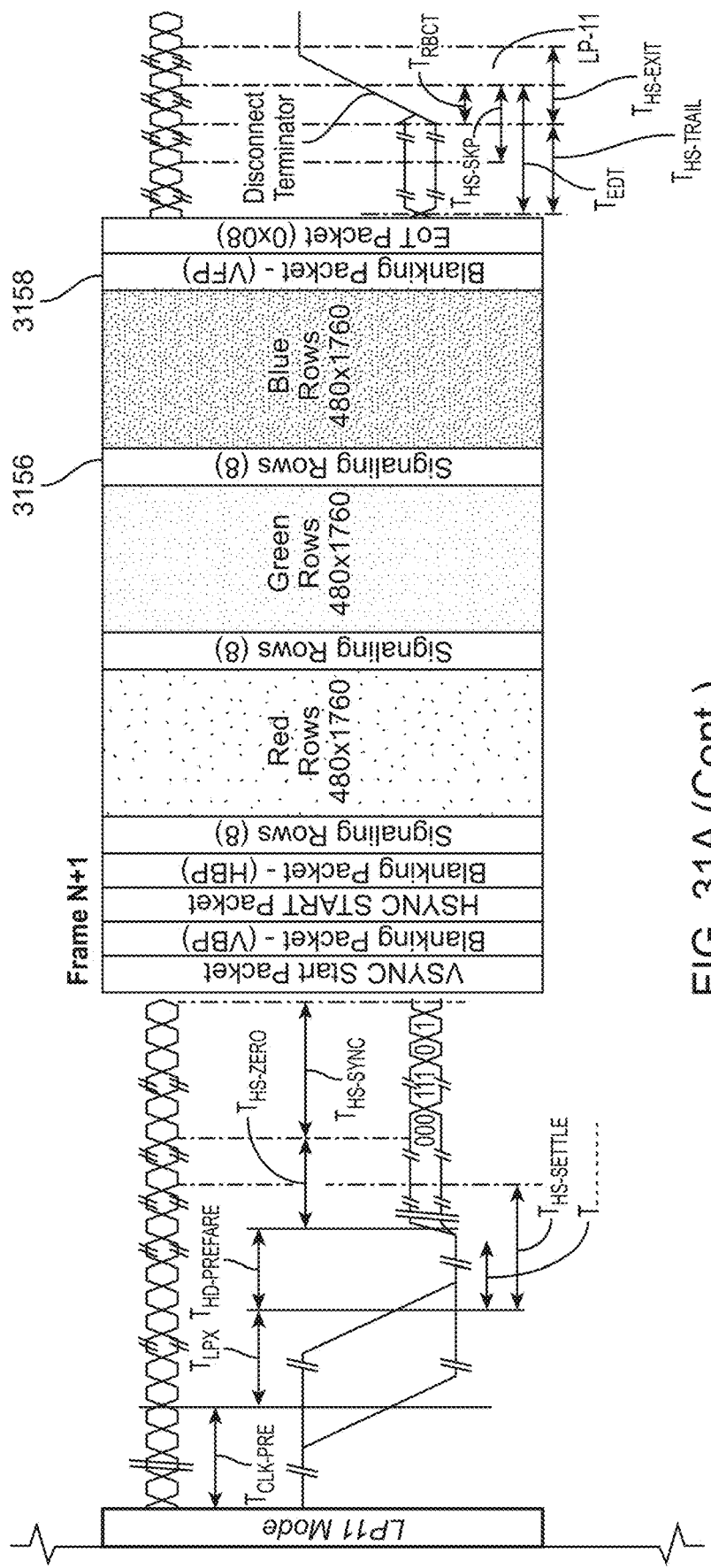

FIG. 31A schematically depicts the MIPI timing 3150 for two cycles of a DB operating in partial dark low-power mode, according to some embodiments such as those described herein. At 3152 during the display of frame N, the pixel engine sets proper value for the number of active rows in top level wires for frame N+1. At 3154 during the display of frame N, the DB MIPI system fetches and latches those wires for frame N+1. Similarly, at 3156 during the display of frame N+1, the pixel engine sets proper value for the number of active rows in top level wires for frame N+2. At 3158 during the display of frame N+1, the DB MIPI system fetches and latches those wires for frame N+2.

Figure 31B:
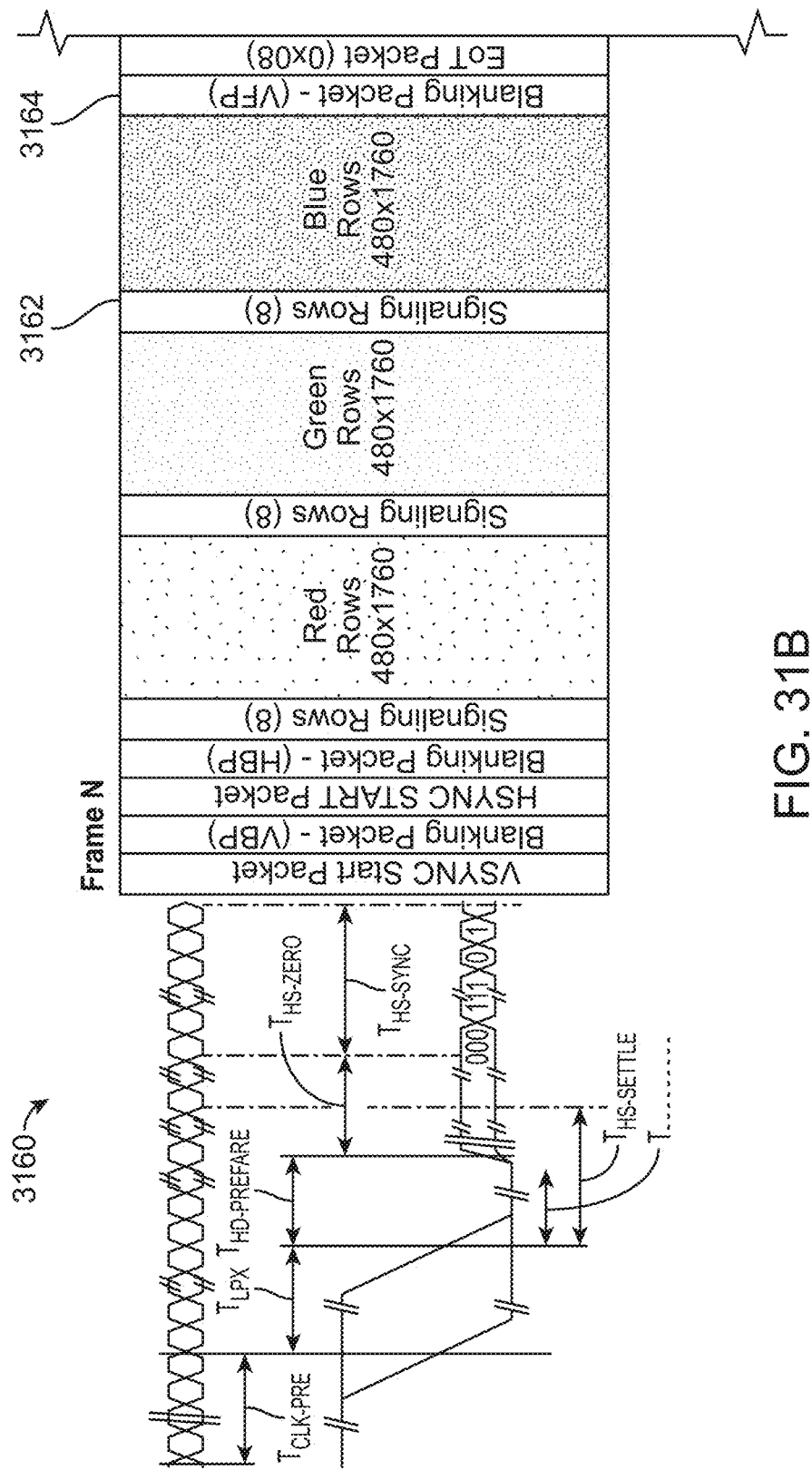
Figure 31B:
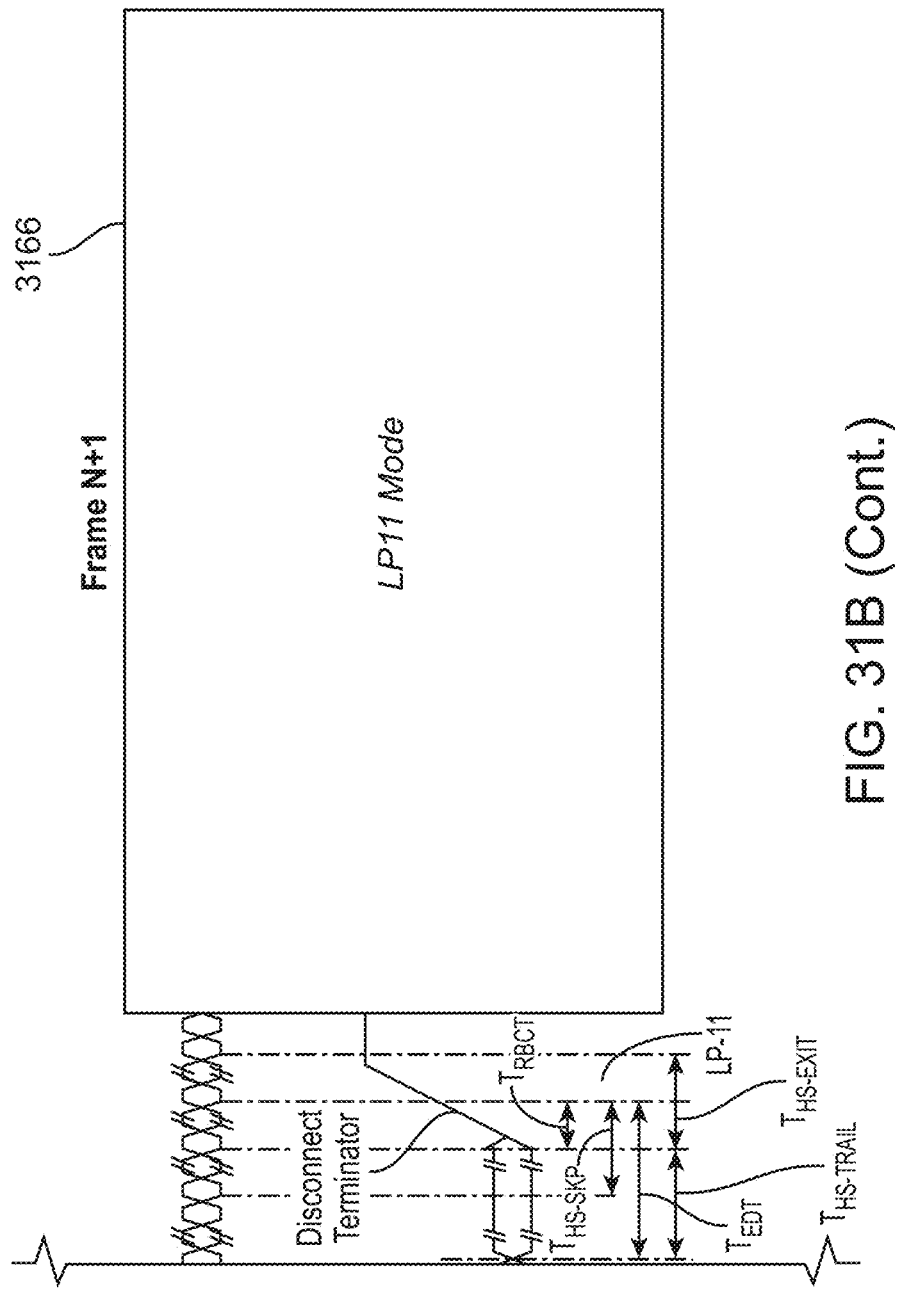

FIG. 31B schematically depicts the MIPI timing 3150 for two cycles of a DB going from partial dark low-power mode to full dark low-power, according to some embodiments. At 3162 during the display of frame N, the pixel engine sets value for the number of active rows corresponding to full dark (i.e., zero) in top level wires for frame N+1. At 3164 during the display of frame N, the DB MIPI system fetches and latches those wires for frame N+1. Due to the full dark value in the wire, frame N+1 is completely dark.

Figure 35:
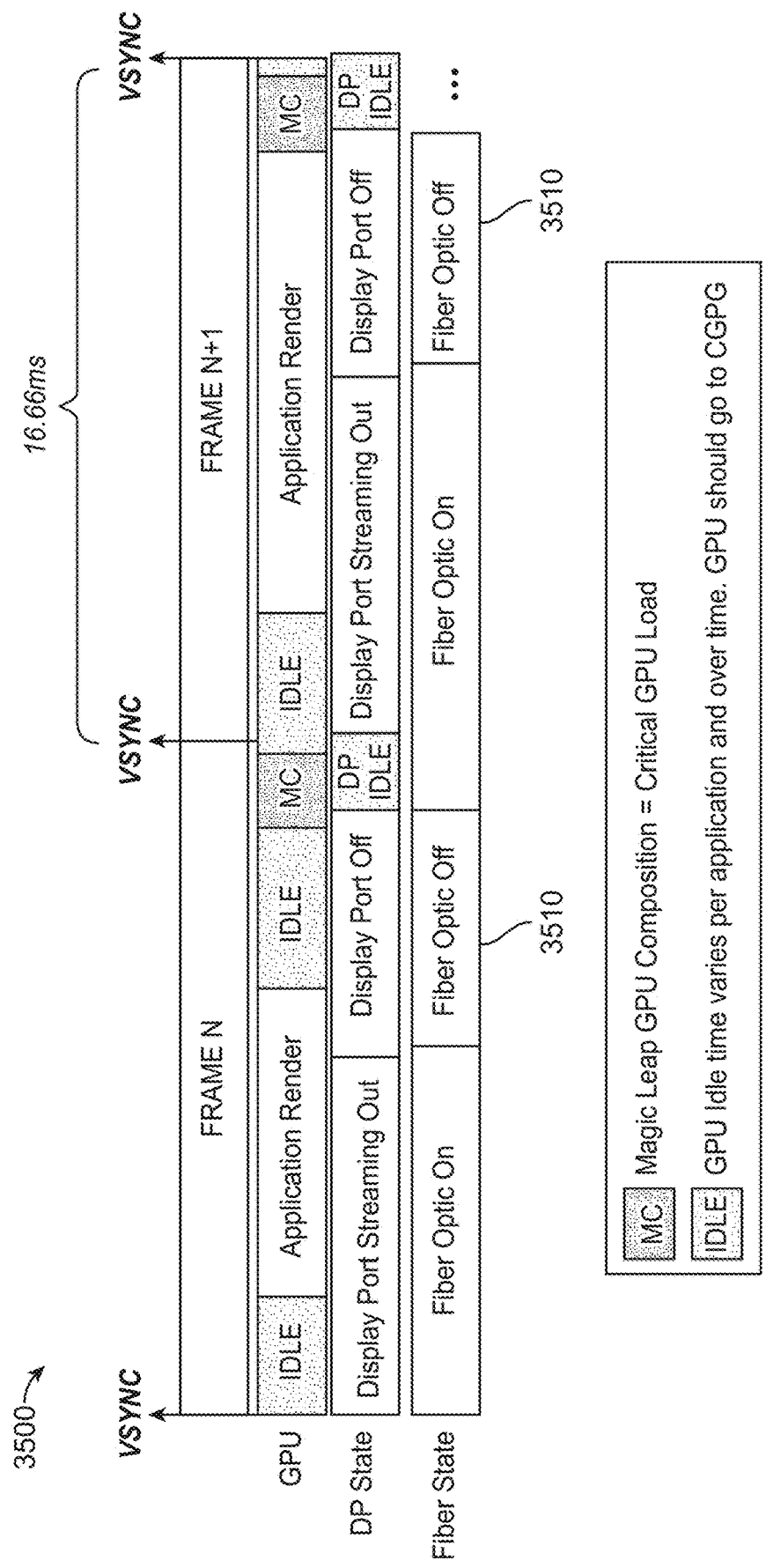
FIG. 35 schematically depicts the MIPI timing for two cycles of a DB operating in partial dark low-power mode according to some embodiments.

FIG. 35 schematically depicts the MIPI timing 3500 for two cycles of a DB operating in partial dark low-power mode according to some embodiments such as those described above. In each cycle/frame, there is a portion in which the DB is operating in low-power mode. During this time, the DP is turned off and in response the fiber-optic connector is also turned off. Turning off these two components of the DB during every cycle/frame conserves system power. In some embodiments, the low-power portion of the cycle/frame is approximately half of the cycle. Possible reasons for shutting down the components of the DB include but are not limited to:
1) Normal display subsystem shutting down;
2) Normal display subsystem going to low power mode;
3) During normal operation in which saving power requires the link to be shut down after the active lines have been sent for every single display frame;
4) During partial dark mode after the required active lines have been sent as will be described herein;
5) To enter full dark mode as described herein; and
6) To enter frame repeat mode as described herein.

Reduced Resolution Rendering with Scaling
(Sectional Foveated Rendering)

In some embodiments, VR/AR/MR systems can save power using sectional foveated rendering to render virtual images corresponding to a user's area of focus at a higher resolution, while rendering background virtual images at a lower resolution. Using sectional foveated rendering may reduce the GPU compute and power usage of the system. The DB on the wearable merges the background and foveated content at the higher resolution for display using the pixel engine and the latest eye tracking data. Sectional foveated rendering is optimized for a multi-stream implementation. In such an implementation, each stream has its own image pipeline and DB. Alternatively, custom packing can be used where a multi-stream implementation is not available so that the multiple streams share a single video stream in VESA SST mode.

Dynamic Occlusion

In some embodiments, VR/AR/MR systems can save power by eliminating occluded virtual content from the image pipeline, for example, at the latest stage in the pipeline possible. The DB can mask virtual content as appropriate (e.g., for occlusion by a fast-moving hand) using depth maps from the wearable. The DP can mask the virtual content directly before display to reduce latency compared to masking on the GPU. The GPU still performs occlusion on the content but may not be able to occlude everything due to the pipeline latency. Rendered content is sent from the GPU to the DB, where it is masked using the depth maps and sent to the display panels for display, for example, with sub 3 ms latency Uncompressed High Bandwidth Data Uncompressed high bandwidth data can be sent from the GPU to the DB using various channels (e.g., MST of the VESA standard). This uncompressed high bandwidth data can be sent as part of as a combined stream for use in occlusion, segmented dimming, control, geometric distortion LUTs, foveation. In some embodiments, a first video stream can be used to transmit compressed image data for the primary panels and a second video stream can be used to transmit uncompressed high bandwidth data. A DB with MIPI pre-emphasis support built in to compensate for RX EQ issues and for a larger distance between the displays and the DB.

Repeat Previous Frame with Offset

In some embodiments, the image content does not change from frame to frame, but rather shifts several pixels up or down as the user's head moves slightly. Rather than tasking the GPU to re-draw every pixel, the repeat previous frame with offset mode allows the GPU to bypass re-rendering and perform a simple transformation using an offset value to move the content, which is already stored on the DB memory. In this mode, the GPU may calculate an offset value using only head pose updates, thereby saving significant GPU power as well as DP power and fiber optic channel power since not much data is transferred to the wearable (i.e., head pose updates).

Black Portion Masking

Figure 36A:
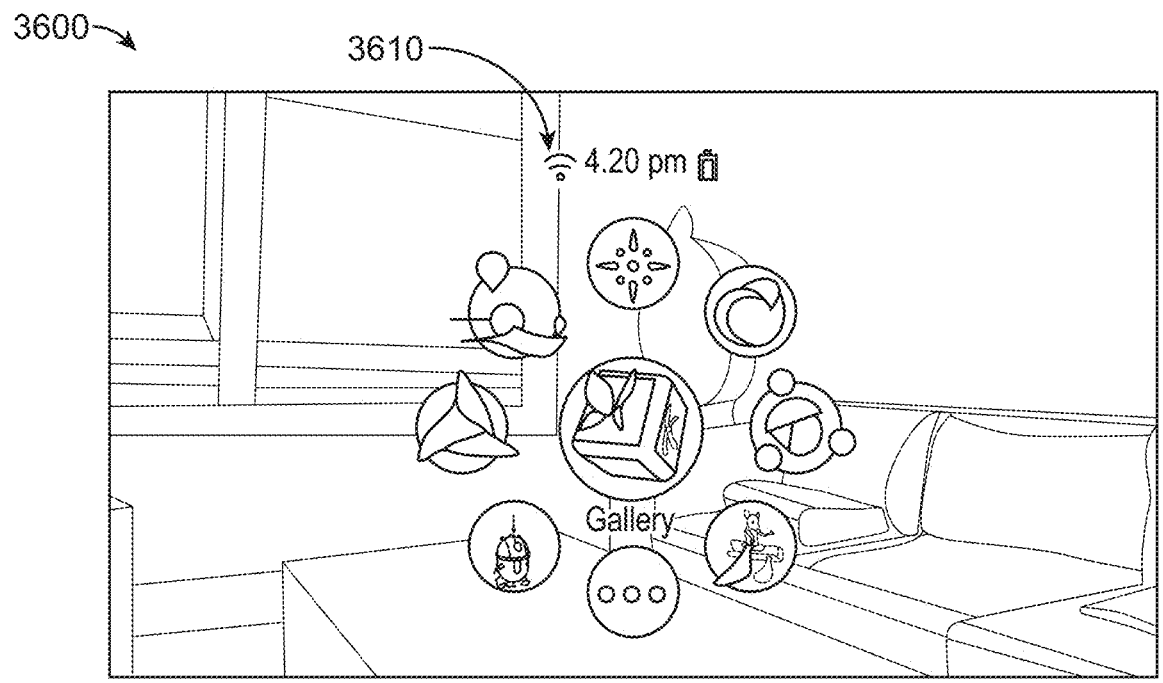
FIG. 36A depicts an AR view according to some embodiments.
Figure 36B:
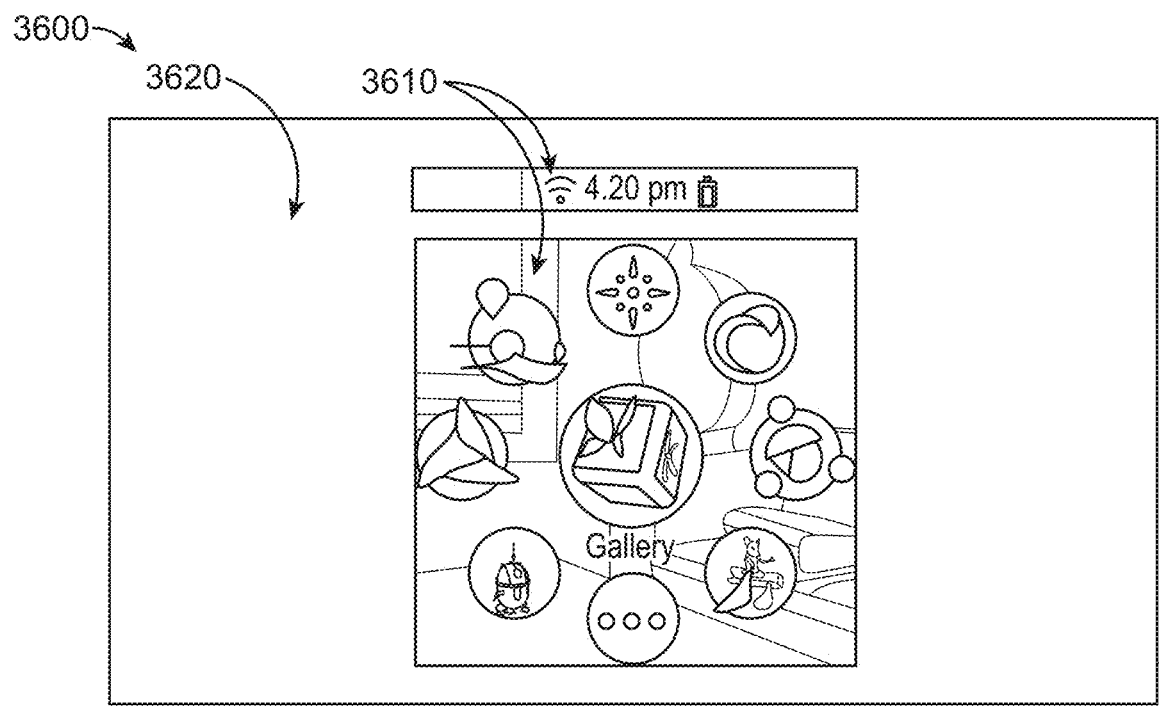
FIG. 36B depicts an AR view on which a black portion mask has been applied according to some embodiments.

FIG. 36A depicts an AR view 3600, according to some embodiments. The graphical user interface 3610 may change as the AR system operates. However, the portions of the frame outside of the graphical user interface 3610 will not typically change, and will therefore be rendered as black/no light portions of the frame 3620 (see FIG. 36B). The black portions of the frame 3620 shown in FIG. 36B will stay the same from frame to frame in some embodiments. Accordingly, the DB will not fetch or operate on (e.g., warp) the black portions of the frame 3620. Using a mask made of the black portions of the frame 3620, the GPU may generate a start columns/end column pair per row that is sent over the DP to the DB. In response to the DB will only fetch image information between the start and end columns per row from the memory. This technique substantially reduces Inter-leave Division Multiple Access (IDMA) active times, which reduces the time before the DB can enter a low power mode.

Certain aspects, advantages and features of the disclosure have been described herein. It is to be understood that not necessarily all such advantages may be achieved in accordance with any particular embodiment of the disclosure. Thus, the disclosure may be embodied or carried out in a manner that achieves or optimizes one advantage or group of advantages as taught herein without necessarily achieving other advantages as may be taught or suggested herein.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, methods, and the like described herein. A wide variety of variation is possible. Components, elements, and/or steps may be altered, added, removed, or rearranged.

The devices and methods described herein can advantageously be at least partially implemented using, for example, computer software, hardware, firmware, or any combination of software, hardware, and firmware. Software modules can include computer executable code, stored in a computer's memory, for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on non-transitory computer-readable media that, when read by a computer or other processing device, cause it to carry out the method.

While certain embodiments have been explicitly described, other embodiments will become apparent to those of ordinary skill in the art based on this disclosure.

The various processors and other electronic components described herein are suitable for use with any optical system for projecting light. The various processors and other electronic components described herein are also suitable for use with any audio system for receiving voice commands.

Various exemplary embodiments of the disclosure are described herein. Reference is made to these examples in a non-limiting sense. They are provided to illustrate more broadly applicable aspects of the disclosure. Various changes may be made to the disclosure described and equivalents may be substituted without departing from the true spirit and scope of the disclosure. In addition, many modifications may be made to adapt a particular situation, material, composition of matter, process, process act(s) or step(s) to the objective(s), spirit or scope of the present disclosure. Further, as will be appreciated by those with skill in the art, each of the individual variations described and illustrated herein has discrete components and features which may be readily separated from or combined with the features of any of the other several embodiments without departing from the scope or spirit of the present disclosure. All such modifications are intended to be within the scope of claims associated with this disclosure.

The disclosure includes methods that may be performed using the subject devices. The methods may include the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The invention claimed is:

1. A method in a virtual, augmented, or mixed reality system, comprising:
    a GPU dividing a first color field into a first partial first color field and a second partial first color field;
    the GPU dividing a second color field into a first partial second color field and a second partial second color field;
    the GPU sending the first partial first color field to a DB;
    the GPU sending the first partial second color field to the DB after sending the first partial first color field;
    the GPU sending the second partial first color field to the DB after sending the first partial second color field; and
    the GPU sending the second partial second color field to the DB after sending the second partial first color field
    the GPU dividing a third color field into a first partial third color field and a second partial third color field;
    the GPU sending the first partial third color field to the DB after sending the first partial second color field and before sending the second partial first color field; and
    the GPU sending the second partial third color field to the DB after sending the second partial second color field.

2. The method of claim 1, further comprising the GPU sending the first partial first and second color fields and the second partial first and second color fields as a single vertically encoded data set.

3. A method in a virtual, augmented, or mixed reality system, comprising:
    a GPU dividing a first color field into a first partial first color field, a second partial first color field, and a third partial first color field;
    the GPU dividing a second color field into a first partial second color field, a second partial second color field, and a third partial second color field;
    the GPU dividing a third color field into a first partial third color field, a second partial third color field, and a third partial third color field;
    the GPU sending the first partial first color field to a DB;
    the GPU sending the first partial second color field to the DB after sending the first partial first color field;
    the GPU sending the first partial third color field to the DB after sending the first partial second color field;
    the GPU sending the second partial first color field to the DB after sending the first partial third color field;
    the GPU sending the second partial second color field to the DB after sending the second partial first color field;
    the GPU sending the second partial third color field to the DB after sending the second partial second color field;
    the GPU sending the third partial first color field to the DB after sending the second partial third color field;
    the GPU sending the third partial second color field to the DB after sending the third partial first color field; and
    the GPU sending the third partial third color field to the DB after sending the third partial second color field.

4. The method of claim 3, further comprising the GPU sending the first partial first, second, and third color fields, the second partial first, second, and third color fields, and the third partial first, second, and third color fields as a single vertically encoded data set.

5. The method of claim 3, further comprising:
    the GPU sending first pose data to the DB;
    the DB warping the first partial first color field using the first pose data;
    the GPU sending second pose data to the DB after sending the first pose data;
    the DB warping the first partial second color field using the second pose data;
    the GPU sending third pose data to the DB after sending the second pose data;
    the DB warping the first partial third color field using the third pose data;
    the GPU sending fourth pose data to the DB after sending the third pose data;
    the DB warping the second partial first color field using the fourth pose data;
    the GPU sending fifth pose data to the DB after sending the fourth pose data;
    the DB warping the second partial second color field using the fifth pose data;
    the GPU sending sixth pose data to the DB after sending the fifth pose data;
    the DB warping the second partial third color field using the sixth pose data;

the GPU sending seventh pose data to the DB after sending the sixth pose data;

the DB warping the third partial first color field using the seventh pose data;

the GPU sending eighth pose data to the DB after sending the seventh pose data;

the DB warping the third partial second color field using the eighth pose data;

the GPU sending ninth pose data to the DB after sending the eighth pose data; and the DB warping the third partial third color field using the ninth pose data.

6. The method of claim 5, wherein the method performs a frame rate expansion with an appearance of zero latency with updated warps.

7. The method of claim 5, further comprising adjusting at least one of the first to ninth pose data to perform continuous warping.

* * * * *